US012608675B2

(12) United States Patent
Liu

(10) Patent No.:  US 12,608,675 B2
(45) Date of Patent:      Apr. 21, 2026

(54) HAZARDOUS CHEMICAL VEHICLE TRANSPORTATION SAFETY MONITORING SYSTEM BASED ON TOTAL FACTOR MANAGEMENT

(71) Applicant: THE THIRD RESEARCH INSTITUTE OF MINISTRY OF PUBLIC SECURITY, Shanghai (CN)

(72) Inventor: Caixia Liu, Shanghai (CN)

(73) Assignee: THE THIRD RESEARCH INSTITUTE OF MINISTRY OF PUBLIC SECURITY (CN)

( * ) Notice: Subject to any disclaimer, the term of this patent is extended or adjusted under 35 U.S.C. 154(b) by 0 days.

(21) Appl. No.: 18/726,151

(22) PCT Filed: Nov. 4, 2022

(86) PCT No.: PCT/CN2022/129863
§ 371 (c)(1),
(2) Date: Jul. 2, 2024

(87) PCT Pub. No.: WO2023/236428
PCT Pub. Date: Dec. 14, 2023

(65) Prior Publication Data
US 2025/0069026 A1      Feb. 27, 2025

(30) Foreign Application Priority Data
Jun. 7, 2022    (CN) .......................... 202210642184.6

(51) Int. Cl.
*G06Q 10/0832* (2023.01)
*B60R 25/10* (2013.01)
(Continued)

(52) U.S. Cl.
CPC ..... *G06Q 10/0832* (2013.01); *B60R 25/1004* (2013.01); *B60R 25/102* (2013.01);
(Continued)

(58) Field of Classification Search
CPC .... B60R 25/1004; B60R 25/25; B60W 40/09; G06V 20/597
See application file for complete search history.

(56) References Cited

U.S. PATENT DOCUMENTS

2008/0120203 A1      5/2008  Humprecht et al.
2009/0058593 A1*    3/2009  Breed .................. B60N 2/0025
                                                                340/5.2
(Continued)

FOREIGN PATENT DOCUMENTS

CN          102069769          5/2011
CN          102830660          12/2012
(Continued)

OTHER PUBLICATIONS

Juan Guerrero-Ibanez, Sensor Technologies for Intelligent Transportation Systems, Apr. 16, 2018 (Year: 2018).*
(Continued)

*Primary Examiner* — Ismail A Manejwala
(74) *Attorney, Agent, or Firm* — Taylor Duma LLP

(57)      ABSTRACT

The present invention discloses a vehicle transport safety monitoring system for hazardous chemicals based on all-element management. A driver holography management unit performs multi-factor identity verification and multi-dimension driver status monitoring on a driver, and implements linkage with vehicle control according to an identity verification and/or status monitoring result. A vehicle safety monitoring unit automatically monitors a vehicle safety status, and forms warning or alarm information according to a monitoring result. An in-vehicle hazardous chemical safety monitoring unit comprehensively monitors physical and chemical safety parameters of in-vehicle hazardous chemicals and in-vehicle hazardous chemical anti-theft and robbery monitoring information during transportation, and forms warning or alarm information according to a moni- (Continued)

700

| Driver holography management unit 100 | Vehicle safety monitoring unit 200 | In-vehicle hazardous chemical safety monitoring unit 300 |

Alarm prompt unit 500

In-vehicle gateway unit 400

Remote management unit 600 toring result. This system can implement comprehensive real-time monitoring and risk warning for persons, vehicles, and materials for the in-vehicle hazardous chemicals during transportation, so as to ensure transport safety of the hazardous chemicals.

18 Claims, 11 Drawing Sheets

(51) Int. Cl.

| | | |
|---|---|---|
| *B60R 25/102* | (2013.01) | |
| *B60R 25/25* | (2013.01) | |
| *B60W 40/08* | (2012.01) | |
| *B60W 40/09* | (2012.01) | |
| *G06V 20/59* | (2022.01) | |

(52) U.S. Cl.
CPC ............. *B60R 25/25* (2013.01); *B60W 40/09* (2013.01); *G06V 20/597* (2022.01); *B60W 2040/0809* (2013.01); *B60W 2040/0818* (2013.01)

(56) References Cited

U.S. PATENT DOCUMENTS

| | | | |
|---|---|---|---|
| 2010/0264728 A1* | 10/2010 | Rickrode | ............... B60R 25/10 |
| | | | 340/426.1 |
| 2020/0413458 A1* | 12/2020 | Kennedy | ................ H04L 67/12 |

FOREIGN PATENT DOCUMENTS

| | | |
|---|---|---|
| CN | 105574699 | 5/2016 |
| CN | 108809789 | 11/2018 |
| CN | 114912879 | 8/2022 |

OTHER PUBLICATIONS

Liu, Caixia; International Search Report and Written Opinion for PCT/CN2022/129863, filed Nov. 4, 2022, mailed Mar. 1, 2023, 15 pages.

* cited by examiner

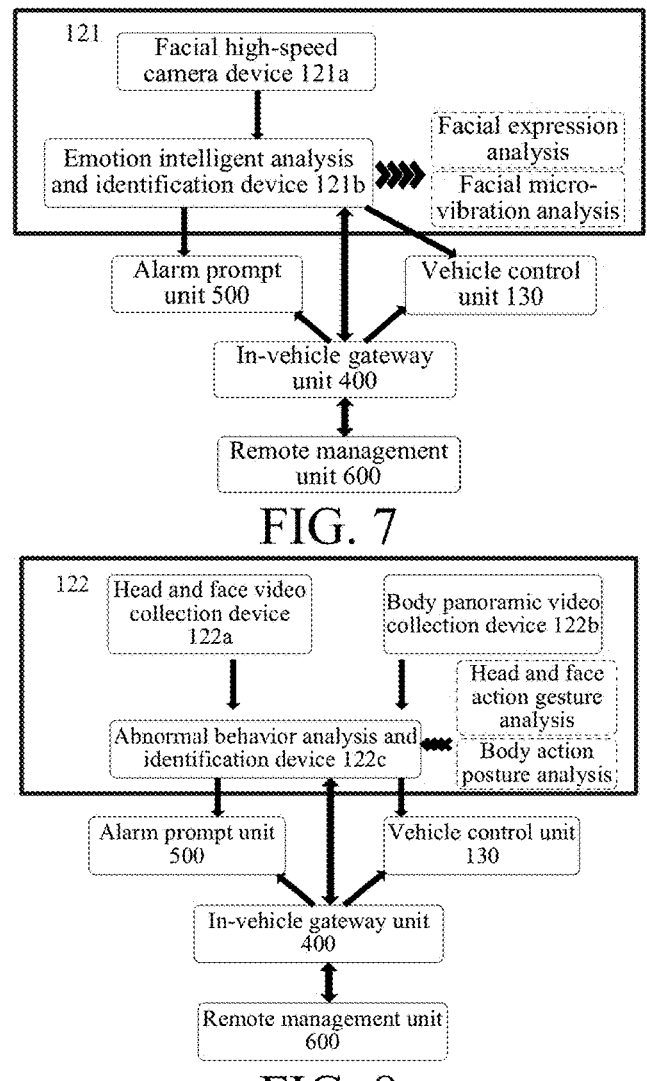
FIG. 7
FIG. 8
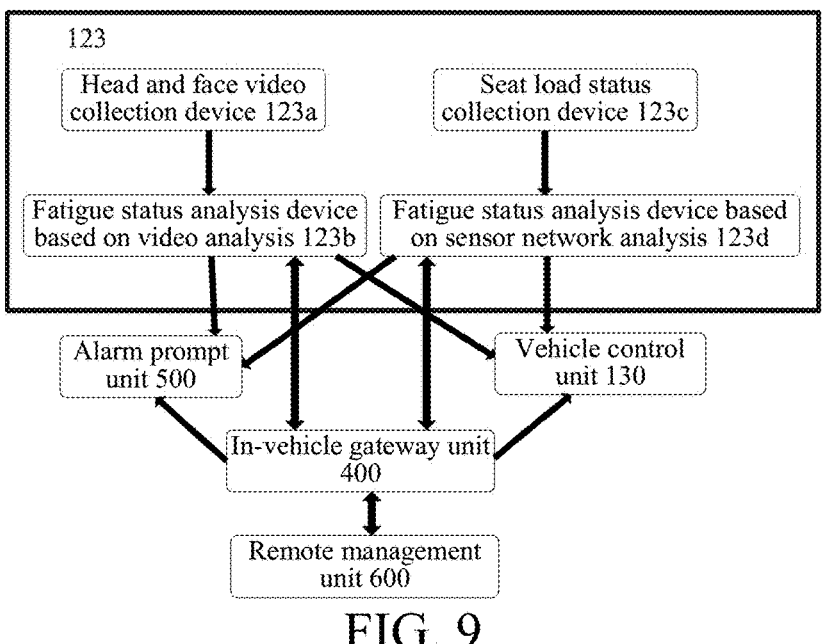
FIG. 9

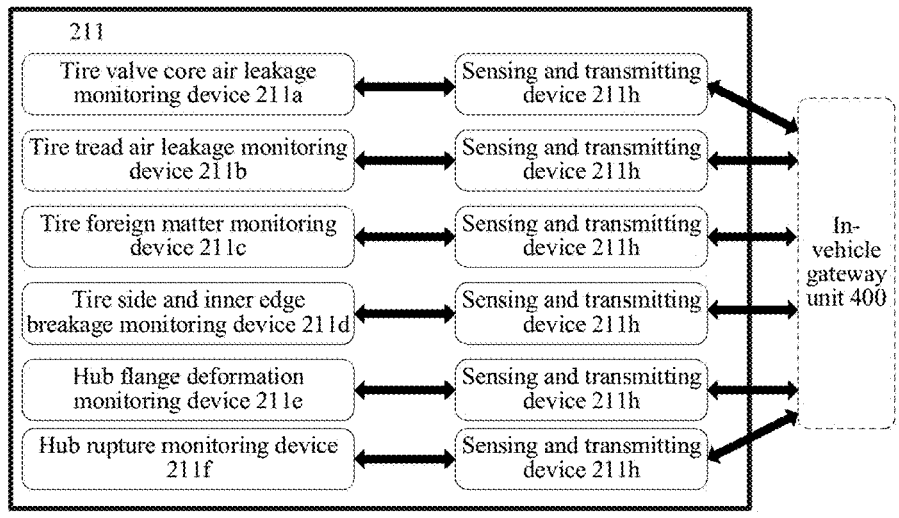
FIG. 13
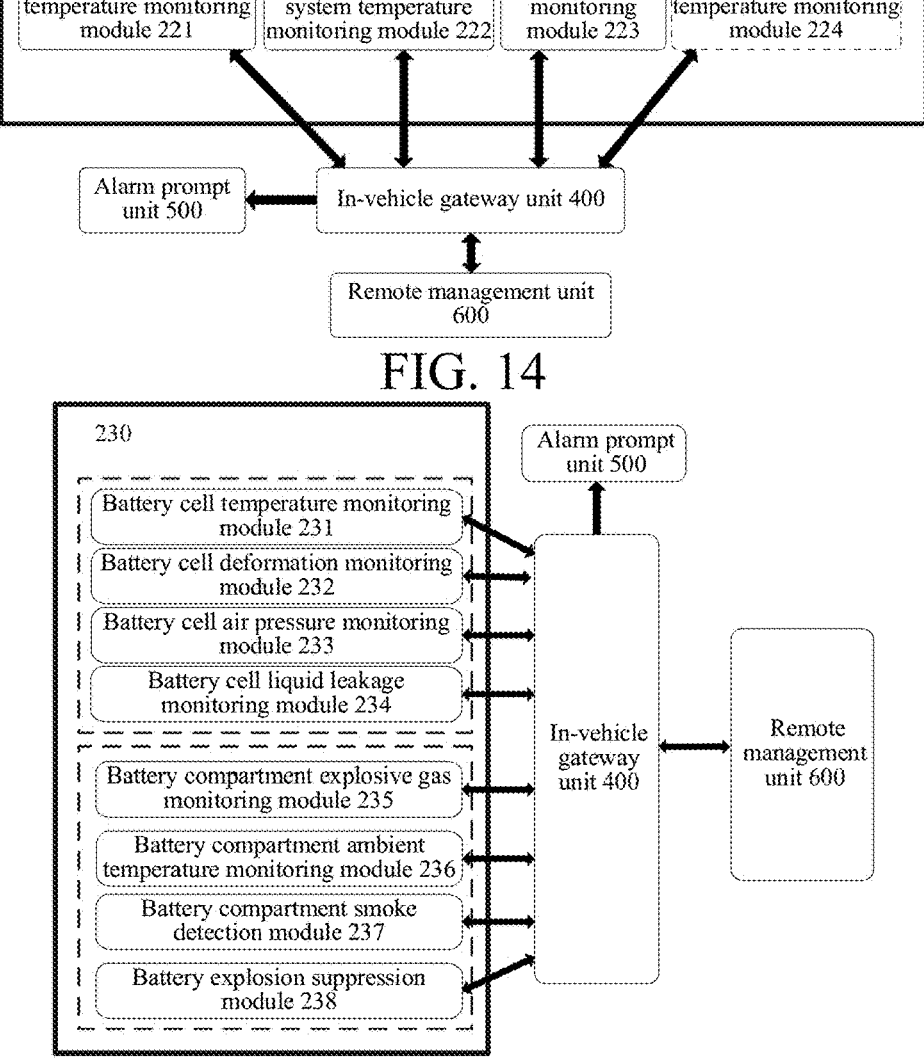
FIG. 14
FIG. 15

HAZARDOUS CHEMICAL VEHICLE TRANSPORTATION SAFETY MONITORING SYSTEM BASED ON TOTAL FACTOR MANAGEMENT

CROSS-REFERENCE TO RELATED APPLICATIONS

The present application is a National Stage application of PCT international application: PCT/CN2022/129863, filed on 4 Nov. 2022, the disclosure of which is hereby incorporated by reference in its entirety.

TECHNICAL FIELD

The present invention relates to a vehicle safety technology, and in particular, to a hazardous chemical transport safety monitoring technology.

BACKGROUND

Transport vehicles carrying hazardous chemicals are a major mobile hazard source, and are more prone to accidents than ordinary vehicles. In addition, hazardous chemical transport safety accidents are different from ordinary transport accidents. They are often of sudden, complicated and more hazardous nature, and can lead to serious consequences such as combustion, explosion and leakage, resulting in a series of social problems such as economic loss, environmental pollution, ecological damage, and casualties. Therefore, it is very important to comprehensively monitor safety of the hazardous chemical transport vehicle and in-vehicle hazardous chemicals to ensure transport safety of the hazardous chemicals.

An existing solution also provides a safety monitoring solution for a driver, a hazardous chemical transport vehicle, and in-vehicle hazardous chemicals. However, the existing monitoring solution has many limitations. First, in the existing solution, driver identity confirmation is performed only by using a driver IC card qualification certificate. A verification requirement is not raised for whether the certificate is held by the owner, and there is a risk that an unqualified driver holds another driver's IC card qualification certificate for illegal driving. For a driver status, only a single-time continuous driving time and a cumulative continuous driving time can be monitored, and it cannot be determined whether the driver has been driving for a long time before driving the current vehicle and an actual fatigue degree when driving the current vehicle. In addition, in the existing solution, only positioning data or single operating state data such as tire pressure and oil temperature of the vehicle can be monitored for the vehicle carrying hazardous chemicals, and overall monitoring of a driving vehicle status cannot be implemented. In addition, only simple physical property monitoring is performed for the in-vehicle hazardous chemicals, which makes it difficult to implement comprehensive judgment. In addition, in the existing solution, only local storage processing is performed on monitored data, and some data is uploaded to a transportation industry monitoring center for subsequent administrative management, which cannot implement real-time safety control on the vehicle and/or the driver. In addition, China implements multi-industry department multi-level management of hazardous chemicals, and insufficient application of hazardous article transport monitoring technology and poor information sharing result in difficulties in information exchange in cross-administrative regions of hazardous article vehicle transport safety management and difficult information exchange among supervisory industry departments of hazardous article vehicle transport safety management, and even seriously adversely affect rescue work in the event of a safety accident during transportation of the hazardous article.

Therefore, how to perform comprehensive real-time monitoring and risk warning on persons (a driver and/or an escort), a vehicle (a transport vehicle carrying hazardous chemicals), and a thing (in-vehicle hazardous chemicals) of a hazardous chemical transport vehicle, and perform multi-industry and multi-level real-time linkage and real-time linkage among an industry supervisory department, an enterprise, and a transport vehicle, so as to ensure transport safety of the hazardous chemicals, and eliminate various potential safety problems is a problem that needs to be urgently solved in the field.

SUMMARY

In view of existing problems in transport safety supervision of hazardous chemicals, a comprehensive and real-time safety monitoring solution is needed to implement comprehensive monitoring and risk warning on persons (a driver and/or an escort), a vehicle (a transport vehicle carrying hazardous chemicals), and a thing (in-vehicle hazardous chemicals) of a hazardous chemical transport vehicle during transportation.

Therefore, an objective of the present invention is to provide a vehicle transport safety monitoring system for hazardous chemicals based on all-element management. The safety monitoring system can perform safety monitoring synchronously from multiple aspects such as a person (a driver and/or an escort), a vehicle (a transport vehicle carrying hazardous chemicals), and a thing (in-vehicle hazardous chemical) of a hazardous chemical transport vehicle, so as to implement all-element and all-directional safety monitoring, and risk warning on the hazardous chemical transport vehicle.

To achieve the foregoing objective, the present invention provides a vehicle transport safety monitoring system for hazardous chemicals based on all-element management, including:

a driver holography management unit, where the driver holography management unit is associated with an in-vehicle gateway unit, and performs data exchange with a remote management unit by using the in-vehicle gateway unit, and the driver holography management unit is capable of performing multi-factor identity verification and multi-dimension driver status monitoring for a driver, and implementing linkage with vehicle control according to an identity verification and/or status monitoring result;

a vehicle safety monitoring unit, where the vehicle safety monitoring unit is associated with the in-vehicle gateway unit, and performs data exchange with the remote management unit by using the in-vehicle gateway unit, and the vehicle safety monitoring unit is capable of automatically monitoring a vehicle safety status, and forming warning or alarm information according to a monitoring result;

an in-vehicle hazardous chemical safety monitoring unit, where the in-vehicle hazardous chemical safety monitoring unit is associated with the in-vehicle gateway unit, and performs data exchange with the remote management unit by using the in-vehicle gateway unit; and the in-vehicle hazardous chemical safety monitoring unit is capable of comprehensively monitoring physical and chemical safety parameters of in-vehicle hazardous chemicals and anti-theft and robbery monitoring information of the in-vehicle hazardous chemicals during transportation, and forming warning or alarm information according to a monitoring result;

the in-vehicle gateway unit, where the in-vehicle gateway unit is separately associated with the driver holography management unit, the vehicle safety monitoring unit, the in-vehicle hazardous chemical safety monitoring unit, an alarm prompt unit, and the remote management unit, and establishes a communication channel among the units to complete data exchange; and the in-vehicle gateway unit is further capable of cooperating with the driver holography management unit and/or the vehicle safety monitoring unit and/or the in-vehicle hazardous chemical safety monitoring unit to complete data intelligent analysis and risk warning processing according to data collected by the corresponding unit;

the alarm prompt unit, where the alarm prompt unit is connected to the in-vehicle gateway unit, and is capable of completing a local alarm on a vehicle and/or completing a remote alarm by using the in-vehicle gateway unit associated with the remote management unit; and the remote management unit, where the remote management unit is deployed in a multi-level real-time synchronous linkage manner, is associated with the in-vehicle gateway unit, is indirectly associated with the driver holography management unit, the vehicle safety monitoring unit, the in-vehicle hazardous chemical safety monitoring unit, and the alarm prompt unit by using the in-vehicle gateway unit, and is capable of receiving warning or alarm information sent by the in-vehicle gateway unit, and when receiving a high-risk-level warning or alarm, forming emergency disposal and emergency rescue management information according to an emergency plan requirement; and the remote management unit is further capable of cooperating with the driver holography management unit and/or the vehicle safety monitoring unit and/or the in-vehicle hazardous chemical safety monitoring unit to complete data intelligent analysis and risk warning processing according to data collected by the corresponding unit.

Further, the driver holography management unit includes:

a driver identity verification subunit, where the driver identity verification subunit may collect current driver certificate information and biometric feature information, perform person-certificate consistency comparison on currently collected real-time driver identity information and biometric feature information and comparison and verification with driver identity information and/or biometric feature information that have been stored in an authorized driver database, and control a working status of a vehicle start system according to a verification result;

a driver status monitoring subunit, where the driver status monitoring subunit monitors an emotion and/or a driving behavior and/or a physical fatigue status of the driver in real time, performs emotion identification and/or behavior analysis and/or fatigue status determining, directly associates with a vehicle control subunit according to a real-time emotion identification result and/or abnormal behavior analysis result and/or fatigue status determination result, or associates with the vehicle control subunit by using the in-vehicle gateway unit, to control a vehicle running status; and the vehicle control subunit, where the vehicle control subunit links with a start system, a speed control system, and a braking system of the vehicle, and is associated with the in-vehicle gateway unit, the driver identity verification subunit, and the driver status monitoring subunit, and the vehicle control subunit controls, according to a driver identity verification result sent by the driver identity verification subunit or sent by the in-vehicle gateway unit, whether the vehicle can be started; and control a vehicle driving status according to a driver real-time emotion status analysis result, driving behavior analysis result, and fatigue status determination result that are sent by the driver status monitoring subunit or the in-vehicle gateway unit.

Further, the driver identity verification subunit includes an identity certificate reading module, a biometric feature information collection module, and a biometric feature information comparison module;

the identity certificate reading module is configured to: obtain identity information of a certificate held by a current driver, and transmit the obtained identity information of the certificate to the biometric feature information comparison module thereof, or a biometric feature information comparison module of the in-vehicle gateway unit, or a biometric feature information comparison module of the remote management unit by using the in-vehicle gateway unit;

the biometric feature information collection module is configured to: obtain biometric feature information of the current driver, and send the obtained information to a biometric feature information comparison module thereof, the biometric feature information comparison module of the in-vehicle gateway unit, or the biometric feature information comparison module of the remote management unit by using the in-vehicle gateway unit; and the biometric feature information comparison module is configured to compare and verify biometric feature information corresponding to the obtained identity information of the certificate held by the driver with the biometric feature information of the current driver, and confirm whether the information belongs to a same person; and is configured to compare and verify the obtained identity information of the certificate held by the driver and the biometric feature information of the current driver with the driver identity information and the biometric feature information that have been stored in the authorized driver database, to determine whether the current driver is authorized.

Further, the identity certificate reading module of the driver identity verification subunit includes a second-generation resident identity card reading device, an IC card qualification certificate reading device and/or a motor vehicle driving license reading device and/or another certificate reading device.

Further, the biometric feature information collection module of the driver identity verification subunit includes a face information collection device, a fingerprint information collection device, an iris information collection device, a finger vein information collection device, a palm vein information collection device, a palmprint information collection device, a retina information collection device, a sound information collection device, or another biometric feature information collection device.

Further, the biometric feature information comparison module of the driver identity verification subunit includes a face information comparison device, a fingerprint information comparison device, an iris information comparison device, a finger vein information comparison device, a palm vein information comparison device, a palmprint information comparison device, a retina information comparison device, a sound information comparison device, or another biometric feature information comparison device.

Further, the driver identity verification subunit is directly associated with the vehicle control subunit or is indirectly associated with the vehicle control subunit and/or the remote management unit by using the in-vehicle gateway unit.

Further, the driver status monitoring subunit includes a real-time emotion identification module and/or an abnormal behavior monitoring module and/or a fatigue status monitoring module;

the real-time emotion identification module is configured to: obtain a facial expression dynamics of the current driver, and transmit the obtained facial expression dynamics to an intelligent emotion analysis module thereof, an intelligent emotion analysis module of the in-vehicle gateway unit, or an intelligent emotion analysis module of the remote management unit by using the in-vehicle gateway unit;

the abnormal behavior monitoring module is configured to: obtain a face action or a body action of the current driver, and transmit the obtained face action or body action to an abnormal behavior analysis module thereof, an abnormal behavior analysis module of the in-vehicle gateway unit, or an abnormal behavior analysis module of the remote management unit by using in-vehicle gateway unit; and the fatigue status monitoring module is configured to: obtain fatigue status monitoring information of the current driver, and send the obtained information to a fatigue status determining module thereof, a fatigue status determining module of the in-vehicle gateway unit, or a fatigue status determining module of the remote management unit by using the in-vehicle gateway unit.

Further, the real-time emotion identification module of the driver status monitoring subunit includes a facial high-speed camera device and an emotion intelligent analysis and identification device;

the facial high-speed camera device is configured to collect a facial expression dynamics of the current driver; and the emotion intelligent analysis and identification device is configured to: perform intelligent analysis and identification on the facial expression dynamics collected by the facial high-speed camera device, and determine a real-time emotion status of the current driver.

Further, the abnormal behavior monitoring module of the driver status monitoring subunit includes a head and face video collection device, a body panoramic video collection device, and an abnormal behavior analysis and identification device;

the head and face video collection device is configured to collect a head and face action of the current driver;

the body panoramic video collection device is configured to collect a body action gesture of the current driver; and the abnormal behavior analysis and identification device is configured to: perform intelligent analysis and identification on the head and face action collected by the head and face video collection device and the body action posture collected by the body panoramic video collection device, to determine whether a real-time behavior status of the current driver is abnormal.

Further, the fatigue status monitoring module of the driver status monitoring subunit includes a head and face video collection device, a fatigue status analysis device based on video analysis, a seat load status collection device, and a fatigue status analysis device based on sensor network analysis;

the head and face video collection device is configured to collect a head and face action of the current driver;

the fatigue status analysis device based on video analysis is configured to perform intelligent analysis and identification on the head and face action collected by the head and face video collection device to determine a real-time fatigue degree of the current driver;

the seat load status collection device is configured to collect a load distribution situation and a load status change situation of different positions of a seat under the driver; and the fatigue status analysis device based on sensor network analysis is configured to perform intelligent analysis and identification on the load situations and the load status change situations that are of different positions of the seat under the driver and that are collected by the seat load status collection device, so as to determine a real-time fatigue degree of the current driver.

Further, the driver status monitoring subunit is directly associated with a vehicle control subunit or is indirectly associated with a vehicle control subunit and/or the remote management unit by using the in-vehicle gateway unit.

Further, the alarm prompt unit is directly associated with the driver identity verification subunit, the driver status monitoring subunit, and the in-vehicle gateway unit.

Further, the vehicle control subunit includes an ACC vehicle start control module and/or an anti-lock module and/or a speed limit management module and/or an intelligent brake management module and/or an electronic control brake assist module;

the ACC vehicle start control module is configured to determine, according to a received driver identity verification result, whether to allow to enable a vehicle switch, allow the vehicle to start when the driver identity verification result is passed, and not allow the vehicle to start when the driver identity verification result is not passed;

the anti-lock module is configured to: when an abnormal driver status monitoring result is received, prevent potential loss of vehicle driving direction control or skidding during emergency braking;

the speed limit management module is configured to control a maximum vehicle driving speed when an abnormal driver status monitoring result is received;

the intelligent brake management module is configured to enable an intelligent braking device to reduce a real-time vehicle driving speed when an abnormal driver status monitoring result is received; and the electronic control brake assist module is configured to quickly enable all braking forces when emergency braking is required when an abnormal driver status monitoring result is received.

Further, the vehicle control subunit is directly associated with the driver identity verification subunit, the driver status monitoring subunit, and the in-vehicle gateway unit. When the vehicle control subunit receives a driver identity verification pass result or receives a driver identity verification pass result forwarded by the driver identity verification subunit by using the in-vehicle gateway unit, the vehicle control subunit controls the vehicle ACC to be enabled. When the vehicle control subunit receives a driver identity verification failure result, the vehicle control subunit controls the vehicle ACC to be disabled. When the vehicle control subunit receives an abnormal driver status detection result, the vehicle control subunit controls the vehicle to limit the speed, slow down, or perform emergency braking.

Further, the vehicle safety monitoring unit includes:

a real-time tire pressure monitoring and warning subunit, where the real-time tire pressure monitoring and warning subunit is associated with the in-vehicle gateway unit, and is associated with the alarm prompt unit and the remote management unit by using the in-vehicle gateway unit; and the real-time tire pressure monitoring and warning subunit may collect various pieces of information related to tire pressure in real time, and perform tire air leakage, in-tire pressure, and in-tire temperature analysis, and risk warning directly or in cooperation with the in-vehicle gateway unit according to the collected information;

a vehicle overheat monitoring and warning subunit, where the vehicle overheat monitoring and warning subunit is associated with the in-vehicle gateway unit, and is associated with the alarm prompt unit and the remote management unit by using the in-vehicle gateway unit; and the vehicle overheat monitoring and warning subunit may collect, in real time, temperature information of a component that is on the current vehicle and is directly related to the vehicle running status, and determine, according to the collected information, whether the vehicle is overheated and has a risk of combustion and explosion or damage directly or in cooperation with the in-vehicle gateway unit.

Further, the real-time tire pressure monitoring and warning subunit includes a tire air leakage monitoring module, a tire low pressure monitoring module, and a tire temperature monitoring module.

The tire air leakage monitoring module is configured to: obtain real-time information about whether air leakage exists on each tire of the vehicle, and send the obtained information to the in-vehicle gateway unit or the remote management unit by using the in-vehicle gateway unit;

the tire low pressure monitoring module is configured to: obtain real-time information of tire pressure statuses of the vehicle, and send the obtained information to the in-vehicle gateway unit or the remote management unit by using the in-vehicle gateway unit; and the tire temperature monitoring module is configured to: obtain real-time information about a temperature status inside each tire of the vehicle, and send the obtained information to the in-vehicle gateway unit or the remote management unit by using the in-vehicle gateway unit.

Further, the tire air leakage monitoring module of the real-time tire pressure monitoring and warning subunit includes a tire valve core air leakage monitoring device, a tire tread air leakage monitoring device, a tire foreign matter monitoring device, a tire side and inner edge breakage monitoring device, a hub flange deformation sensing and monitoring device, a hub rupture monitoring device, and a corresponding sensing and transmitting device; and the tire valve core air leakage monitoring device is configured to collect air flow information near a tire valve core; the tire tread air leakage monitoring device is configured to collect whether there is a tread with slow air leakage on a surface of a tire; the tire foreign matter monitoring device is configured to monitor whether a foreign matter that may cause tire air leakage is inserted into the tire; the tire side and inner edge breakage monitoring device is configured to monitor whether a tire side and inner edge are broken; the hub flange deformation sensing and monitoring device is configured to monitor a deformation status of a hub flange; and the hub rupture monitoring device is configured to monitor whether a vehicle hub is ruptured.

Further, the tire low pressure monitoring module of the real-time tire pressure monitoring and warning subunit includes a direct tire pressure monitoring device, an indirect tire pressure monitoring device, and a corresponding sensing and transmitting device;

the direct tire pressure monitoring device is configured to directly collect real-time internal tire pressure value information; and the indirect tire pressure monitoring device is configured to: collect a real-time speed difference of different tires of the vehicle, and determine wheel rolling radius consistency according to the speed difference, so as to determine whether a tire is in a low air pressure state.

Further, the tire temperature monitoring module of the real-time tire pressure monitoring and warning subunit includes a temperature sensing and monitoring device in each tire and a sensing and transmitting device corresponding thereto.

Further, the vehicle overheat monitoring and warning subunit includes an engine/motor temperature monitoring module, a differential lock system temperature monitoring module, a tire temperature monitoring module, and/or an exhaust pipe temperature monitoring module;

the engine/motor temperature monitoring module is configured to: obtain real-time temperature information of a vehicle engine/motor, and transmit the obtained information to the in-vehicle gateway unit or the remote management unit by using the in-vehicle gateway unit;

the differential lock system temperature monitoring module is configured to: obtain real-time temperature information of a vehicle differential lock system, and transmit the obtained information to the in-vehicle gateway unit or the remote management unit by using the in-vehicle gateway unit;

the tire temperature monitoring module is configured to: obtain real-time temperature information of a vehicle tire, and transmit the obtained information to the in-vehicle gateway unit or the remote management unit by using the in-vehicle gateway unit; and the exhaust pipe temperature monitoring module is configured to: obtain real-time temperature information of an exhaust pipe of a fuel vehicle, and transmit the obtained information to the in-vehicle gateway unit or the remote management unit by using the in-vehicle gateway unit.

Further, the vehicle overheat monitoring and warning subunit is directly associated with the in-vehicle gateway unit. Various temperature monitoring devices of the engine/motor temperature monitoring module, the differential lock system temperature monitoring module, the tire temperature monitoring module, and/or the exhaust pipe temperature monitoring module aggregate monitoring data into the in-vehicle gateway unit, and perform intelligent analysis by using the in-vehicle gateway unit. When a temperature analysis result of a corresponding monitored object triggers the vehicle overheat monitoring and warning, the in-vehicle gateway unit gives a corresponding alarm prompt to the alarm prompt unit, and uploads alarm prompt information to the remote management unit by using the in-vehicle gateway unit.

Further, the monitoring system further includes a new energy vehicle lithium-ion power battery explosion prevention and control subunit, where a sensor of the new energy vehicle lithium-ion power battery explosion prevention and control subunit is disposed in a new energy vehicle lithium-ion power battery cell and a battery compartment, is associated with the in-vehicle gateway unit, and is associated with the alarm prompt unit and the remote management unit by using the in-vehicle gateway unit; and the new energy vehicle lithium-ion power battery explosion prevention and control subunit may collect a battery cell temperature, battery cell deformation, battery cell air pressure, battery cell liquid leakage, battery compartment explosive gas concentration, battery compartment ambient temperature, and battery compartment smoke information of the current vehicle; and directly determine, through calculation, whether the vehicle power battery has an explosion risk or a combustion risk according to the collected information or through cooperation with the in-vehicle gateway unit, and enable a battery explosion suppression function when it is determined that a monitoring information analysis result is higher than a related set threshold to trigger an alarm of a hazard of the power battery cell or a hazard of the battery compartment.

Further, the new energy vehicle lithium-ion power battery explosion prevention and control subunit includes one or more of a battery cell temperature monitoring module, a battery cell deformation monitoring module, a battery cell air pressure monitoring module, a battery cell liquid leakage monitoring module, a battery compartment explosive gas monitoring module, a battery compartment ambient temperature monitoring module, a battery compartment smoke detection module, and a battery explosion suppression module;

the battery cell temperature monitoring module is configured to: obtain cell real-time temperature information of a vehicle power battery, and transmit the obtained information to the in-vehicle gateway unit or to the remote management unit by using the in-vehicle gateway unit;

the battery cell deformation monitoring module is configured to: obtain cell real-time deformation information of the vehicle power battery, and transmit the obtained information to the in-vehicle gateway unit or the remote management unit by using the in-vehicle gateway unit;

the battery cell air pressure monitoring module is configured to: obtain cell real-time air pressure information of the vehicle power battery, and transmit the obtained information to the in-vehicle gateway unit or the remote management unit by using the in-vehicle gateway unit;

the battery cell liquid leakage monitoring module is configured to: obtain cell real-time leakage information of the vehicle power battery, and transmit the obtained information to the in-vehicle gateway unit or the remote management unit by using the in-vehicle gateway unit;

the battery compartment explosive gas monitoring module is configured to: obtain a composition and real-time concentration information of an explosive gas in a vehicle power battery compartment, and transmit the obtained information to the in-vehicle gateway unit or the remote management unit by using the in-vehicle gateway unit;

the battery compartment ambient temperature monitoring module is configured to: obtain ambient temperature information of the vehicle power battery compartment, and transmit the obtained information to the in-vehicle gateway unit or the remote management unit by using the in-vehicle gateway unit;

the battery compartment smoke detection module is configured to: obtain information about whether smoke exists in the vehicle power battery compartment, and transmit the obtained information to the in-vehicle gateway unit or the remote management unit by using the in-vehicle gateway unit; and the battery compartment battery explosion suppression module is configured to cut off a power supply or perform fire suppression and explosion prevention processing when lithium-ion power battery explosion warning information occurs.

Further, the battery cell temperature monitoring module of the new energy vehicle lithium-ion power battery explosion prevention and control subunit includes a battery cell internal temperature sensing and monitoring device and/or a battery cell internal resistance tomography device and a sensing and transmitting device corresponding thereto.

Further, the battery cell deformation monitoring module of the new energy vehicle lithium-ion power battery explosion prevention and control subunit includes a battery cell internal deformation sensing and monitoring device and/or a battery cell surface variable resistance monitoring device and a sensing and transmitting device corresponding thereto.

Further, the battery cell air pressure monitoring module of the new energy vehicle lithium-ion power battery explosion prevention and control subunit includes a battery cell internal air pressure monitoring device and a sensing and transmitting device corresponding thereto.

Further, the battery cell liquid leakage monitoring module of the new energy vehicle lithium-ion power battery explosion prevention and control subunit includes a battery bus insulation impedance monitoring device and/or a battery positive and negative bus current monitoring device, and/or a VOC volatile detection device and a corresponding sensing and transmitting device.

Further, the battery compartment explosive gas monitoring module of the new energy vehicle lithium-ion power battery explosion prevention and control subunit includes one or more of a CO explosive gas detection, sensing, and monitoring device, an H2 explosive gas detection, sensing, and monitoring device, a CH4 explosive gas detection, sensing, and monitoring device, a VOC volatile detection device, and the like, and a sensing and transmitting device corresponding thereto.

Further, the battery compartment smoke detection module of the new energy vehicle lithium-ion power battery explosion prevention and control subunit includes one or more of an ionization smoke detector, an optoelectronic smoke detector, an infrared beam smoke detector, a video analysis smoke detector, a light-sensitive fire detector, and a video analysis flame detector, and a sensing and transmitting device corresponding thereto.

Further, the battery compartment battery explosion suppression module of the new energy vehicle lithium-ion power battery explosion prevention and control subunit includes a circuit controller and/or an intelligent circuit breaker and/or a lithium-ion battery box fire suppression device and/or an automatic fire suppression linkage control device.

Further, the new energy vehicle lithium-ion power battery explosion prevention and control subunit is directly associated with the in-vehicle gateway unit, and various sensing and monitoring modules aggregate monitoring data into the in-vehicle gateway unit for intelligent analysis. When a monitoring analysis result of a corresponding monitored object triggers a lithium-ion power battery explosion warning, a corresponding alarm instruction is issued to the alarm prompt unit by using the in-vehicle gateway unit, and the alarm prompt information is uploaded to the remote management unit by using the in-vehicle gateway unit.

Further, the in-vehicle hazardous chemical safety monitoring unit includes:

an in-vehicle hazardous chemical physical and chemical safety monitoring and warning subunit, where the in-vehicle hazardous chemical physical and chemical safety monitoring and warning subunit is associated with the in-vehicle gateway unit, and is associated with the alarm prompt unit and the remote management unit by using the in-vehicle gateway unit; and the in-vehicle hazardous chemical physical and chemical safety monitoring and warning subunit is capable of monitoring physical and chemical safety parameters of in-vehicle hazardous chemicals in real time, performing physical and chemical safety warning analysis of the in-vehicle hazardous chemicals directly or in cooperation with the in-vehicle gateway unit according to monitored information, generating warning information when a physical and chemical safety risk of the in-vehicle hazardous chemicals occurs, sending the warning information to the remote management unit by using the in-vehicle gateway unit, and sending a warning by using the alarm prompt unit;

an in-vehicle hazardous chemical anti-theft and robbery monitoring and warning subunit, where the in-vehicle hazardous chemical anti-theft and robbery monitoring and warning subunit is associated with the in-vehicle gateway unit, and is associated with the alarm prompt unit and the remote management unit by using the in-vehicle gateway unit; and the in-vehicle hazardous chemicals anti-theft and robbery monitoring and warning subunit is capable of monitoring anti-theft and robbery safety information of the in-vehicle hazardous chemicals in real time, performing warning analysis on risks of theft or robbery or loss of a vehicle loaded with hazardous chemicals and the hazardous chemicals on the vehicle directly or in cooperation with the in-vehicle gateway unit, generating warning information when the risks occur, sending the warning information to the remote management unit by using the in-vehicle gateway unit, and sending a warning by using the alarm prompt unit; and a hazardous chemical transport emergency rescue guide subunit, where the hazardous chemical transport emergency rescue guide subunit is set to be associated with the in-vehicle gateway unit, and is associated with the alarm prompt unit and the remote management unit by using the in-vehicle gateway unit; and the hazardous chemical transport emergency rescue guide subunit is capable of being linking with the in-vehicle hazardous chemical physical and chemical safety monitoring and warning subunit and the in-vehicle hazardous chemical anti-theft and robbery monitoring and warning subunit, and forming emergency disposal on-site guide information for a vehicle driver when the vehicle triggers in-vehicle hazardous chemical physical and chemical safety monitoring and warning and in-vehicle hazardous chemical anti-theft and robbery monitoring and warning.

Further, the in-vehicle hazardous chemical physical and chemical safety monitoring and warning subunit includes one or more of a temperature monitoring module, a humidity monitoring module, a pressure monitoring module, a vibration monitoring module, and a leakage monitoring module;

the temperature monitoring module is configured to: obtain real-time information about a temperature of the in-vehicle hazardous chemicals, a temperature in a vehicle compartment, or a temperature of a tank, and transmit the obtained information to the in-vehicle gateway unit or the remote management unit by using the in-vehicle gateway unit;

the humidity monitoring module is configured to: obtain real-time information about humidity of the in-vehicle hazardous chemicals and humidity in the vehicle compartment, and transmit the obtained information to the in-vehicle gateway unit or the remote management unit by using the in-vehicle gateway unit;

the pressure monitoring module is configured to: obtain pressure of the in-vehicle hazardous chemicals and real-time information about pressure in the vehicle compartment or the tank, and transmit the obtained information to the in-vehicle gateway unit or the remote management unit by using the in-vehicle gateway unit;

the vibration monitoring module is configured to: obtain real-time information about vibration at a position of the vehicle compartment or the tank in which the in-vehicle hazardous chemicals are loaded, and transmit the obtained information to the in-vehicle gateway unit or the remote management unit by using the in-vehicle gateway unit; and the leakage monitoring module is configured to: obtain a leakage situation of the in-vehicle hazardous chemicals and real-time information of a gas leakage situation in the vehicle compartment loaded with the in-vehicle hazardous chemicals or a liquid or gas leakage situation of a tank outlet, and transmit the obtained information to the in-vehicle gateway unit or the remote management unit by using the in-vehicle gateway unit.

Further, various monitoring devices of the temperature monitoring module, the humidity monitoring module, the pressure monitoring module, the vibration monitoring module, and the leakage monitoring module in the in-vehicle hazardous chemical physical and chemical safety monitoring and warning subunit aggregate monitoring information to a data storage module of the in-vehicle gateway unit, and perform warning analysis by using the in-vehicle gateway unit. When a monitoring result of temperature, humidity, pressure, vibration strength, or leakage is higher than a specified threshold and the hazardous chemicals may burn, explode, or leak, a corresponding alarm prompt is given to the alarm prompt unit by using the in-vehicle gateway unit, and the alarm prompt information is uploaded to the remote management unit by using the in-vehicle gateway unit.

Further, the in-vehicle hazardous chemical anti-theft and robbery monitoring and warning subunit includes one or more of a vehicle anti-theft alarm module, a vehicle anti-robbery monitoring module, a vehicle anti-theft and robbery positioning and tracking module, a vehicle fuel tank safety monitoring module, a door control intrusion detection module, a cargo anti-theft video monitoring module, and/or a hazardous chemical cargo automatic inventory module;

the vehicle anti-theft alarm module is configured to: monitor an unauthorized position movement or an abnormal start situation in a vehicle parked state, and transmit monitoring information to a data storage module or an edge computing module of the in-vehicle gateway unit, or the remote management unit by using a network communication module of the in-vehicle gateway unit;

the vehicle anti-robbery module is configured to: monitor an armed person and a non-normal person aggregation situation around the vehicle, and transmit monitoring information to the in-vehicle gateway unit or the remote management unit by using the in-vehicle gateway unit;

the vehicle anti-theft and robbery positioning and tracking module is configured to: perform positioning and tracking on a real-time position of the vehicle after an anti-theft and robbery alarm is triggered, and transmit tracked positioning information to the remote management unit by using the in-vehicle gateway unit;

the vehicle fuel tank safety monitoring module is configured to: perform real-time video monitoring on a position of a fuel tank of a truck loaded with hazardous chemicals, and transmit monitoring information to the in-vehicle gateway unit or directly to the remote management unit by using the in-vehicle gateway unit;

the door control intrusion detection module is configured to: monitor a door body of a vehicle compartment of a truck loaded with a hazardous chemical cargo or an oil pump inlet/outlet pipe/an oil drain valve of a tank truck, and transmit monitoring information to the in-vehicle gateway unit or directly to the remote management unit by using the in-vehicle gateway unit;

the cargo anti-theft video monitoring module is configured to: perform video monitoring on an internal cargo situation of a closed van loaded with hazardous chemicals and all openings of a tank truck, and transmit monitoring information to the in-vehicle gateway unit or directly to the remote management unit by using the in-vehicle gateway unit; and the hazardous chemical cargo automatic inventory module is configured to: perform real-time registration on a quantity change in a loading process and a quantity change in an unloading process of the hazardous chemical cargo, perform quantity inventory on the transported hazardous chemical cargo regularly or irregularly, and transmit registration and inventory information to the in-vehicle gateway unit or directly to the remote management unit by using the in-vehicle gateway unit.

Further, the vehicle anti-theft alarm module of the in-vehicle hazardous chemical anti-theft and robbery monitoring and warning subunit includes a direct contact sensor and/or a current and voltage drop sensor and/or an ultrasonic sensor and/or a microwave sensor and/or a vibration sensor and/or a tilt sensor.

Further, the vehicle anti-robbery monitoring module of the in-vehicle hazardous chemical anti-theft and robbery monitoring and warning subunit includes one or more of an outboard video monitoring apparatus, a hidden alarm button, a wireless transmitting pinhole video camera, a warning lamp, an off-vehicle tear gas ejector, and another self-defense equipment.

Further, the vehicle anti-theft and robbery positioning and tracking module of the in-vehicle hazardous chemical anti-theft and robbery monitoring and warning subunit includes one or more of a deep sleep type tracking locator, a solar charger, and a pinhole infrared camera at a driver's position.

Further, the vehicle fuel tank safety monitoring module of the in-vehicle hazardous chemical anti-theft and robbery monitoring and warning subunit includes one or more of an infrared detector disposed on a fuel tank cover, a vibration sensor, a liquid level sensor disposed in the fuel tank, and/or a pinhole infrared camera that can monitor a fuel tank position in real time.

Further, the door control intrusion detection module of the in-vehicle hazardous chemical anti-theft and robbery monitoring and warning subunit includes one or more of a door controller disposed in a vehicle compartment door of a truck loaded with a hazardous chemical cargo or an oil pump inlet/outlet pipe/an oil drain valve of a tank truck, a passive infrared intrusion detector and/or an active infrared intrusion detector and/or a microwave intrusion detector and/or a radar microwave intrusion detector and/or a switch type microwave detector and/or an ultrasonic detector and/or a sound control detector and/or a wireless magnetic switch detector, a vibration sensor, a pinhole camera in a position capable of monitoring a van vehicle compartment door or an oil pump inlet/outlet pipe/an oil drain valve of a tank truck in real time.

Further, the cargo anti-theft video monitoring module of the in-vehicle hazardous chemical anti-theft and robbery monitoring and warning subunit includes cargo image monitoring cameras disposed at four corners of the vehicle compartment, and a process monitoring camera disposed inside the vehicle compartment and facing the vehicle compartment door.

Further, the hazardous chemical cargo automatic inventory module of the in-vehicle hazardous chemical anti-theft and robbery monitoring and warning subunit includes a scanner or a radio frequency identification card reader disposed at a door of a vehicle compartment, and a barcode label, a two-dimensional code label, or a radio frequency identification electronic tag disposed on a packaging of the hazardous chemical cargo.

Further, the vehicle anti-theft alarm module, the vehicle anti-robbery monitoring module, the vehicle anti-theft and robbery positioning and tracking module, the vehicle fuel tank safety monitoring module, the door control intrusion detection module, the cargo anti-theft video monitoring module, and/or the hazardous chemical cargo automatic inventory module in the in-vehicle hazardous chemical anti-theft and robbery monitoring and warning subunit aggregate monitoring data to the in-vehicle gateway unit, and perform anti-theft and robbery risk warning analysis by using the in-vehicle gateway unit. When a corresponding anti-theft and robbery warning is triggered, the in-vehicle gateway unit gives a corresponding warning to the alarm prompt unit, and uploads alarm prompt information to the remote management unit by using the in-vehicle gateway unit.

Further, the hazardous chemical transport emergency rescue guide subunit includes an emergency rescue guide information module, a voice broadcast module, and an automatic push module;

the emergency rescue guide information module is configured to provide emergency rescue guide information for hazardous chemicals;

the voice broadcast module is configured to instruct a driver and a passenger to perform preliminary emergency disposal by playing emergency rescue guide information in real time via voice when a warning or alarm occurs; and the automatic push module is configured to: when a warning or alarm occurs, push an emergency rescue guide information file in real time to instruct a driver and a passenger to perform preliminary emergency disposal.

Further, the in-vehicle gateway unit includes a network communication module and/or a data storage module and/or an edge computing module.

Further, the alarm prompt unit includes a vehicle local alarm prompt subunit and a remote monitoring client software alarm prompt subunit.

Further, the remote management unit includes a government industry management client subunit, an enterprise operation and management client subunit, a driver and passenger service client subunit, and a communication center;

the government industry management client subunit is configured to: receive and display identity verification information, real-time monitoring information, and/or hazard warning or alarm information that are sent by an in-vehicle terminal of a hazardous article transport vehicle for a driver driving a hazardous chemical transport vehicle and/or a vehicle carrying hazardous chemicals and/or in-vehicle hazardous chemicals, and is capable of transmitting a related management instruction according to the received warning or alarm information, starting an emergency management procedure, and issuing a related emergency disposal instruction; and the in-vehicle terminal of the hazardous article transport vehicle is formed by the driver holography management unit, the vehicle safety monitoring unit, the in-vehicle hazardous chemical safety monitoring unit, and the in-vehicle gateway unit through cooperation;

the enterprise operation and management client subunit is configured to receive and display the identity verification information, the real-time monitoring information, and/or the hazard warning or alarm information that are sent by the in-vehicle terminal of the hazardous article transport vehicle for the driver driving a hazardous chemical transport vehicle and/or the vehicle carrying hazardous chemicals and/or the in-vehicle hazardous chemicals; is capable of transmitting a related management instruction according to the received warning or alarm information, starting an emergency management procedure, and issuing a related emergency disposal instruction; and when receiving high-risk-level hazard warning or alarm information, starting the emergency management procedure, issuing a related emergency disposal instruction, issuing an emergency alarm to the government industry management client subunit, and issuing a related emergency disposal instruction;

the driver and passenger service client subunit is configured to: receive and display the identity verification information, the real-time monitoring information, and/or the hazard warning or alarm information that are sent by the in-vehicle terminal of a hazardous article transport vehicle for the driver driving a hazardous chemical transport vehicle and/or the vehicle carrying hazardous chemicals and/or the in-vehicle hazardous chemicals, and is capable of generating a corresponding alarm prompt and/or an emergency disposal guide solution corresponding to the warning or alarm information according to the received hazard warning or alarm information; and the communication center is configured to store the identity verification information, the real-time monitoring information, and/or the hazard warning or alarm information that are sent by the in-vehicle terminal of a hazardous article transport vehicle for the driver driving a hazardous chemical transport vehicle and/or the vehicle carrying hazardous chemicals and/or the in-vehicle hazardous chemicals, and/or is configured to intelligently identify and analyze the received information, and separately forward the received information and/or an analysis result to the government industry management client subunit, the enterprise operation and management client subunit, and the driver and passenger service client subunit; and the communication center also serves as a computer system environment of the government industry management client subunit, the enterprise operation and management client subunit, and the driver and passenger service client subunit, supports a related software application, and forwards a management instruction or a response instruction of the government industry management client subunit, the enterprise operation and management client subunit, and the driver and passenger service client subunit to the in-vehicle terminal of the hazardous article transport vehicle.

Further, the government industry management client subunit includes public safety industry management client software, transportation industry management client software, emergency industry management client software, and another industry management client software according to different supervisory industry departments;

the public safety industry management client software is configured to: receive the identity verification information, the real-time monitoring information, and/or the hazard warning or alarm information that are sent by the in-vehicle terminal of a hazardous article transport vehicle and forwarded by the communication center for the driver driving a hazardous chemical transport vehicle and/or the vehicle carrying hazardous chemicals and/or the in-vehicle hazardous chemicals, send a traffic management instruction to an on-duty traffic police at a position of the vehicle according to an information type, send a corresponding vehicle and position traffic accident handling instruction to a related traffic accident handler, and send 120 emergency rescue linkage management information according to an emergency plan setting; and the public safety industry management client software is further capable of sending warning information to the enterprise operation and management client subunit and the driver and passenger service client subunit, and sending linkage management information according to the emergency plan setting;

the transportation industry management client software is configured to: receive the identity verification information, the real-time monitoring information, and/or the hazard warning or alarm information that are sent by the in-vehicle terminal of a hazardous article transport vehicle and forwarded by the communication center for the driver driving a hazardous chemical transport vehicle and/or the vehicle carrying hazardous chemicals and/or the in-vehicle hazardous chemicals, send a management instruction to a related traffic safety responsible department according to the information type, and send other linkage management information according to emergency plan setting; and the transportation industry management client software is further capable of sending warning information to the enterprise operation and management client subunit and the driver and passenger service client subunit, and sending linkage management information according to the emergency plan setting;

the emergency industry management client software is configured to: receive the identity verification information, the real-time monitoring information, and/or the hazard warning or alarm information that are sent by the in-vehicle terminal of a hazardous article transport vehicle and forwarded by the communication center for the driver driving a hazardous chemical transport vehicle and/or the vehicle carrying hazardous chemicals and/or the in-vehicle hazardous chemicals, send an emergency disposal instruction to a related emergency rescue person according to an information type, a vehicle type, a type of loaded cargo of a freight vehicle, and behavior status information of the driver, and send other linkage management information according to emergency plan setting; and the another industry management client software is configured to: receive the identity verification information, the real-time monitoring information, and/or the hazard warning or alarm information that are sent by the in-vehicle terminal of a hazardous article transport vehicle and forwarded by the communication center for the driver driving a hazardous chemical transport vehicle and/or the vehicle carrying hazardous chemicals and/or the in-vehicle hazardous chemicals, and is capable of enabling an insurance claim service according to an information situation, and sending other linkage management information according to emergency plan setting.

Further, the public safety industry management client software can be used for driver identity verification management, driver identity management, driver abnormal behavior and fatigue status monitoring alarm, vehicle safety monitoring alarm, and in-vehicle hazardous article safety monitoring alarm.

Further, the transportation industry management client software can be used for driver identity verification management, driver permission supervision, driver abnormal behavior and fatigue status monitoring, driver and passenger file management, driver behavior evaluation, vehicle safety monitoring alarm, and in-vehicle hazardous article safety monitoring alarm.

Further, the emergency industry management client software can be further used for driver identity verification management, driver abnormal behavior and fatigue status monitoring alarm, vehicle safety monitoring alarm, and in-vehicle hazardous article safety monitoring alarm.

Further, the enterprise operation and management client subunit includes a consigner department management client software, a carrier department management client software, and a consignee department management client software according to different users;

the consigner department management client software is configured to receive and display safety tracking and query information of a cargo consignment vehicle, and query a hazardous cargo electronic waybill and driver identity information;

the carrier department management client software is configured to: receive and display the identity verification information, the real-time monitoring information, and/or the hazard warning or alarm information that are sent by the in-vehicle terminal of a hazardous article transport vehicle and forwarded by the communication center for the driver driving a hazardous chemical transport vehicle and/or the vehicle carrying hazardous chemicals and/or the in-vehicle hazardous chemicals, and when receiving the warning or alarm information, send emergency rescue guide information and/or warning information to the driver and passenger service client subunit; and when receiving a high-risklevel warning or alarm, send emergency rescue guide information and/or warning information to the driver and passenger service client subunit, and immediately send linkage alarm information to the government industry management client subunit synchronously according to emergency plan setting; and the consignee department management client software is configured to receive and display the safety tracking and query information of the cargo consignment vehicle, and query the hazardous cargo electronic waybill and the driver identity information.

Further, the carrier department management client software can be used for driver identity verification management, driver abnormal behavior and fatigue status monitoring, driver driving overtime alarm management, driver and passenger file management, driver behavior evaluation, vehicle safety monitoring alarm, and in-vehicle hazardous article safety monitoring alarm. The driver identity verification management of the carrier department management client software supports remote driver permission authorization and remote emergency start vehicle ACC switch, and statistics collection, analysis, and query of received driver and passenger identity verification results and driver and passenger identity information, and a comparison analysis result of them and driver and passenger archival information and electronic waybill scheduling information of the current department.

Further, the driver and passenger service client subunit includes driver service client software, escort service client software, and stevedore service client software according to different users;

the driver service client software is configured to receive and display the identity verification information, the real-time monitoring information, and/or the hazard warning or alarm information that are sent by the in-vehicle terminal of a hazardous article transport vehicle and forwarded by the communication center for the driver driving a hazardous chemical transport vehicle and/or the vehicle carrying hazardous chemicals and/or the in-vehicle hazardous chemicals; and at the same time, receive and display emergency rescue guide information sent by the enterprise operation and management client subunit, or display emergency rescue guide information or a driving instruction automatically pushed after related warning or alarm information is triggered; and the driver service client software supports feedback of a risk check situation and a disposal result to the government industry management client subunit and the enterprise operation and management client subunit after the driver completes risk check;

the escort service client software is configured to receive and display the identity verification information, the real-time monitoring information, and/or the hazard warning or alarm information that are sent by the in-vehicle terminal of a hazardous article transport vehicle and forwarded by the communication center for the driver driving a hazardous chemical transport vehicle and/or the vehicle carrying hazardous chemicals and/or the in-vehicle hazardous chemicals; at the same time, receive and display emergency rescue guide information sent by the enterprise operation and management client subunit, or display emergency rescue guide information automatically pushed after related warning or alarm information is triggered; after receiving a risk alert sent by the government industry management client subunit and the enterprise operation and management client subunit, the escort service client software is capable of generating corresponding warning information; and the escort service client software supports an escort to feed back a risk check situation and a disposal result to the government industry management client and the carrier department management client after the driver completes risk check; and the stevedore service client software is configured to: receive and display a hazardous cargo road transport electronic waybill and a quantity change and inventory information in a hazardous article loading and unloading process, and support query of a type, a quantity, a loading and unloading requirement, a physical characteristic, a chemical characteristic, a physical and chemical hazard, and corresponding emergency rescue guide information of currently loaded hazardous articles.

Further, the driver service client software can be used for driver identity verification management, driver abnormal behavior and fatigue status monitoring, driver driving overtime alarm management, vehicle safety monitoring alarm, and in-vehicle hazardous article safety monitoring alarm. The escort service client software can be used for driver identity verification management, escort identity verification management, driver abnormal behavior and fatigue status monitoring, driver driving overtime alarm management, vehicle safety monitoring alarm, and in-vehicle hazardous article safety monitoring alarm.

Further, the communication center includes a cloud platform and/or a local server and a personal mobile intelligent terminal;

the cloud platform is configured to store data information and alarm information uploaded by the in-vehicle terminal of a hazardous article transport vehicle, receive data of the government industry management client software/the enterprise operation and management client software/the driver and passenger service client software, invoke a shared data resource pool, support a computer hardware platform environment to which the government industry management client software/the enterprise operation and management client software/ the driver and passenger service client software is applied, and support communication and interaction between the government industry management client software/the enterprise operation and management client software/the driver and passenger service client software and the in-vehicle gateway unit;

the local storage server is configured to separately store the data information and the alarm information uploaded by the in-vehicle terminal of a hazardous article transport vehicle, receive the data of the government industry management client software/the enterprise operation and management client software/ the driver and passenger service client software, invoke a database, support the computer hardware platform environment to which the government industry management client software/the enterprise operation and management client software/the driver and passenger service client software is applied, and support communication and interaction between the government industry management client software/the enterprise operation and management client software/the driver and passenger service client software and the in-vehicle gateway unit; and the personal handheld intelligent terminal is configured to store the data information and the alarm information uploaded by the in-vehicle terminal of a hazardous article transport vehicle, an online query tool and temporary storage space for the data information uploaded by the government industry management client software/the enterprise operation and management client software/the driver and passenger service client software, support a microcomputer hardware platform environment to which the government industry management client software/the enterprise operation and management client software/the driver and passenger service client software is applied, and support communication and interaction between the government industry management client software/the enterprise operation and management client software/ the driver and passenger service client software and the in-vehicle gateway unit.

The vehicle transport safety monitoring system for hazardous chemicals based on all-element management provided in the present invention can perform comprehensive real-time monitoring and risk warning on persons (a driver and/or an escort), a vehicle (a transport vehicle carrying hazardous chemicals), and a thing (hazardous chemicals) of a hazardous chemical transport vehicle, and can perform multi-industry multi-level linkage management and control, so as to ensure transport safety of the hazardous chemicals and eliminate various potential safety hazards.

In this system, for the driver and/or the escort driving a hazardous chemical vehicle, identity verification based on a biometric feature identification technology can be performed on an authorized vehicle driver, and a start permission of the vehicle is controlled according to a driver identity verification result. The dynamic facial expression or the facial vibration amplitude, the face action and body action posture of the driver in the driving process, and the load situations of different areas of the seat under the driver can be monitored in real time. The real-time emotional status of the driver is comprehensively analyzed, whether there is abnormal behavior affecting safe driving is intelligently identified, and the real-time fatigue degree of the driver is strictly determined. According to the results of analysis, identification, and determining of emotional status, abnormal behavior monitoring and real-time fatigue status, the vehicle is automatically controlled to automatically limit the speed, decelerate or perform emergency braking, and give a voice prompt or audible and visual alarm at the same time. Effective warning and active intervention are performed on potential accident risks that may be caused by driver factors to prevent the driver from driving the vehicle in an abnormal mood state, driving the vehicle in a fatigue status, or doing an abnormal behavior that endangers driving safety. It is ensured that the driver safely drives the vehicle in a normal mood state, mental state, and physical state, and that the vehicle performs active intelligent safety prevention and control when the driver has an abnormal mood, an abnormal behavior, or a fatigue status, so as to improve vehicle running safety. In addition, in this system, the driver identity can be bound to a driving permission of a specified operating vehicle and a start permission of a specific vehicle. Meanwhile, the emotion, driving behavior, and fatigue status of the driver in the driving process are monitored in real time, and the vehicle driving status is automatically controlled in a manner of actively driving auxiliary safety prevention and control according to a monitoring result, so as to form a safety warning to the driver, thereby ensuring the vehicle running safety from the perspective of the driver.

The system can automatically monitor vehicle safety monitoring information for vehicles carrying hazardous chemicals. When a hazard occurs on a vehicle, the system gives an audible and visual warning or alarm or a voice prompt to the driver, prompts the driver to get off the vehicle for check and processing in time, and automatically disposes the power battery explosion warning condition by using a battery explosion suppression module or the like, so as to prevent traffic safety accidents and vehicle spontaneous combustion and vehicle explosion events caused by vehicle tire burst, vehicle overheat, and power battery explosion. In addition, the system improves the safety of all types of fuel vehicles and new energy vehicles through comprehensive monitoring of vehicle safety elements. By uploading vehicle safety monitoring warning or alarm information in real time to enterprises to which the vehicle belongs and the supervisory industry department, the system reserves valuable golden disposal time for early deployment of emergency rescue and disposal forces and rapid start of emergency rescue, increases the emergency response speed and rescue efficiency of the enterprises to which the vehicle belongs and the supervisory industry department, and prevents traffic accident consequences or expansion of vehicle spontaneous combustion and vehicle explosion accidents, and ensures people's safety and property.

For the hazardous chemicals carried, the system can perform comprehensive and real-time monitoring on the temperature of the in-vehicle hazardous chemicals and the temperature in the vehicle compartment, the humidity of the in-vehicle hazardous chemicals and the humidity in the vehicle compartment, the pressure of the in-vehicle hazardous chemicals and the pressure in the vehicle compartment or the tank, the vibration of the vehicle compartment or the position of the tank carrying the in-vehicle hazardous chemicals, the leakage of the in-vehicle hazardous chemicals, the gas leakage in the vehicle compartment carrying the in-vehicle hazardous chemicals or the liquid or gas leakage at the outlet of the tank; and comprehensively determine whether the hazardous chemicals are at risk of combustion, explosion, or leakage. When the hazardous chemicals are at risk of combustion, explosion, or leakage when the temperature, humidity, pressure, vibration intensity or leakage monitoring result is higher than a set threshold, the system sends warning information to trigger a warning. The warning information is sent to the remote management unit through the network communication module of the in-vehicle gateway unit, while a local warning sound, light or voice prompt is sent by using the alarm prompt unit to the driver to stop the vehicle for check. In addition, the system can monitor the unauthorized position movement or abnormal start status in the vehicle parked state, an armed person and a non-normal person aggregation situation around the vehicle, track the real-time position after the vehicle triggers the anti-theft and robbery emergency alarm, perform real-time video monitoring on the fuel tank position of the truck loaded with hazardous chemicals, the cargo inside the closed vans loaded with hazardous chemicals and all openings of the tank truck, register in real time the quantity change in the loading process and the quantity change in the unloading process of the hazardous chemicals, inventory the quantity of the hazardous chemicals regularly or irregularly, and comprehensively determine whether the vehicle loaded with hazardous chemicals and the hazardous chemicals on the vehicle are at risk of being stolen, robbed, or lost. When the monitoring result or the intelligent analysis result of the monitored object triggers a theft or robbery warning or alarm, the network communication module of the in-vehicle gateway unit sends warning or alarm information to the remote management unit, and simultaneously the alarm prompt unit sends corresponding local warning sound and light or voice to prompt the driver to stop the vehicle for check or prepare for defending.

BRIEF DESCRIPTION OF THE DRAWINGS

The following further describes the present invention with reference to the accompanying drawings and specific implementations.

FIG. 7 is a schematic diagram of a composition principle and a use procedure of an emotion identification module of a driver status monitoring subunit according to an embodiment of the present invention;

FIG. 8 is a schematic diagram of a composition principle and a use procedure of an abnormal behavior identification module of a driver status monitoring subunit according to an embodiment of the present invention;

FIG. 9 is a schematic diagram of a composition principle and a use procedure of a fatigue status monitoring module of a driver status monitoring subunit according to an embodiment of the present invention;

FIG. 13 is a schematic diagram of a tire air leakage monitoring module of a real-time tire pressure monitoring and warning subunit according to an embodiment of the present invention;

FIG. 14 is a schematic diagram of a composition principle and a use procedure of a vehicle overheat monitoring and warning subunit according to an embodiment of the present invention;

FIG. 15 is a schematic diagram of a composition principle and a use procedure of a new energy vehicle lithium-ion power battery explosion prevention and control subunit according to an embodiment of the present invention;

DETAILED DESCRIPTION

To make the technical means, creation features, objectives, and effects implemented in the present invention easy to understand, the following further describes the present invention with reference to specific drawings.

To solve the problem that the existing safety supervision solution for vehicle transport of hazardous chemicals cannot effectively and comprehensively monitor a hazardous chemical transport vehicle, this example provides a vehicle transport safety monitoring system for hazardous chemicals based on all-element management. The system can implement comprehensive real-time monitoring and risk warning on persons (a driver and/or an escort), a vehicle (a transport vehicle carrying hazardous chemicals), and a thing (in-vehicle hazardous chemicals) of the hazardous chemical transport vehicle, and can perform multi-industry multi-level linkage management and control, so as to ensure transport safety of the hazardous chemicals.

Figure 1:
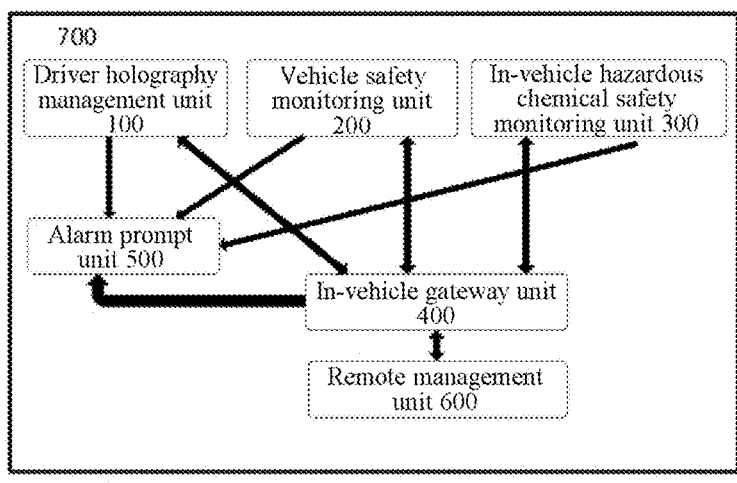
FIG. 1 is a schematic diagram of an overall composition principle of a vehicle transport safety monitoring system for hazardous chemicals based on all-element management according to an embodiment of the present invention.

FIG. 1 is a schematic diagram of a composition principle and a use procedure of a vehicle transport safety monitoring system for hazardous chemicals based on all-element management according to an example.

Based on FIG. 1, a vehicle transport safety monitoring system 700 for hazardous chemicals provided in this example mainly includes a driver holography management unit 100, a vehicle safety monitoring unit 200, an in-vehicle hazardous chemical safety monitoring unit 300, an in-vehicle gateway unit 400, an alarm prompt unit 500, and a remote management unit 600 that cooperate with each other.

The driver holography management unit 100 in this system is associated with the in-vehicle gateway unit 400, and performs data exchange with the remote management unit 600 by using the in-vehicle gateway unit 400, and the driver holography management unit 100 is capable of performing multi-factor identity verification and multi-dimension driver status monitoring for a driver, and implementing linkage with vehicle control according to an identity verification and/or status monitoring result.

The vehicle safety monitoring unit 200 is associated with the in-vehicle gateway unit, and performs data exchange with the remote management unit 600 by using the in-vehicle gateway unit 400, and the vehicle safety monitoring unit 200 is capable of automatically monitoring a vehicle safety status, and forming warning or alarm information according to a monitoring result.

The in-vehicle hazardous chemical safety monitoring unit 300 in this system is associated with the in-vehicle gateway unit 400, and performs data exchange with the remote management unit 600 by using the in-vehicle gateway unit 400; and the in-vehicle hazardous chemical safety monitoring unit 300 is capable of comprehensively monitoring physical and chemical safety parameters of in-vehicle hazardous chemicals and anti-theft and robbery monitoring information of the in-vehicle hazardous chemicals during transportation, and forming warning or alarm information according to a monitoring result.

The in-vehicle gateway unit 400 in this system is separately associated with the driver holography management unit 100, the vehicle safety monitoring unit 200, the in-vehicle hazardous chemical safety monitoring unit 300, the alarm prompt unit 500, and the remote management unit 600, and establishes a communication channel among the units to complete data exchange; and the in-vehicle gateway unit 400 is further capable of cooperating with the driver holography management unit 100 and/or the vehicle safety monitoring unit 200 and/or the in-vehicle hazardous chemical safety monitoring unit 300 to complete risk warning processing according to data collected by the corresponding unit.

The alarm prompt unit 500 in the system is connected to the in-vehicle gateway unit 400, and is capable of completing a local alarm on a vehicle and/or completing a remote alarm by using the in-vehicle gateway unit associated with the remote management unit.

The remote management unit 600 in the system is deployed in a multi-level linkage manner, is associated with the in-vehicle gateway unit 400, is indirectly associated with the driver holography management unit 100, the vehicle safety monitoring unit 200, the in-vehicle hazardous chemical safety monitoring unit 300, and the alarm prompt unit 500 by using the in-vehicle gateway unit 400, and is capable of receiving warning or alarm information sent by the in-vehicle gateway unit 400, and when receiving a high-risk-level warning or alarm, forming emergency disposal and emergency rescue management information according to an emergency plan requirement.

The following describes a specific composition solution of the vehicle transport safety monitoring system for hazardous chemicals based on all-element management in this example.

Figure 2:
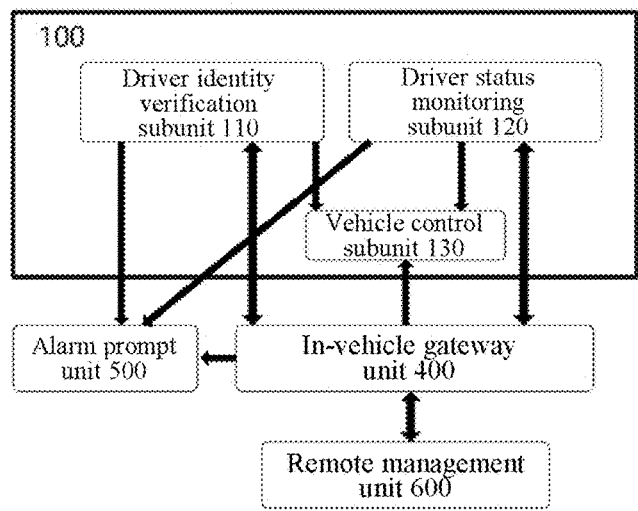
FIG. 2 is a schematic diagram of an overall composition principle of a driver holography management unit according to an embodiment of the present invention.

FIG. 2 is a schematic diagram of an overall composition principle of the driver holography management unit 100 in the system.

As shown in FIG. 2, the driver holography management unit 100 mainly includes a driver identity verification subunit 110, a driver status monitoring subunit 120, and a vehicle control subunit 130 that cooperate with each other.

The driver identity verification subunit 110 in this system is specifically disposed in a cab of a to-be-monitored vehicle, and is associated with the in-vehicle gateway unit 400, the alarm prompt unit 500, and the vehicle control subunit 130 of the vehicle, and can be associated with the remote management unit 600 by using the in-vehicle gateway unit 400.

The driver identity verification subunit 110 herein may collect current driver certificate information and biometric feature information, or may simultaneously collect a plurality of pieces of certificate information or biometric feature information, which may be specifically set according to an actual requirement.

The driver identity verification subunit 110 may store driver identity information and corresponding biometric feature information.

Alternatively, the driver identity verification subunit 110 may store the driver identity information and the corresponding biometric feature information into a data storage module of the in-vehicle gateway unit 400, or wirelessly connect the remote management unit 600 by using a network communication module of the in-vehicle gateway unit 400, and obtain the driver identity information and the corresponding biometric feature information from the remote management unit.

The driver identity verification subunit 110 can further perform person-certificate consistency comparison on currently collected real-time driver identity information and corresponding biometric feature information and comparison and verification with driver identity information and/or corresponding biometric feature information that have been stored in an authorized driver database, and control a working status of a vehicle start system according to a verification result.

Figure 3:
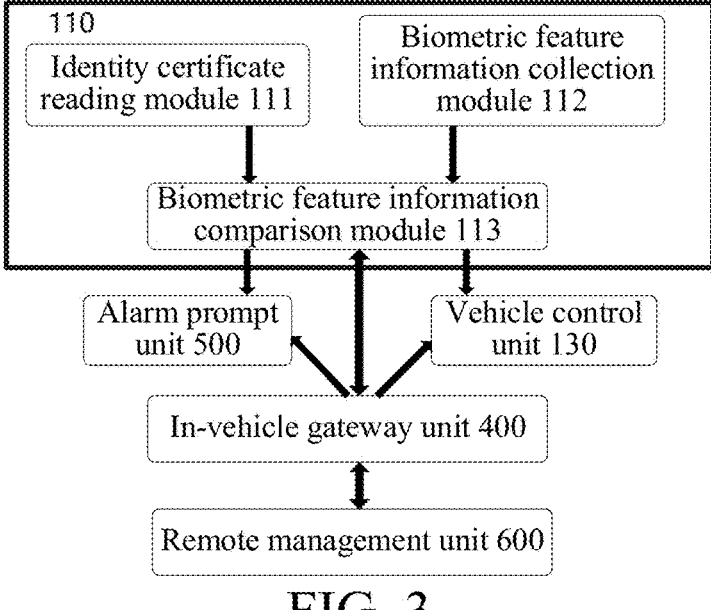
FIG. 3 is a schematic diagram of a composition principle and a use procedure of a driver identity verification subunit according to an embodiment of the present invention.

FIG. 3 is a schematic diagram of a composition principle and a use procedure of the driver identity verification subunit 110 in this example.

As shown in FIG. 3, the driver identity verification subunit 110 in the vehicle transport safety monitoring system mainly includes an identity certificate reading module 111, a biometric feature information collection module 112, and a biometric feature information comparison module 113 that cooperate with each other.

The identity certificate reading module 111 herein is configured to: obtain identity information of a certificate held by a current driver, and transmit the obtained identity information of the certificate to the biometric feature information comparison module 113 thereof, or a corresponding biometric feature information comparison function module (such as a corresponding edge computing module) of the in-vehicle gateway unit 400, or a biometric feature information comparison function module of the remote management unit 600 by using the in-vehicle gateway unit 400.

The biometric feature information collection module 112 is configured to: obtain biometric feature information of the current driver, and send the obtained information to a biometric feature information comparison module 113 thereof, a corresponding biometric feature information comparison function module of the in-vehicle gateway unit 400, or the biometric feature information comparison function module (such as a corresponding edge computing module) of the remote management unit 600 by using the in-vehicle gateway unit 400.

The biometric feature information comparison module 113 is configured to compare and verify biometric feature information corresponding to the obtained identity information of the certificate held by the driver with the biometric feature information of the current driver, and confirm whether the information belongs to a same person.

Based on FIG. 2 and FIG. 3, the driver identity verification subunit 110 disposed in this way facilitates collection of the current driver certificate information by using the identity certificate reading module 111, collection of the current driver biometric feature information by using the biometric feature information collection module 112, and comparison and verification are performed, by using the biometric feature information comparison module 113, on the driver certificate information collected by the identity certificate reading module 111, and the driver biometric feature information collected by using the biometric feature information collection module 112, with the authorized driver identity information and the corresponding biometric feature information that have been stored in the biometric feature information comparison module 113 and/or stored in the in-vehicle gateway unit 400 and/or stored in the remote management unit 600.

When the driver identity verification subunit 110 performs driver identity verification by using the biometric feature information comparison module 113, a corresponding vehicle control instruction such as a vehicle start instruction is formed according to an identity verification result.

For example, when the driver identity verification subunit 110 passes driver identity verification, the driver identity verification subunit 110 may directly send start allowed instruction information to the vehicle control subunit 130, or send the start allowed instruction information to the in-vehicle gateway unit 400, and forward the start allowed instruction information to the vehicle control subunit 130 by using the in-vehicle gateway unit 400. In this way, after receiving the corresponding control instruction, the vehicle control subunit 130 may start the vehicle ACC according to instruction linkage.

When the driver identity verification fails, the driver identity verification subunit 110 may directly send start not allowed instruction information to the vehicle control subunit 130, and send audible and visual alarm information and voice prompt information to the alarm prompt unit 500. As an alternative solution, the start not allowed instruction information, the audible and visual alarm information, and the voice prompt information may also be sent to the in-vehicle gateway unit 400, the start not allowed instruction information is forwarded to the vehicle control subunit 130 by using the in-vehicle gateway unit 400, and the audible and visual alarm information and the voice prompt information are forwarded to the alarm prompt unit 500.

In this way, after receiving the start not allowed instruction information, the vehicle control subunit 130 synchronously disables the vehicle ACC. At the same time, the alarm prompt unit 500 synchronously sends, according to the received audible and visual alarm information and/or voice prompt information, an audible and visual alarm indicating that verification fails and/or a voice prompt indicating the driver to re-collect the biometric feature information and check the certificate.

After the identity verification is completed, the driver identity verification subunit 110 uploads a verification result and a vehicle start status to the remote management unit 600 by using the in-vehicle gateway unit 400.

It should be noted herein that the driver identity verification subunit 110 in this unit may not include the biometric feature information comparison module 113. Alternatively, the driver identity verification subunit 110 cooperates with the remote management unit 600 to implement driver identity verification. For example, a corresponding biometric feature database and a comparison and identification component run in the remote management unit 600, so as to implement remote biometric feature information comparison.

In this case, when the driver identity verification subunit 110 in this unit performs driver identity verification, the identity certificate reading module 111 may be used to collect the current driver identity certificate information and the biometric feature information collection module 112 may be used to collect the current driver biometric feature information. After the corresponding information is collected, the in-vehicle gateway unit 400 uploads the collected information to the remote management unit 600. After performing biometric feature information comparison and identification, the remote management unit 600 returns a verification result to the in-vehicle gateway unit 400. The in-vehicle gateway unit 400 sends an instruction to the vehicle control subunit 130.

In this way, when the verification succeeds, the remote management unit 600 sends a start allowed instruction to the vehicle control subunit 130 by using the in-vehicle gateway unit 400. When the verification fails, the remote management unit 600 sends a start not allowed instruction to the vehicle control subunit 130 by using the in-vehicle gateway unit 400, and sends a verification failure alarm to the alarm prompt unit 500 by using the in-vehicle gateway unit 400, and instructs the driver to adjust the posture to re-collect the biometric feature information and check the certificate.

In a special state, the remote management unit 600 may send a dedicated instruction to the driver identity verification subunit 110 by using the in-vehicle gateway unit 400, to perform remote emergency authorization for the driver or emergent enabling of the vehicle ACC switch.

Based on FIG. 2, the driver status monitoring subunit 120 in this embodiment is disposed in the cab of the to-be-monitored vehicle, is associated with the in-vehicle gateway unit 400, the alarm prompt unit 500, and the vehicle control subunit 130 of the vehicle, and is associated with the remote management unit 600 by using the in-vehicle gateway unit 400.

The driver status monitoring subunit 120 can monitor an emotion and/or a driving behavior and/or a fatigue status of the driver in real time, and may perform emotion identification and/or behavior analysis and/or fatigue status determining by using an edge computing module constructed by the status monitoring unit, or by using an edge computing module of the in-vehicle gateway unit 400 or may transmit it to the remote management unit 600 by using a network communication module of the in-vehicle gateway unit 400 for emotion identification and/or behavior analysis and/or fatigue status determining. In addition, the driver status monitoring subunit 120 can directly associate with the vehicle control subunit 130 or associate with the vehicle control subunit 130 by using the in-vehicle gateway unit 400 according to a management instruction generated according to a real-time emotion identification result and/or abnormal behavior analysis result and/or fatigue status determination result or a related emotion identification result and/or abnormal behavior analysis result and/or fatigue status determination result obtained from the remote management unit by using the in-vehicle gateway unit to control a working status of an anti-lock braking system (ABS) module, a speed limit management module, an intelligent brake management module, or an electronic brake assist (EBA) module to perform a speed limit, speed control, or deceleration operation.

Figure 6:
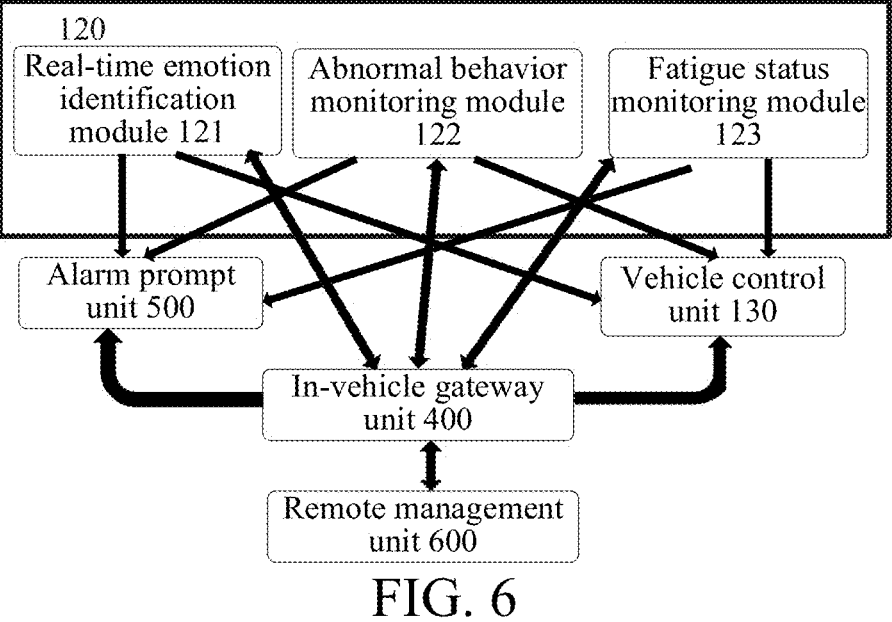
FIG. 6 is a schematic diagram of a composition principle and a use procedure of a driver status monitoring subunit according to an embodiment of the present invention.

FIG. 6 is a schematic diagram of a composition principle and a use procedure of the driver status monitoring subunit 120 according to this example.

Based on FIG. 6, the driver status monitoring subunit 120 provided in this embodiment includes a real-time emotion identification module 121 and/or an abnormal behavior monitoring module 122 and/or a fatigue status monitoring module 123 that cooperate with each other or work independently.

The real-time emotion identification module 121 in this unit is configured to: obtain a facial expression motion of a current driver, and transmit the obtained facial expression motion to an intelligent emotion analysis function module thereof (for example, an edge computing module constructed by the driver status monitoring subunit 120), an intelligent emotion analysis function module of the in-vehicle gateway unit (for example, an edge computing module constructed by the in-vehicle gateway unit), or an intelligent emotion analysis function module of the remote management unit by using the in-vehicle gateway unit.

The abnormal behavior monitoring module 122 in this unit is configured to: obtain a face action or a body action of the current driver, and transmit the obtained face action or body action to an abnormal behavior analysis function module thereof (for example, the edge computing module constructed by the driver status monitoring subunit 120), an abnormal behavior analysis function module of the in-vehicle gateway unit (for example, the edge computing module constructed by the in-vehicle gateway unit), or an abnormal behavior analysis function module in the remote management unit by using the in-vehicle gateway unit.

The fatigue status monitoring module 123 in this unit is configured to: obtain fatigue status monitoring information of the current driver, and transmit the obtained information to a fatigue status determining function module thereof (for example, the edge computing module constructed by the driver status monitoring subunit 120), a fatigue status determining function module of the in-vehicle gateway unit (for example, the edge computing module constructed by the in-vehicle gateway unit), or a fatigue status determining function module of the remote management unit by using the in-vehicle gateway unit.

A solution of the edge computing module constructed by the driver status monitoring subunit 120 is not limited herein, and may be determined according to an actual requirement. For example, it may be implemented based on an edge computing module that comes with hardware of the driver status monitoring subunit 120.

Based on FIG. 1 and FIG. 6, the driver status monitoring subunit 120 disposed in this way may collect the facial expression motion of the current driver by using the real-time emotion identification module 121 and/or perform intelligent analysis and identification on the collected facial expression motion, so as to determine the real-time emotion status of the current driver.

The driver status monitoring subunit 120 may collect, by using the abnormal behavior monitoring module 122, a head and face action and a body action posture of the current driver, and/or perform multiple intelligent analysis and identification on the head and face action collected by a head and face video collection device and the body action posture collected by a body panoramic video collection device, so as to determine whether a real-time behavior status of the current driver is abnormal.

The driver status monitoring subunit 120 may collect, by using the fatigue status monitoring module 123, a face action of the current driver and/or perform intelligent analysis and identification on a head and face action collected by the head and face video collection device, so as to determine a real-time fatigue degree of the current driver. On this basis, it may further cooperate to perform intelligent analysis and identification by collecting a load situation and a load status change situation of a seat under the driver's body, so as to determine the real-time fatigue degree of the current driver; alternatively, intelligent analysis and identification are directly performed on the load status and the load status change situation that are of the driver's seat at different points and that are collected by the seat load collection device, so as to determine the real-time fatigue degree of the current driver.

When the driver status monitoring subunit 120 performs intelligent analysis and identification, a corresponding edge computing module is constructed in the driver status monitoring subunit 120 to perform intelligent analysis and identification.

Alternatively, a corresponding edge computing module may further run in the in-vehicle gateway unit 400, so as to perform intelligent analysis and identification.

As an alternative, intelligent analysis and identification can also be performed in the remote management unit 600.

In this way, when the driver status monitoring subunit 120 is running, for data detected by a corresponding monitoring module, the driver status monitoring subunit 120 may use the edge computing module constructed in the driver status monitoring subunit 120, or may use the edge computing module of the in-vehicle gateway unit 400 or the network communication module of the in-vehicle gateway unit 400 to transmit the data to the remote management unit 600 for emotion identification and/or behavior analysis and/or fatigue status determining.

The driver status monitoring subunit 120 directly associates with the vehicle control subunit 130 or associates with the vehicle control subunit 130 by using the in-vehicle gateway unit 400 according to a real-time emotion identification result and/or abnormal behavior analysis result and/or fatigue status determination result or a management instruction generated according to a related emotion identification result and/or abnormal behavior analysis result and/or fatigue status determination result obtained from the remote management unit 600 by using the in-vehicle gateway unit 400 to control a working status of an anti-lock braking system (ABS) module, a speed limit management module, an intelligent brake management module, or an electronic brake assist (EBA) module to perform a speed limit, speed control, or deceleration operation, so as to manage and control the vehicle running status.

As shown in FIG. 2, the vehicle control subunit 130 in the driver holography management unit 100 is disposed in the cab of the to-be-monitored vehicle, and is associated with the driver identity verification subunit 110, the driver status monitoring subunit 120, the in-vehicle gateway unit 400, and the remote management unit 600 of the vehicle.

The vehicle control subunit 130 is disposed in the vehicle cab or a vehicle engine compartment, is associated with a start system, a speed control system, and a brake system of the vehicle, is associated with the in-vehicle gateway unit 400, the driver identity verification subunit 110, and the driver status monitoring subunit 120, and is associated with the alarm prompt unit 500, the remote management unit 600, and/or the driver identity verification subunit 110 and/or the driver status monitoring subunit 120 by using the in-vehicle gateway unit 400.

The vehicle control subunit 130 can control, according to the driver identity verification result sent by the driver identity verification subunit 110 or the driver identity verification result sent by the in-vehicle gateway unit 400, whether the vehicle can be started.

The vehicle control subunit 130 can control, according to the driver real-time emotion status analysis result, driving behavior analysis result, and fatigue status determination result that are sent by the driver status monitoring subunit 120 or the in-vehicle gateway unit 400, whether the vehicle is to be speed-limited, speed-down, or emergency braked.

Figure 10:
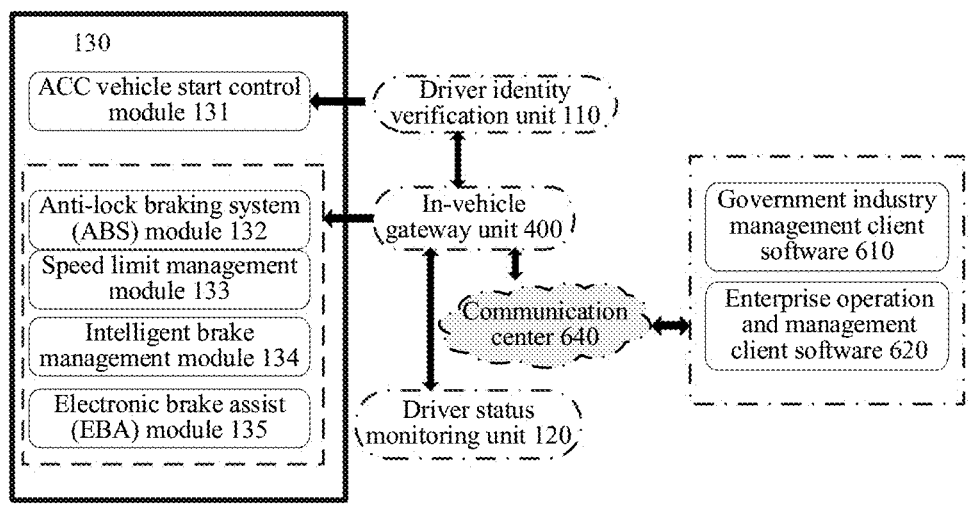
FIG. 10 is a schematic diagram of a composition principle and a use procedure of a vehicle control subunit according to an embodiment of the present invention.

FIG. 10 is a schematic diagram of a specific composition principle and a use procedure of the vehicle control subunit 130 according to this example.

Based on FIG. 10, the vehicle control subunit 130 provided in this example is constituted mutually or independently by an ACC vehicle start control module 131 and/or an anti-lock braking system (ABS) module 132 and/or a speed limit management module 133 and/or an intelligent brake management module 134 and/or an electronic brake assist (EBA) module 135.

Based on FIG. 2 and FIG. 10, the vehicle control subunit 130 disposed in this way may receive, by using the ACC vehicle start control module 131, the driver identity verification result that is sent by the driver identity verification subunit 110, that is forwarded by the driver identity verification subunit 110 by using the in-vehicle gateway unit 400, that is forwarded by the government industry management client software 610 by using the communication center 640 and the in-vehicle gateway unit 400, or that is forwarded by the enterprise operation and management client software 610 by using the in-vehicle gateway unit 400, and determine whether to allow starting of the vehicle. The vehicle is allowed to start when the driver identity verification result passes, and the vehicle is not allowed to start when the driver identity verification result fails.

The vehicle control subunit 130 may receive, by using the anti-lock braking system (ABS) module 132, an abnormal driver status monitoring result that is sent by the driver status monitoring subunit 100, or forwarded by the driver status monitoring subunit 100 by using the in-vehicle gateway unit

400, or forwarded by the enterprise operation and management client software 610 by using the communication center 640 and the in-vehicle gateway unit 400, and prevent a vehicle running direction from being out of control or from slipping when emergency braking occurs.

The vehicle control subunit 130 may receive, by using the speed limit management module 133, the abnormal driver status monitoring result that is sent by the driver status monitoring subunit 120, or forwarded by the driver status monitoring subunit 120 by using the in-vehicle gateway unit 400, or forwarded by the enterprise operation and management client software 610 by using the communication center 640 and the in-vehicle gateway unit 400, and control the maximum driving speed of the vehicle.

The vehicle control subunit 130 may receive, by using the intelligent brake management module 134, the abnormal driver status monitoring result that is sent by the driver status monitoring subunit 120, or forwarded by the driver status monitoring subunit 120 by using the in-vehicle gateway unit 400, or forwarded by the enterprise operation and management client software 610 by using the communication center 640 and the in-vehicle gateway unit 400, and enable the intelligent brake device to reduce the real-time traveling speed of the vehicle.

The vehicle control subunit 130 may receive, by using the electronic brake assist (EBA) module 135, the abnormal driver status monitoring result that is sent by the driver status monitoring subunit 120, or forwarded by the driver status monitoring subunit 120 by using the in-vehicle gateway unit 400, or forwarded by the enterprise operation and management client software 610 by using the communication center 640 and the in-vehicle gateway unit 400, and quickly start all braking forces when emergency braking is required, so as to prevent a traffic accident that is caused because a vehicle braking distance is excessively long because of sluggish reaction in the abnormal state of the driver.

When being deployed for application, the vehicle control subunit 130 preferably directly associates the driver identity verification subunit 110, the driver status monitoring subunit 120, and the in-vehicle gateway unit 400. In this way, when the vehicle control subunit 130 receives the driver identity verification pass result or receives the driver identity verification pass result that is forwarded by the driver identity verification subunit 110 by using the in-vehicle gateway unit 400, the vehicle control subunit 130 may control the vehicle ACC to be enabled. When the vehicle control subunit 130 receives a driver identity verification failure result, the vehicle control subunit controls the vehicle ACC to be disabled. When the vehicle control subunit 130 receives an abnormal driver status monitoring result, the vehicle control subunit controls the vehicle to perform speed limit, deceleration, or emergency braking. In this way, different types of vehicles are accurately managed and controlled in different cases, and vehicle driving safety is effectively ensured.

In this system, the vehicle safety monitoring unit 200 can comprehensively monitor vehicle tire pressure, a vehicle overheat status, and/or a new energy vehicle lithium-ion power battery safety status.

Specifically, the vehicle safety monitoring unit 200 can monitor, in real time, a tire pressure-related status such as tire leakage, tire low air pressure, and a tire temperature, a vehicle temperature status such as an engine/motor temperature, a differential lock system temperature, a tire temperature, and/or an exhaust pipe temperature, a new energy vehicle lithium-ion power battery safety status such as a battery cell temperature, battery cell deformation, battery cell air pressure, battery cell liquid leakage, an explosive gas type and concentration in a battery compartment, an ambient temperature in the battery compartment, and whether there is smoke in the battery compartment; and can analyze the vehicle safety according to the monitored data information, detect and give warnings for vehicle safety problems, give audible and visual alarms and voice prompt to prompt the driver to check and handle the problems in time during the warning, automatically handle the explosion warning of the power battery through the battery explosion suppression module, and interact with the emergency rescue handling force in real time to start accident rescue as soon as possible, so as to improve the operation safety of various fuel vehicles and new energy vehicles, try to prevent the traffic safety accidents, spontaneous combustion and vehicle explosion events caused by vehicle tire burst, vehicle overheat, and power battery explosion. In addition, this can reserve valuable golden handling time for emergency rescue, prevent the expansion of the traffic accident consequences, spontaneous combustion and vehicle explosion accidents, and ensure the safety of people's live and property.

Figure 11:
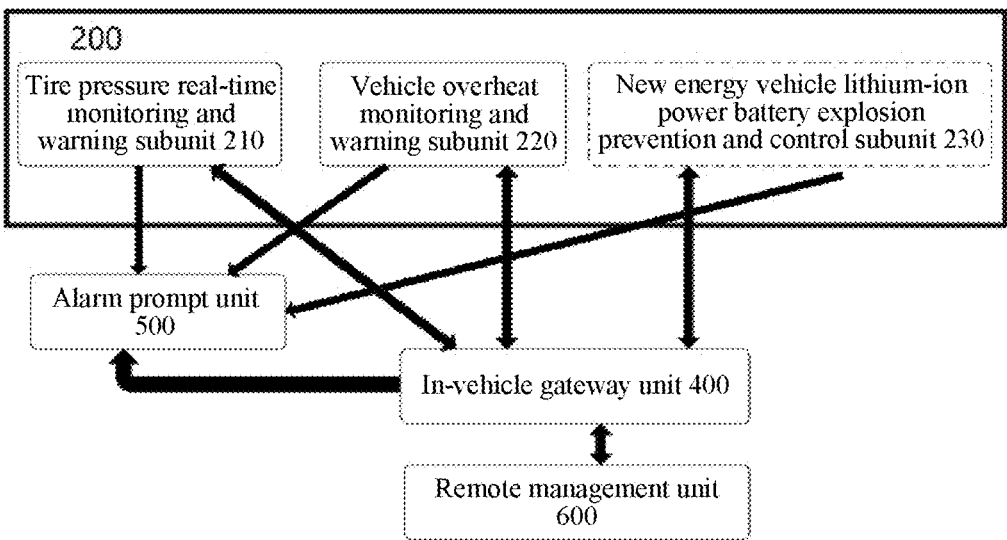
FIG. 11 is a schematic diagram of an overall composition principle of a vehicle safety monitoring unit according to an embodiment of the present invention.

FIG. 11 is a schematic diagram of an overall composition principle of the vehicle safety monitoring unit 200 in the system.

Based on FIG. 11, the vehicle safety monitoring unit 200 mainly includes a real-time tire pressure monitoring and warning subunit 210, a vehicle overheat monitoring and warning subunit 220, and a new energy vehicle lithium-ion power battery explosion prevention and control subunit 230 that cooperate with each other.

Based on FIG. 11, sensor components in the real-time tire pressure monitoring and warning subunit 210 in the vehicle safety monitoring unit 200 are distributed inside and outside each tire of the vehicle or in vehicle body positions at which the tires can be monitored, are associated with the in-vehicle gateway unit 400 of the vehicle, and are associated with the alarm prompt unit 500 and the remote management unit 600 by using the in-vehicle gateway unit 400.

The real-time tire pressure monitoring and warning subunit 210 that is so distributed may collect tire deformation information, in-tire air pressure information, and in-tire real-time temperature information of the current vehicle. The real-time tire pressure monitoring and warning subunit stores the collected tire deformation information of the vehicle, the tire air pressure information, and the tire real-time temperature information into the data storage module of the in-vehicle gateway unit 400.

Further, the real-time tire pressure monitoring and warning subunit 210 or the edge computing module of the in-vehicle gateway unit 400 analyzes the collected tire deformation information, and determines whether air leak occurs in the tire; analyzes the collected air pressure information in the tire and determines whether the tire is under or over pressure; and analyzes the collected real-time temperature information in the tire, and determines whether the tire is at risk of bursting according to the air pressure information in the tire.

Therefore, when it is determined that a monitoring information analysis result is higher than a specified deformation threshold to trigger an air leakage alarm, lower than the specified air pressure threshold to trigger a low air pressure alarm, higher than the specified air pressure threshold to trigger an over-inflation alarm, and lower than the specified air pressure threshold and higher than the specified threshold to trigger a tire burst warning, the network communication module of the in-vehicle gateway unit 400 sends warning or alarm information to the remote management unit 600, and simultaneously sends, by using the alarm prompt unit, corresponding local warning sound and light or voice to prompt the driver to stop the vehicle for check.

Figure 12:
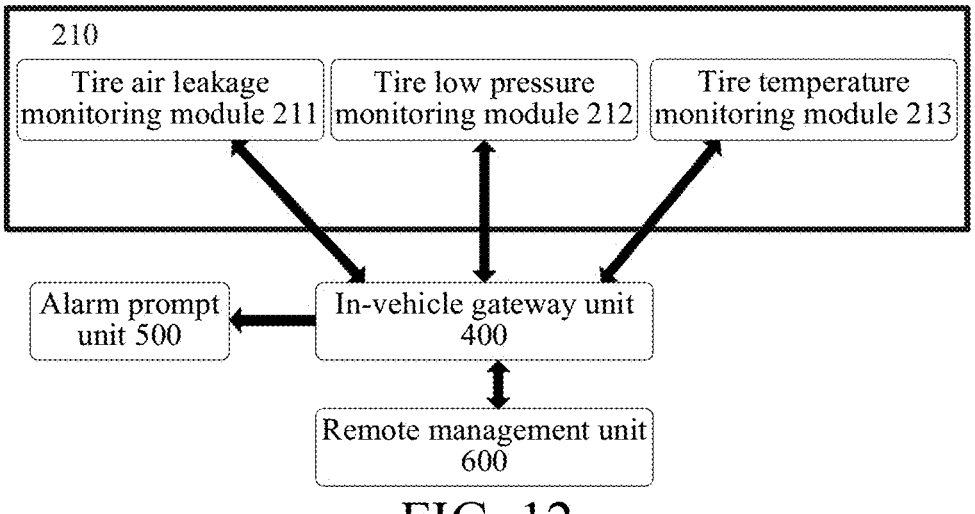
FIG. 12 is a schematic diagram of a composition principle and a use procedure of a real-time tire pressure monitoring and warning subunit according to an embodiment of the present invention.

FIG. 12 is a schematic diagram of a composition principle and a use procedure of the real-time tire pressure monitoring and warning subunit 210 according to this example.

Based on FIG. 12, the real-time tire pressure monitoring and warning subunit 210 mainly includes a tire air leakage monitoring module 211, a tire low pressure monitoring module 212, and a tire temperature monitoring module 213 that cooperate with each other.

With reference to FIG. 11 and FIG. 12, the tire air leakage monitoring module 211 in the real-time tire pressure monitoring and warning subunit 210 is configured to: obtain real-time information about whether there is air leakage in each tire of the vehicle, and transmit the obtained information to the data storage module or the edge computing module of the in-vehicle gateway unit 400, or transmit the obtained information to the remote management unit 600 by using the network communication module of the in-vehicle gateway unit.

The tire low pressure monitoring module 212 in the real-time tire pressure monitoring and warning subunit 210 is configured to: obtain real-time information about each tire pressure status of the vehicle, and transmit the obtained information to the data storage module or the edge computing module of the in-vehicle gateway unit 400, or transmit the obtained information to the remote management unit 600 by using the network communication module of the in-vehicle gateway unit.

The tire temperature monitoring module 213 in the real-time tire pressure monitoring and warning subunit 210 is configured to: obtain real-time information about an internal temperature status of each tire of the vehicle, and transmit the obtained information to the data storage module or the edge computing module of the in-vehicle gateway unit 400, or transmit the obtained information to the remote management unit 600 by using the network communication module of the in-vehicle gateway unit.

The real-time tire pressure monitoring and warning subunit 210 disposed in this way facilitates use of the tire air leakage monitoring module 211 to collect real-time information about whether there is air leakage in each tire of the vehicle, use the tire low pressure monitoring module 212 to collect real-time information about an air pressure status of each tire of the vehicle, collect real-time information about an internal temperature status of each tire of the vehicle by using the tire temperature monitoring module 213, send monitoring information of various monitoring devices including the tire air leakage monitoring module 211, the tire low pressure monitoring module 212, and the tire temperature monitoring module 213 to the in-vehicle gateway unit 400, and perform intelligent analysis and determining by using the edge computing module 430 of the in-vehicle gateway unit 400. When an air leakage or deformation or intelligent temperature analysis result of a corresponding monitored object triggers a real-time monitoring and warning of tire air leakage, tire low air pressure, or tire burst, the network communication module 410 of the in-vehicle gateway unit 400 sends a corresponding sound and light alarm or voice prompt to the alarm prompt unit 500, and at the same time, the network communication module 410 of the in-vehicle gateway unit 400 uploads the alarm prompt information to the remote management unit 600.

Based on FIG. 11, the vehicle overheat monitoring and warning subunit 220 in the vehicle safety monitoring unit 200 is disposed in the vehicle engine/motor, the differential lock system, the tire, and/or the air outlet of the exhaust pipe, is associated with the in-vehicle gateway unit 400, and is associated with the alarm prompt unit 500 and the remote management unit 600 by using the in-vehicle gateway unit 400.

The vehicle overheat monitoring and warning subunit 220 collects engine/motor temperature, differential lock system temperature, tire temperature, and/or exhaust pipe temperature information for the current vehicle. The vehicle overheat monitoring and warning subunit stores the collected engine/motor temperature, differential lock system temperature, tire temperature, and/or exhaust pipe temperature information into the data storage module of the in-vehicle gateway unit. The vehicle overheat monitoring and warning subunit 220 further analyzes the collected engine/motor temperature, differential lock system temperature, tire temperature, and/or exhaust pipe temperature by using the sensor or the edge computing module of the in-vehicle gateway unit, to determine whether the vehicle overheat has a risk of explosion or damage. Therefore, when it is determined that a monitoring information analysis result is higher than the specified temperature threshold, to trigger a vehicle overheat alarm, the network communication module of the in-vehicle gateway unit 400 sends warning or alarm information to the remote management unit 600, and simultaneously sends, by using the alarm prompt unit 500, corresponding local warning sound and light or voice to prompt the driver to stop the vehicle for check.

FIG. 14 is a schematic diagram of a composition principle and a use procedure of the vehicle overheat monitoring and warning subunit 220 according to this example.

Based on FIG. 14, the vehicle overheat monitoring and warning subunit 220 provided in this example includes an engine/motor temperature monitoring module 221, a differential lock system temperature monitoring module 222, a tire temperature monitoring module 223, and/or an exhaust pipe temperature monitoring module 224. The engine temperature monitoring module 210 is used in the vehicle overheat monitoring and warning subunit 220 of a fuel vehicle, the motor temperature monitoring module 210 is used in the vehicle overheat monitoring and warning subunit 220 of a new energy vehicle, and the exhaust pipe temperature monitoring module 224 is not included.

The engine/motor temperature monitoring module 221 in the vehicle overheat monitoring and warning subunit 220 is configured to obtain a real-time temperature of the engine/motor of the vehicle (for a fuel vehicle, obtain the engine temperature; for a new energy vehicle, obtain the motor temperature information), and transmit the obtained information to the data storage module or the edge computing module of the in-vehicle gateway unit 400, or the remote management unit 600 by using the network communication module of the in-vehicle gateway unit 400.

The differential lock system temperature monitoring module 222 in the vehicle overheat monitoring and warning subunit 220 is configured to: obtain real-time temperature information of the differential lock system of the vehicle, and transmit the obtained information to the data storage module or the edge computing module of the in-vehicle gateway unit 400, or the remote management unit 600 by using the network communication module of the in-vehicle gateway unit 400.

The tire temperature monitoring module 223 in the vehicle overheat monitoring and warning subunit 220 is configured to: obtain real-time temperature information of each tire of the vehicle, and transmit the obtained information to the data storage module or the edge computing module of the in-vehicle gateway unit 400, or transmit the obtained information to the remote management unit 600 by using the network communication module of the in-vehicle gateway unit 400.

The exhaust pipe temperature monitoring module 224 in the vehicle overheat monitoring and warning subunit 220 is configured to: obtain real-time temperature information of an exhaust pipe of a fuel vehicle, and transmit the obtained information to the data storage module or the edge computing module of the in-vehicle gateway unit 400, or transmit the obtained information to the remote management unit 600 by using the network communication module of the in-vehicle gateway unit 400.

The vehicle overheat monitoring and warning subunit 220 that is disposed in this way collects the engine/motor temperature information of the current vehicle by using the engine/motor temperature monitoring module 221, collects the differential lock system temperature information of the current vehicle by using the differential lock system temperature monitoring module 222, collects the tire temperature information of the current vehicle by using the tire temperature monitoring module 223, and/or collects the exhaust pipe temperature information of the current vehicle by using the exhaust pipe temperature monitoring module 224, and stores the tire temperature information of the current vehicle in the data storage module 420 of the in-vehicle gateway unit 400. The collected engine/motor temperature, differential lock system temperature, tire temperature, and/or exhaust pipe temperature are/is analyzed by using the sensor or by using the edge computing module 430 of the in-vehicle gateway unit 400, to determine whether the vehicle overheat has an explosion or damage risk. When it is determined that the monitoring information analysis result is higher than the specified temperature threshold, to trigger a vehicle overheat alarm, the network communication module 410 of the in-vehicle gateway unit 400 sends warning or alarm information to the remote management unit 600, and simultaneously sends, by using the alarm prompt unit 500, corresponding local warning sound and light or voice to prompt the driver to stop the vehicle for check.

Based on FIG. 11, the new energy vehicle lithium-ion power battery explosion prevention and control subunit 230 of the vehicle safety monitoring unit 200 is disposed in a new energy vehicle lithium-ion power battery cell and a battery compartment, is associated with the in-vehicle gateway unit 400, and is associated with the alarm prompt unit 500 and the remote management unit 600 by using the in-vehicle gateway unit 400.

The new energy vehicle lithium-ion power battery explosion prevention and control subunit 230 may collect battery cell temperature, battery cell deformation, battery cell air pressure, battery cell liquid leakage situation, and explosive gas concentration in the battery compartment, ambient temperature in the battery compartment, and smoke information in the battery compartment of the current vehicle. The new energy vehicle lithium-ion power battery explosion prevention and control subunit 230 stores, into the data storage module of the in-vehicle gateway unit, the collected battery cell temperature, battery cell deformation, battery cell air pressure, battery cell liquid leakage, and explosive gas concentration in the battery compartment, ambient temperature in the battery compartment, and smoke information in the battery compartment.

In addition, the new energy vehicle lithium-ion power battery explosion prevention and control subunit 230 analyzes, by using the sensor itself or by using the edge computing module of the in-vehicle gateway unit, the collected battery cell temperature, battery cell deformation, battery cell air pressure, battery cell liquid leakage, and explosive gas concentration in the battery compartment, ambient temperature of the battery compartment, and smoke information in the battery compartment, to determine whether the vehicle power battery has an explosion risk or a combustion risk. Therefore, when it is determined that a monitoring information analysis result is higher than a related set threshold to trigger an alarm of a hazard of the power battery cell or a hazard of the battery compartment, the battery explosion suppression device is started, the network communication module of the in-vehicle gateway unit sends warning or alarm information to the remote management unit, and at the same time, corresponding local warning sound and light or voice is sent by using the alarm prompt unit to prompt the driver to stop the vehicle for check.

FIG. 15 is a schematic diagram of a composition principle and a use procedure of the new energy vehicle lithium-ion power battery explosion prevention and control subunit 230 according to this example.

Based on FIG. 15, the new energy vehicle lithium-ion power battery explosion prevention and control subunit 230 in this example includes a battery cell temperature monitoring module 231, a battery cell deformation monitoring module 232, a battery cell air pressure monitoring module 233, a battery cell liquid leakage monitoring module 234, a battery compartment explosive gas monitoring module 235, a battery compartment ambient temperature monitoring module 236, a battery compartment smoke detection module 237, and a battery explosion suppression module 238 that cooperate with each other.

The battery cell temperature monitoring module 231 in the new energy vehicle lithium-ion power battery explosion prevention and control subunit 230 is configured to: obtain cell real-time temperature information of the vehicle power battery, and transmit the obtained information to the data storage module or the edge computing module of the in-vehicle gateway unit 400, or transmit the collected information to the remote management unit 600 by using the network communication module of the in-vehicle gateway unit 400.

The battery cell deformation monitoring module 232 in the new energy vehicle lithium-ion power battery explosion prevention and control subunit 230 is configured to obtain battery cell real-time deformation information of the vehicle power battery, and transmit the obtained information to the data storage module or the edge computing module of the in-vehicle gateway unit 400, or transmit the obtained information to the remote management unit 600 by using the network communication module of the in-vehicle gateway unit 400.

The battery cell air pressure monitoring module 233 in the new energy vehicle lithium-ion power battery explosion prevention and control subunit 230 is configured to: obtain cell real-time air pressure information of the vehicle power battery, and transmit the obtained information to the data storage module or the edge computing module of the in-vehicle gateway unit 400, or transmit the obtained information to the remote management unit 600 by using the network communication module of the in-vehicle gateway unit 400.

The battery cell liquid leakage monitoring module 234 in the new energy vehicle lithium-ion power battery explosion prevention and control subunit 230 is configured to: obtain cell real-time liquid leakage information of the vehicle power battery, and transmit the obtained information to the data storage module or the edge computing module of the in-vehicle gateway unit 400, or transmit the collected information to the remote management unit 600 by using the network communication module of the in-vehicle gateway unit 400.

The battery compartment explosive gas monitoring module 235 in the new energy vehicle lithium-ion power battery explosion prevention and control subunit 230 is configured to: obtain a composition and real-time concentration information of explosive gas in the vehicle power battery compartment, and transmit the obtained information to the data storage module or the edge computing module of the in-vehicle gateway unit 400, or transmit the obtained information to the remote management unit 600 by using the network communication module of the in-vehicle gateway unit 400.

The battery compartment ambient temperature monitoring module 236 in the new energy vehicle lithium-ion power battery explosion prevention and control subunit 230 is configured to: obtain ambient temperature information of the vehicle power battery compartment, and transmit the obtained information to the data storage module or the edge computing module of the in-vehicle gateway unit 400, or transmit the collected information to the remote management unit 600 by using the network communication module of the in-vehicle gateway unit 400.

The battery compartment smoke detection module 237 in the new energy vehicle lithium-ion power battery explosion prevention and control subunit 230 is configured to: obtain information about whether smoke exists in the vehicle power battery compartment, and transmit the obtained information to the data storage module or the edge computing module of the in-vehicle gateway unit 400, or transmit the obtained information to the remote management unit 600 by using the network communication module of the in-vehicle gateway unit 400.

The battery compartment battery explosion suppression module 238 in the new energy vehicle lithium-ion power battery explosion prevention and control subunit 230 is configured to: cut off a power supply or perform fire suppression and explosion prevention processing when lithium-ion power battery explosion warning information occurs.

The new energy vehicle lithium-ion power battery explosion prevention and control subunit 230 disposed in this way collects the battery cell temperature of the current vehicle by using the battery cell temperature monitoring module 231, collects the battery cell deformation of the current vehicle by using the battery cell deformation monitoring module 232, collects the battery cell air pressure of the current vehicle by using the battery cell air pressure monitoring module 233, collects the battery cell liquid leakage situation of the current vehicle by using the battery cell liquid leakage monitoring module 234, collects the battery cell explosive gas concentration of the current vehicle by using the battery compartment explosive gas monitoring module 235, collects the battery compartment ambient temperature of the current vehicle by using the battery compartment ambient temperature monitoring module 236, collects the battery compartment smoke information of the current vehicle by using the battery compartment smoke detection module 237, and stores the collected battery cell temperature, battery cell deformation, battery cell air pressure, battery cell liquid leakage situation, and battery compartment explosive gas concentration, battery compartment ambient temperature, and battery compartment smoke information into the data storage module 420 of the in-vehicle gateway unit 400 by using the network communication module 410 of the in-vehicle gateway unit 400; and analyzes, by using the sensor itself or by using the edge computing module 430 of the in-vehicle gateway unit 400, the collected battery cell temperature, battery cell deformation, battery cell air pressure, battery cell leakage situation, explosive gas concentration in the battery compartment, ambient temperature in the battery compartment, and smoke information in the battery compartment, to determine whether the vehicle power battery has an explosion risk or a combustion risk. When it is determined that the monitoring information analysis result is higher than the related specified threshold to trigger an alarm of a hazard of the power battery cell or a hazard of the battery compartment, the related battery explosion suppression device of the battery explosion suppression module 238 is enabled, the network communication module 410 of the in-vehicle gateway unit 400 sends warning or alarm information to the remote management unit 600, and the alarm prompt unit 500 simultaneously sends corresponding local warning sound and light or voice to prompt the driver to stop the vehicle for check.

The in-vehicle hazardous chemical safety monitoring unit 300 in this system specifically performs synchronous and real-time monitoring on the temperature of the in-vehicle hazardous chemicals and the temperature in the vehicle compartment, the humidity of the in-vehicle hazardous chemicals and the humidity in the vehicle compartment, the pressure of the in-vehicle hazardous chemicals and the pressure in the vehicle compartment or the tank, the vibration of the vehicle compartment or the position of the tank carrying the in-vehicle hazardous chemicals, the leakage of the in-vehicle hazardous chemicals, the gas leakage in the vehicle compartment carrying the in-vehicle hazardous chemicals or the liquid or gas leakage at the outlet of the tank; and comprehensively determine whether the hazardous chemicals are at risk of combustion, explosion, or leakage. When the hazardous chemicals are at risk of combustion, explosion, or leakage when the temperature, humidity, pressure, vibration intensity or leakage monitoring result is higher than a set threshold, the unit sends warning information. In addition, the in-vehicle hazardous chemical safety monitoring unit 300 can further the unauthorized position movement or abnormal start status in the vehicle parked state, an armed person and a non-normal person aggregation situation around the vehicle, track the real-time position after the vehicle triggers the anti-theft and robbery emergency alarm, perform real-time video monitoring on the fuel tank position of the truck loaded with hazardous chemicals, the cargo inside the closed vans loaded with hazardous chemicals and all openings of the tank truck, register in real time the quantity change in the loading process and the quantity change in the unloading process of the hazardous chemicals, inventory the quantity of the hazardous chemicals regularly or irregularly, and comprehensively determine whether the vehicle loaded with hazardous chemicals and the hazardous chemicals on the vehicle are at risk of being stolen, robbed, or lost. When a monitoring result or an intelligent analysis result of a monitored object triggers a warning or alarm on the in-vehicle hazardous chemicals, warning or alarm information is sent to the remote management unit by using the network communication module of the in-vehicle gateway unit, and the alarm prompt unit sends corresponding local warning sound and light or voice to prompt the driver to stop the vehicle for check or prepare for defending, so as to prevent a serious traffic accident caused by explosion of the hazardous chemicals carried on the vehicle and prevent the vehicle from being robbed of the hazardous chemicals for terrorist activities.

Figures 16, 17, 18:
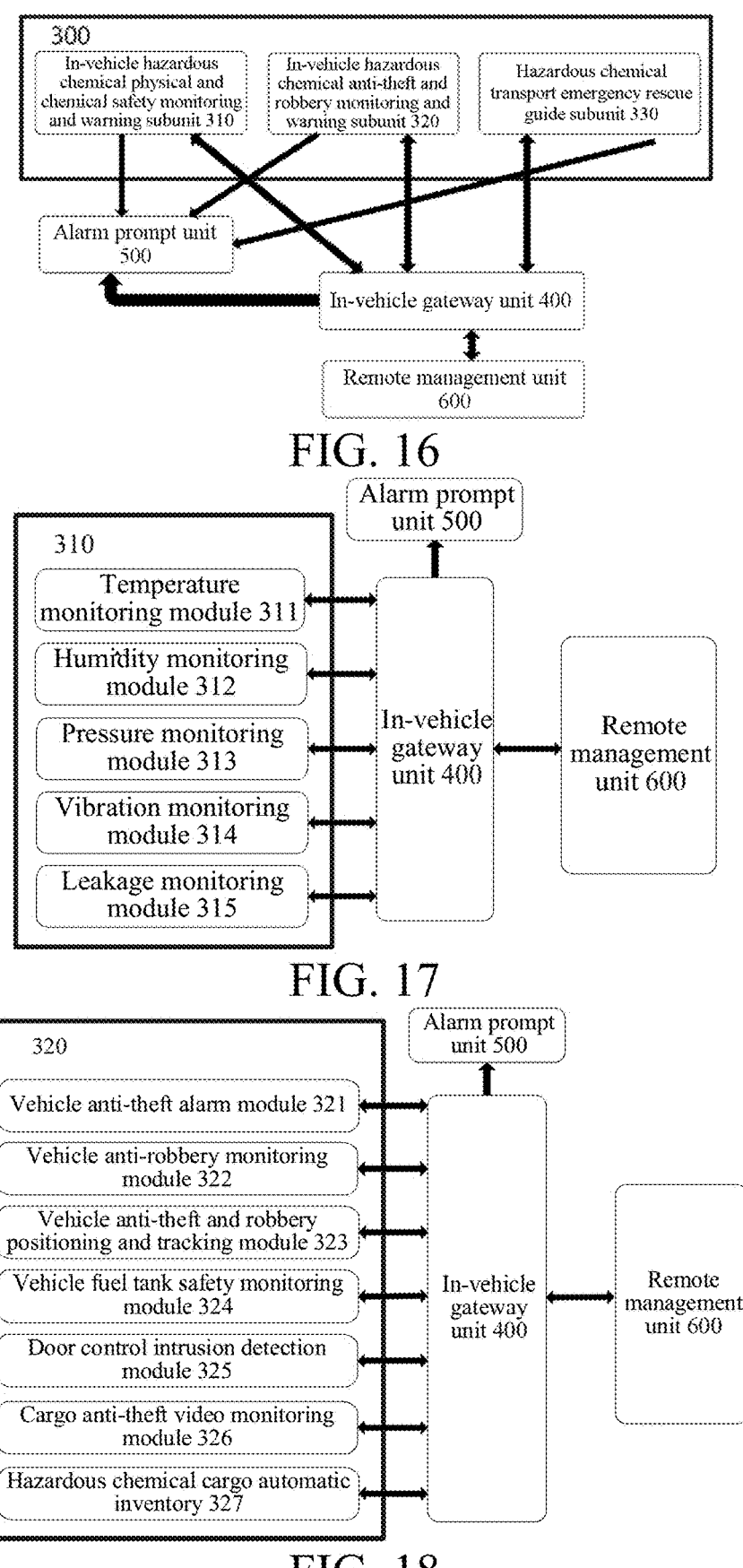
FIG. 16 is a schematic diagram of an overall composition principle of an in-vehicle hazardous chemical safety monitoring unit according to an embodiment of the present invention.
FIG. 17 is a schematic diagram of a composition principle and a use procedure of an in-vehicle hazardous chemical physical and chemical safety monitoring and warning sub-unit according to an embodiment of the present invention.
FIG. 18 is a schematic diagram of a composition principle and a use procedure of an in-vehicle hazardous chemical anti-theft and robbery monitoring and warning subunit according to an embodiment of the present invention.

FIG. 16 is a schematic diagram of a composition principle of the in-vehicle hazardous chemical safety monitoring unit 300 according to this example.

Based on FIG. 16, the in-vehicle hazardous chemical safety monitoring unit 300 provided in this example mainly includes an in-vehicle hazardous chemical physical and chemical safety monitoring and warning subunit 310, an in-vehicle hazardous chemical anti-theft and robbery monitoring and warning subunit 320, and a hazardous chemical transport emergency rescue guide subunit 330 that cooperate with each other.

Based on FIG. 16, sensors of the in-vehicle hazardous chemical monitoring and warning subunit 310 in this system are disposed in different positions on an outer package, in an inner package, or in a truck compartment carrying the hazardous chemicals, are associated with the in-vehicle gateway unit 400 of the vehicle, and are associated with the alarm prompt unit 500 and the remote management unit 600 by using the in-vehicle gateway unit 400.

The in-vehicle hazardous chemical physical and chemical safety monitoring and warning subunit 310 can perform real-time monitoring on the temperature of the in-vehicle hazardous chemicals and the temperature in the vehicle compartment, the humidity of the in-vehicle hazardous chemicals and the humidity in the vehicle compartment, the pressure of the in-vehicle hazardous chemicals and the pressure in the vehicle compartment or the tank, the vibration of the vehicle compartment or the position of the tank carrying the in-vehicle hazardous chemicals, the leakage of the in-vehicle hazardous chemicals, the gas leakage in the vehicle compartment carrying the in-vehicle hazardous chemicals or the liquid or gas leakage at the outlet of the tank.

In addition, the in-vehicle hazardous chemical physical and chemical safety monitoring and warning subunit 310 can further store the collected monitoring information into the data storage module of the in-vehicle gateway unit 400, and analyze the collected monitoring result by using the sensor itself or by using the edge computing module of the in-vehicle gateway unit 400, to comprehensively determine whether there is a risk of combustion, explosion, or leakage of the hazardous chemicals. When the temperature, humidity, pressure, vibration intensity, or leakage monitoring result is higher than a set threshold, and a risk of combustion, explosion, or leakage of the hazardous chemicals may occur, warning information is sent. When the warning is triggered, the network communication module of the in-vehicle gateway unit 400 sends warning information to the remote management unit 600, and meanwhile, the alarm prompt unit sends local warning sound and light or voice to prompt the driver to stop the vehicle for check.

FIG. 17 is a schematic diagram of a specific composition principle and a use procedure of the in-vehicle hazardous chemical physical and chemical safety monitoring and warning subunit 310 in this embodiment.

Based on FIG. 17, the in-vehicle hazardous chemical physical and chemical safety monitoring and warning subunit 310 provided in this example mainly includes a temperature monitoring module 311, a humidity monitoring module 312, a pressure monitoring module 313, a vibration monitoring module 314, and a leakage monitoring module 315 that cooperate with each other.

Further, the temperature monitoring module 311 in the in-vehicle hazardous chemical physical and chemical safety monitoring and warning subunit 310 is configured to: obtain real-time information about the temperature of the in-vehicle hazardous chemicals, the temperature in the vehicle compartment, or the temperature of the tank, and transmit the obtained information to the data storage module or the edge computing module of the in-vehicle gateway unit, or transmit the obtained information to the remote management unit by using the network communication module of the in-vehicle gateway unit.

The humidity monitoring module 312 in the in-vehicle hazardous chemical physical and chemical safety monitoring and warning subunit 310 is configured to: obtain the humidity of the in-vehicle hazardous chemical and the real-time information about the humidity in the vehicle compartment, and transmit the obtained information to the data storage module or the edge computing module of the in-vehicle gateway unit, or transmit the obtained information to the remote management unit by using the network communication module of the in-vehicle gateway unit.

The pressure monitoring module 313 in the in-vehicle hazardous chemical physical and chemical safety monitoring and warning subunit 310 is configured to: obtain real-time information about pressure of the in-vehicle hazardous chemical and pressure in the vehicle compartment or the tank, and transmit the obtained information to the data storage module or the edge computing module of the in-vehicle gateway unit, or transmit the obtained information to the remote management unit by using the network communication module of the in-vehicle gateway unit.

The vibration monitoring module 314 in the in-vehicle hazardous chemical physical and chemical safety monitoring and warning subunit 310 is configured to: obtain real-time information about vibration at a position of the vehicle compartment or the tank in which the in-vehicle hazardous chemicals are loaded, and transmit the obtained information to the data storage module or the edge computing module of the in-vehicle gateway unit, or transmit the obtained information to the remote management unit by using the network communication module of the in-vehicle gateway unit.

The leakage monitoring module 315 in the in-vehicle hazardous chemical physical and chemical safety monitoring and warning subunit 310 is configured to: obtain a leakage situation of the in-vehicle hazardous chemicals and real-time information of a gas leakage situation in the vehicle compartment loaded with the in-vehicle hazardous chemicals or a liquid or gas leakage situation of a tank outlet, and transmit the obtained information to the data storage module or the edge computing module of the in-vehicle gateway unit, or transmit the obtained information to the remote management unit by using the network communication module of the in-vehicle gateway unit.

The in-vehicle hazardous chemical physical and chemical safety monitoring and warning subunit 310 disposed in this way facilitates use of the temperature monitoring module 311 to monitor the temperature of the in-vehicle hazardous chemicals and the temperature in the vehicle compartment in real time, the humidity monitoring module 312 to monitor the humidity of the in-vehicle hazardous chemicals and the humidity in the vehicle compartment in real time, the pressure monitoring module 313 to monitor the pressure of the in-vehicle hazardous chemicals and the pressure in the vehicle compartment or the tank, the vibration monitoring module 314 to monitor the vibration of the vehicle compartment or the position of the tank carrying the in-vehicle hazardous chemicals, and the leakage monitoring module 315 to monitor the leakage of the in-vehicle hazardous chemicals, the gas leakage in the vehicle compartment carrying the in-vehicle hazardous chemicals or the liquid or gas leakage at the outlet of the tank in real time.

The in-vehicle hazardous chemical physical and chemical safety monitoring and warning subunit 310 uploads the monitoring information to the data storage module 420 of the in-vehicle gateway unit 400 by using the network communication module 410 of the in-vehicle gateway unit 400, and performs intelligent analysis by using the edge computing module 430 of the in-vehicle gateway unit 400. When the temperature, humidity, pressure, vibration intensity, or leakage monitoring result is higher than a set threshold, and a risk of combustion, explosion, or leakage of the hazardous chemicals may occur, warning information is sent. When the warning is triggered, the network communication module 410 of the in-vehicle gateway unit 400 sends warning information to the remote management unit 600, and meanwhile, the alarm prompt unit 500 sends a local warning audible and visual or voice prompt.

Based on FIG. 16, the in-vehicle hazardous chemical anti-theft and robbery monitoring and warning subunit 320 in the in-vehicle hazardous chemical safety monitoring unit 300 is disposed in a position such as in the vehicle cab, in the vehicle, outside the vehicle, in the vehicle compartment, at the vehicle compartment door, at the vehicle fuel tank opening, and at the oil pump inlet/outlet pipe/oil drain valve of a tank truck, and is associated with the in-vehicle gateway unit 400, and is associated with the alarm prompt unit 500 and the remote management unit 600 by using the in-vehicle gateway unit 400.

The in-vehicle hazardous chemical anti-theft and robbery monitoring and warning subunit 320 can monitor the unauthorized position movement or abnormal start status in the vehicle parked state, an armed person and a non-normal person aggregation situation around the vehicle, track the real-time position after the vehicle triggers the anti-theft and robbery emergency alarm, perform real-time video monitoring on the fuel tank position of the truck loaded with hazardous chemicals, the cargo inside the closed vans loaded with hazardous chemicals and all openings of the tank truck, register in real time the quantity change in the loading process and the quantity change in the unloading process of the hazardous chemicals, and inventory the quantity of the hazardous chemicals regularly or irregularly.

On this basis, the in-vehicle hazardous chemical anti-theft and robbery monitoring and warning subunit 320 may further store the collected monitoring and video monitoring information into the data storage module of the in-vehicle gateway unit, and intelligently analyze the collected monitoring and inspecting result by using the device itself or by using the edge computing module of the in-vehicle gateway unit, so as to comprehensively determine whether the vehicle loaded with hazardous chemicals and the hazardous chemicals on the vehicle are at risk of being stolen, robbed, or lost. When the monitoring result or the intelligent analysis result of the monitored object triggers a theft or robbery warning or alarm, the network communication module of the in-vehicle gateway unit sends warning or alarm information to the remote management unit, and simultaneously the alarm prompt unit sends corresponding local warning sound and light or voice to prompt the driver to stop the vehicle for check or prepare for defending.

FIG. 18 is a schematic diagram of a specific composition principle and a use procedure of the in-vehicle hazardous chemical anti-theft and robbery monitoring and warning subunit 320 according to this example.

Based on FIG. 18, the in-vehicle hazardous chemical anti-theft and robbery monitoring and warning subunit 320 provided in this example mainly includes a vehicle anti-theft alarm module 321, a vehicle anti-robbery module 322, a vehicle anti-theft and robbery positioning and tracking module 323, a vehicle fuel tank safety monitoring module 324, a door control intrusion detection module 325, a cargo anti-theft video monitoring module 326, and/or a hazardous chemical cargo automatic inventory module 327.

The vehicle anti-theft alarm module 321 is configured to: monitor an unauthorized position movement or an abnormal start situation in a vehicle parked state, and transmit monitoring information to the data storage module or the edge computing module of the in-vehicle gateway unit, or the remote management unit by using the network communication module of the in-vehicle gateway unit;

the vehicle anti-robbery module 322 is configured to: monitor an armed person and a non-normal person aggregation situation around the vehicle, and transmit monitoring information to the data storage module or the edge computing module of the in-vehicle gateway unit, or the remote management unit by using the network communication module of the in-vehicle gateway unit;

the vehicle anti-theft and robbery positioning and tracking module 323 is configured to: perform positioning and tracking on a real-time position after an anti-theft and robbery alarm is triggered by the vehicle, and transmit tracked positioning information to the remote management unit by using the network communication module of the in-vehicle gateway unit;

the vehicle fuel tank safety monitoring module 324 is configured to: perform real-time video monitoring on a position of a fuel tank of a truck loaded with hazardous chemicals, and transmit monitoring information to the data storage module or the edge computing module of the in-vehicle gateway unit, or the remote management unit by using the network communication module of the in-vehicle gateway unit;

the door control intrusion detection module 325 is configured to monitor a door body of a vehicle compartment of a truck loaded with a hazardous chemical cargo or an oil pump inlet/outlet pipe/an oil drain valve of a tank truck, and transmit monitoring information to the data storage module or the edge computing module of the in-vehicle gateway unit, or the remote management unit by using the network communication module of the in-vehicle gateway unit;

the cargo anti-theft video monitoring module 326 is configured to: perform video monitoring on an internal cargo situation of a closed van loaded with hazardous chemicals and all openings of a tank truck, and transmit monitoring information to the data storage module or the edge computing module of the in-vehicle gateway unit, or the remote management unit by using the network communication module of the in-vehicle gateway unit; and the hazardous chemical cargo automatic inventory module 327 is configured to: perform real-time registration on a quantity change in a loading process and a quantity change in an unloading process of the hazardous chemical cargo, perform quantity inventory on the transported hazardous chemical cargo regularly or irregularly, and transmit registration and inventory information to the data storage module or the edge computing module of the in-vehicle gateway unit, or the remote management unit by using the network communication module of the in-vehicle gateway unit.

The in-vehicle hazardous chemical anti-theft and robbery monitoring and warning subunit 320 disposed in this way may monitor, by using the vehicle anti-theft alarm module 321, an unauthorized position movement or an abnormal start situation in a vehicle parked state, monitor, by using the vehicle anti-robbery monitoring module 322, an armed person and a non-normal person aggregation situation around the vehicle, perform, by using the vehicle anti-theft and robbery positioning and tracking module 323, positioning and tracking on a real-time position of the vehicle after an anti-theft and robbery alarm is triggered, perform, by using an external vehicle video monitoring module 240, real-time video monitoring on a door body of a vehicle compartment of a truck loaded with hazardous chemicals or an oil pump inlet/outlet pipe/an oil drain valve of a tank truck, monitor, by using the door control intrusion detection module 325, door control of a vehicle compartment of a truck loaded with a hazardous chemical cargo or an oil pump inlet/outlet pipe/an oil drain valve of a tank truck, perform, by using the cargo anti-theft video monitoring module 326, video monitoring on an internal cargo situation of a closed van loaded with hazardous chemicals and all openings of a tank truck, and register, by using the hazardous chemical cargo automatic inventory module 327, in real time the quantity change in the loading process and the quantity change in the unloading process of the hazardous chemicals, and inventory the quantity of the hazardous chemicals regularly or irregularly.

At the same time, the in-vehicle hazardous chemical anti-theft and robbery monitoring and warning subunit 320 can further upload the monitoring information and the inventory result to the data storage module 420 of the in-vehicle gateway unit 400 by using the network communication module 410 of the in-vehicle gateway unit 400, and perform intelligent analysis by using the edge computing module 430 of the in-vehicle gateway unit 400. When the monitoring result or the intelligent analysis result of the monitored object triggers a warning or an alarm, warning information is sent. When a warning is triggered, warning information is sent to the remote management unit 600 by using the network communication module 410 of the in-vehicle gateway unit 400, and at the same time, a local warning sound and light or voice prompt is sent by using the alarm prompt unit 500.

Based on FIG. 16, the hazardous chemical transport emergency rescue guide subunit 330 in the in-vehicle hazardous chemical safety monitoring unit 300 is disposed in the vehicle cabin and driver and passenger service client software, is associated with the in-vehicle gateway unit 400, and is associated with the alarm prompt unit 500 and the remote management unit 600 by using the in-vehicle gateway unit 400.

The hazardous chemical transport emergency rescue guide subunit 330 can provide an on-site emergency disposal voice prompt or document push guidance for the vehicle driver when the vehicle triggers an in-vehicle hazardous chemical physical and chemical safety monitoring warning and an in-vehicle hazardous chemical anti-theft and robbery monitoring warning.

Figure 26:
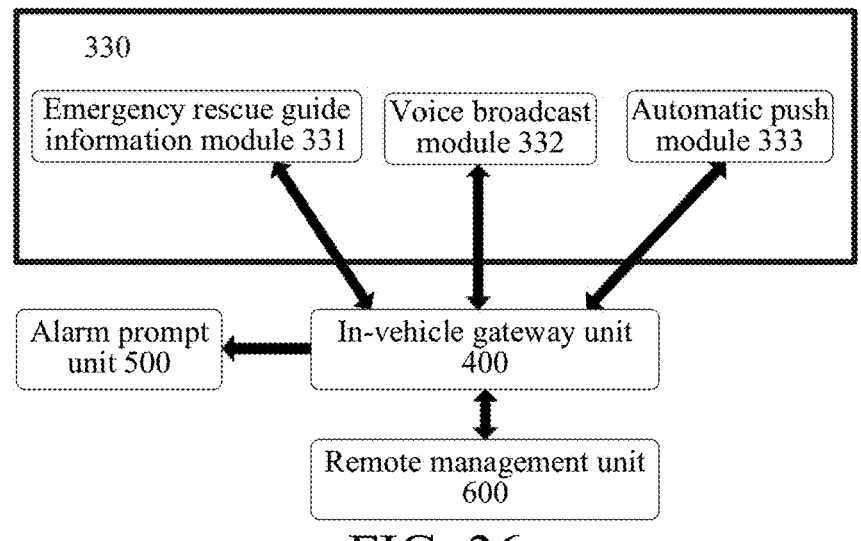
FIG. 26 is a schematic diagram of a composition principle and a use procedure of a hazardous chemical transport emergency rescue guide subunit according to an embodiment of the present invention.

FIG. 26 is a schematic diagram of a composition principle and a use procedure of the hazardous chemical transport emergency rescue guide subunit 330 according to this example.

Based on FIG. 26, the hazardous chemical transport emergency rescue guide subunit 330 provided in this example includes an emergency rescue guide information module 331, a voice broadcast module 332, and an automatic push module 333 that cooperate with each other.

The emergency rescue guide information module 331 herein is configured to provide guide information such as emergency rescue knowledge of the hazardous chemicals, and may be disposed in the data storage module of the in-vehicle gateway unit or the remote management unit.

The voice broadcast module 332 herein is configured to: instruct a driver and a passenger to perform preliminary emergency disposal by playing emergency rescue guide information in real time via voice when a warning or alarm occurs, and a voice prompt module of the alarm prompt unit may be independently disposed or shared.

The automatic push module 333 herein is configured to: when a warning or alarm occurs, push an emergency rescue guide information file in real time to instruct a driver and a passenger to perform preliminary emergency disposal. A push display device may be independently disposed of or may use a driver and passenger client.

The hazardous chemical transport emergency rescue guide subunit 330 disposed in this way can provide guide information such as emergency rescue knowledge of the hazardous chemicals by using the data storage module 420 disposed in the in-vehicle gateway unit 400 or the emergency rescue guide information module 331 disposed in the remote management unit 600, and instruct, by using the voice broadcast module 332 to play, the driver and the passenger to perform preliminary emergency disposal by playing emergency rescue guide information in real time via voice when a warning or alarm occurs, or push, by using the automatic push module 333, an emergency rescue guide information file in real time when a warning or alarm occurs to instruct the driver and the passenger to perform preliminary emergency disposal.

Based on FIG. 1, the in-vehicle gateway unit 400 in this system is disposed in the cab of the to-be-monitored vehicle, and is associated with the driver holography management unit 100, the vehicle safety monitoring unit 200, the in-vehicle hazardous chemical safety monitoring unit 300, the alarm prompt unit 500, and the remote management unit 600.

The in-vehicle gateway unit 400 herein has at least a network communication function and/or a data storage function and/or an edge computing function, and establishes a communication channel with the remote management unit 600.

The in-vehicle gateway unit 400 may compare, identify, and analyze data information generated by the driver identity verification subunit and/or the driver status monitoring subunit in the in-vehicle gateway unit 400, or transmit related information to the remote management unit for comparison, identification, and analysis, and send management data information returned by the remote management unit to the vehicle control subunit and the alarm prompt unit.

The in-vehicle gateway unit 400 may analyze sensing and monitoring data information generated by the real-time tire pressure monitoring and warning subunit, the vehicle overheat monitoring and warning subunit, and/or the new energy vehicle lithium-ion power battery explosion prevention and control subunit in the vehicle safety monitoring unit 200; when an analysis result triggers an alarm, separately send alarm information to the remote management unit 600 and the alarm prompt unit 500; and send a management instruction such as threshold setting adjustment of the remote management unit 600 to the real-time tire pressure monitoring and warning subunit, the vehicle overheat monitoring and warning subunit, and/or the new energy vehicle lithium-ion power battery explosion prevention and control subunit.

The in-vehicle gateway unit 400 may analyze sensing and monitoring data information generated by the in-vehicle hazardous chemical physical and chemical safety monitoring and warning subunit and the in-vehicle hazardous chemical anti-theft and robbery monitoring and warning subunit in the in-vehicle hazardous chemical safety monitoring unit 300. When an analysis result triggers an alarm, the in-vehicle gateway unit 400 separately sends alarm information to the remote management unit and the alarm prompt unit, and sends a management instruction such as threshold setting adjustment of the remote management unit and hazardous chemical transport emergency rescue guide information to the in-vehicle hazardous chemical physical and chemical safety monitoring and warning subunit, the in-vehicle hazardous chemical anti-theft and robbery monitoring and warning subunit, and the hazardous chemical transport emergency rescue guide subunit.

Figure 27:
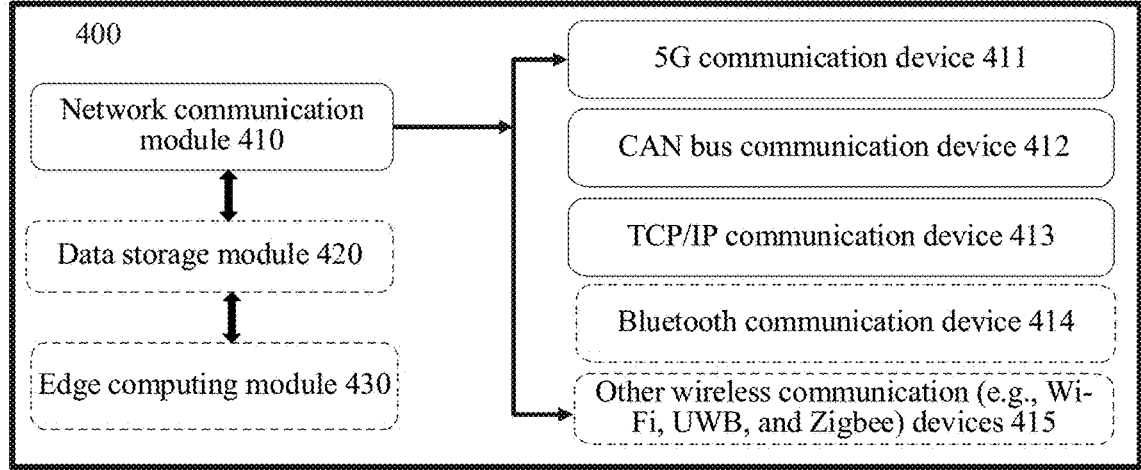
FIG. 27 is a schematic diagram of a composition principle of an in-vehicle gateway unit and a network communication module of the in-vehicle gateway unit according to an embodiment of the present invention.

FIG. 27 is a schematic diagram of a composition principle of the in-vehicle gateway unit 400 and the network communication module of the in-vehicle gateway unit 400 according to this example.

Based on FIG. 27, the in-vehicle gateway unit 400 used in the vehicle transport safety monitoring system provided in this embodiment is mutually combined or independently formed by the network communication module 410 and/or the data storage module 420 and/or the edge computing module 430. The network communication module 410 is a basic component, that is, a necessary component of the in-vehicle gateway unit 400.

Based on FIG. 1 and FIG. 27, the in-vehicle gateway unit 400 disposed in this way uses the network communication module 410 to exchange data between the driver identity verification subunit 110 or the driver status monitoring subunit 120 and the alarm prompt unit 500, the vehicle control subunit 130, and the remote management unit 600, forward, to the remote management unit 600, the identity certificate reading data, the biometric feature information collection data, or the identity verification result information that is uploaded by the driver identity verification subunit 110, or send a corresponding instruction to the vehicle control subunit 130 and the alarm prompt unit 500 according to the received driver identity verification result information.

The in-vehicle gateway unit 400 may use the network communication module 410 to forward, to the remote management unit 600, the facial expression dynamic information of the current driver and/or the head and face action and the body action information of the current driver and/or the load distribution information of the different points of the seat under the driver or the real-time emotion analysis and identification result and/or the abnormal behavior analysis and identification result and/or the fatigue status determination result that are/is uploaded by the driver status monitoring subunit 120. With cooperation thereof, the in-vehicle gateway unit 400 may further send a corresponding instruction to the vehicle control subunit 130 and the alarm prompt unit 500 according to the received real-time emotion analysis and identification result of the driver and/or the received abnormal behavior analysis and identification result and/or the received fatigue status determination result; or send a corresponding instruction to the vehicle control subunit 130 and the alarm prompt unit 500 according to the driver identity verification result, the real-time emotion analysis and identification result, and/or the abnormal behavior analysis and identification result, and/or the fatigue status determination result that are/is obtained by the edge computing module 430 of the in-vehicle gateway unit 400; or forward a received management instruction of the remote management unit 600 to the driver identity verification subunit 110, the driver status monitoring subunit 120, the alarm prompt unit 500, or the vehicle control subunit 130.

The network communication module 410 in the in-vehicle gateway unit 400 is further configured to exchange data between the real-time tire pressure monitoring and warning subunit, the vehicle overheat monitoring and warning subunit, and the new energy vehicle lithium-ion power battery explosion prevention and control subunit in the vehicle safety monitoring unit 200 and the alarm prompt unit and the remote management unit; and forward the real-time tire pressure monitoring information uploaded by the real-time tire pressure monitoring and warning subunit, the overheat monitoring information that is of each module of the vehicle and that is uploaded by the vehicle overheat monitoring and warning subunit, the lithium-ion power battery cell and the battery compartment monitoring information that are uploaded by the new energy vehicle lithium-ion power battery explosion prevention and control subunit and the analysis result of the monitoring information to the remote management unit, or forward an alarm instruction and voice prompt instruction information to the alarm prompt unit according to the received instruction of the remote management unit, and forward instruction information such as alarm threshold setting adjustment and circuit control to related monitoring devices of the real-time tire pressure monitoring and warning subunit, the vehicle overheat monitoring and warning subunit, and the new energy vehicle lithium-ion power battery explosion prevention and control subunit.

The network communication module 410 in the in-vehicle gateway unit 400 is further configured to exchange data between the in-vehicle hazardous chemical physical and chemical safety monitoring and warning subunit, the in-vehicle hazardous chemical anti-theft and robbery monitoring and warning subunit, and the hazardous chemical transport emergency rescue guide subunit in the in-vehicle hazardous chemical safety monitoring unit 300 and the alarm prompt unit and the remote management unit, and forward, to the remote management unit, the monitoring information and the analysis result that are uploaded by the in-vehicle hazardous chemical physical and chemical safety monitoring and warning subunit and the in-vehicle hazardous chemical anti-theft and robbery monitoring and warning subunit, or forward an alarm instruction and voice prompt instruction information to the alarm prompt unit according to the received instruction of the remote management unit, and forward instruction information such as alarm threshold setting adjustment and circuit control to related monitoring devices of the in-vehicle hazardous chemical physical and chemical safety monitoring and warning subunit and the in-vehicle hazardous chemical anti-theft and robbery monitoring and warning subunit.

The data storage module 420 in the in-vehicle gateway unit 400 is configured to store the identity certificate reading data, the biometric feature information collection data, or the identity information database and the biometric feature information database of the authorized driver that are uploaded by the driver identity verification subunit 110 in the driver holography management unit 100, and the facial expression dynamic information of the current driver and/or the head and face motion information and the body action information of the current driver that are uploaded by the driver status monitoring subunit 120, and/or the load distribution situations and/or the load status change information of the different points of the seat under the driver.

The data storage module 420 in the in-vehicle gateway unit 400 is further configured to store the monitoring information uploaded by the real-time tire pressure monitoring and warning subunit, the vehicle overheat monitoring and warning subunit, and the new energy vehicle lithium-ion power battery explosion prevention and control subunit in the vehicle safety monitoring unit 200.

The data storage module 420 in the in-vehicle gateway unit 400 is further configured to store the monitoring information uploaded by the in-vehicle hazardous chemical physical and chemical safety monitoring and warning subunit in the in-vehicle hazardous chemical safety monitoring unit 300, the monitoring information uploaded by the in-vehicle hazardous chemical anti-theft and robbery monitoring and warning subunit, and the emergency rescue guide information file of the hazardous chemical transport emergency rescue guide subunit.

The in-vehicle gateway unit 400 may use the edge computing module 430 to compare and verify the identity certificate reading data and the biometric feature information collection data that are uploaded by the driver identity verification subunit 110 in the driver holography management unit 100 with information in the identity information database and the biometric feature information database of the authorized driver, and perform intelligent analysis and identification, and/or abnormal behavior analysis and identification, and/or fatigue status analysis and determining on the facial expression dynamic information of the current driver and/or the head and face motion information and the body action information of the current driver and/or the information about the load distribution and the load status change at different points of the seat under the driver that are uploaded by the driver status monitoring subunit 120.

The edge computing module 430 in the in-vehicle gateway unit 400 is further configured to perform intelligent analysis and determining on the monitoring information uploaded by the real-time tire pressure monitoring and warning subunit, the vehicle overheat monitoring and warning subunit, and the new energy vehicle lithium-ion power battery explosion prevention and control subunit in the vehicle safety monitoring unit 200.

The edge computing module 430 in the in-vehicle gateway unit 400 is further configured to perform intelligent analysis and determining on the monitoring information uploaded by the in-vehicle hazardous chemical anti-theft and robbery monitoring and warning subunit and the in-vehicle hazardous chemical anti-theft and robbery monitoring and warning subunit in the in-vehicle hazardous chemical safety monitoring unit 300.

Therefore, during specific deployment, the in-vehicle gateway unit 400 formed by the network communication module 410, the data storage module 420, and the edge computing module 430 may be directly associated with the driver identity verification subunit, the driver status monitoring subunit, and the vehicle control subunit in the driver holography management unit 100.

In this way, when the in-vehicle gateway unit 400 receives a driver identity verification pass result, the in-vehicle gateway unit 400 sends an instruction to the vehicle control subunit 130 to control the vehicle to start the ACC, and forwards the driver identity verification result and action information of the vehicle control subunit to the remote management unit 600.

When the in-vehicle gateway unit 400 receives a driver identity verification failure result, the in-vehicle gateway unit 400 sends an instruction to the vehicle control subunit 130 to control the vehicle to turn off the ACC, sends an instruction to the alarm prompt unit 500 to prompt the driver to adjust the posture for re-verification, and forwards the driver identity verification result and the action information of the vehicle control subunit to the remote management unit 600.

When the in-vehicle gateway unit 400 receives an abnormal driver status monitoring result, the in-vehicle gateway unit 400 sends an instruction to the vehicle control subunit 130 to control the vehicle to perform speed limiting, deceleration, or emergency braking, sends a hazardous state or hazardous behavior alarm to the alarm prompt unit 500, and gives a voice prompt to prompt the driver to eliminate an abnormal emotion or an abnormal behavior, or prompt the driver to stop and rest nearby, and forwards the driver status monitoring result and the action information of the vehicle control subunit to the remote management unit 600.

When the fatigue status analysis component based on video analysis or the fatigue status analysis component based on sensor network analysis is in the remote management unit 600, the in-vehicle gateway unit 400 forwards, to the remote management unit 600, the facial expression dynamic information that is of the current driver and that is collected by the facial high-speed camera device, the head and face action and body action posture information that are of the current driver and that are collected by the head and face video collection device and the body panoramic video collection device, the head and face action information that is of the current driver and that is collected by the head and face video collection device, and the load situations and the information about the load status change at different points of the seat under the driver that are collected by the seat load status collection device; and after the remote management unit 600 performs intelligent analysis, identification, or determining, receives an analysis, identification, or determination result, sends an instruction to the vehicle control subunit 130 and/or the alarm prompt unit 500, and then uploads an action status of the vehicle control subunit to the remote management unit 600.

During specific deployment, the in-vehicle gateway unit 400 may be directly associated with each functional unit in the vehicle safety monitoring unit 200.

The network communication module 410 of the in-vehicle gateway unit 400 exchanges data between the real-time tire pressure monitoring and warning subunit, the vehicle overheat monitoring and warning subunit, and the new energy vehicle lithium-ion power battery explosion prevention and control subunit and the alarm prompt unit 500 and the remote management unit 600; and forward the real-time tire pressure monitoring information uploaded by the real-time tire pressure monitoring and warning subunit, the overheat monitoring information that is of each module of the vehicle and that is uploaded by the vehicle overheat monitoring and warning subunit, the lithium-ion power battery cell and the battery compartment monitoring information that are uploaded by the new energy vehicle lithium-ion power battery explosion prevention and control subunit and the analysis result of the monitoring information to the remote management unit 600, or forward an alarm instruction and voice prompt instruction information to the alarm prompt unit 500 according to the received instruction of the remote management unit 600, and forward instruction information such as alarm threshold setting adjustment and circuit control to related monitoring devices of the real-time tire pressure monitoring and warning subunit, the vehicle overheat monitoring and warning subunit, and the new energy vehicle lithium-ion power battery explosion prevention and control subunit.

The in-vehicle gateway unit 400 can store, by using the data storage module 420, the monitoring information uploaded by the real-time tire pressure monitoring and warning subunit, the vehicle overheat monitoring and warning subunit, and the new energy vehicle lithium-ion power battery explosion prevention and control subunit. The in-vehicle gateway unit 400 can perform, by using the edge computing module 430, intelligent analysis and determining on the monitoring information uploaded by the real-time tire pressure monitoring and warning subunit, the vehicle over-heat monitoring and warning subunit, and the new energy vehicle lithium-ion power battery explosion prevention and control subunit. When the analysis result triggers an alarm, alarm information is separately sent to the remote manage-ment unit 600 and the alarm prompt unit 500; and a management instruction such as threshold setting adjust-ment of the remote management unit 600 is sent to the real-time tire pressure monitoring and warning subunit, the vehicle overheat monitoring and warning subunit, and/or the new energy vehicle lithium-ion power battery explosion prevention and control subunit.

During specific deployment, the in-vehicle gateway unit 400 may be directly associated with each functional unit in the in-vehicle hazardous chemical safety monitoring unit 300.

The in-vehicle gateway unit 400 performs, by using the network communication module 410, communication con-nections and data exchange between various devices installed on the in-vehicle hazardous chemical physical and chemical safety monitoring and warning subunit, the in-vehicle hazardous chemical anti-theft and robbery monitor-ing and warning subunit, and the hazardous chemical trans-port emergency rescue guide subunit, and implements information interaction with the alarm prompt unit 500 and the remote management unit 600. The data storage module 420 performs aggregation and storage of various types of sensing and monitoring data, and the edge computing mod-ule 430 performs intelligent analysis on various types of monitoring data.

When the in-vehicle gateway unit 400 receives the moni-toring information of the in-vehicle hazardous chemical physical and chemical safety monitoring and warning sub-unit and the in-vehicle hazardous chemical anti-theft and robbery monitoring and warning subunit, and determines, through analysis, to trigger a warning or an alarm related to explosion or theft or robbery of the hazardous chemicals, the in-vehicle gateway unit 400 sends an audible and visual alarm or voice prompt information to the alarm prompt unit 500, and sends warning or alarm information and real-time monitoring information to the remote management unit 600. When the in-vehicle gateway unit 400 receives an alarm instruction, a voice prompt instruction, or alarm threshold setting adjustment or emergency rescue guide information sent by the remote management unit 600, the in-vehicle gateway unit 400 sends an alarm instruction and voice prompt instruction information to the alarm prompt unit 500, sends instruction information such as alarm threshold setting adjustment and circuit control to related monitoring devices of the in-vehicle hazardous chemical physical and chemical safety monitoring and warning subunit and the in-vehicle hazardous chemical anti-theft and robbery monitoring and warning subunit to adjust an alarm threshold of a monitoring sensor, start a positioning and tracking device or a related pinhole camera, and sends emergency rescue guide voice broadcast information to a voice broadcast module of the hazardous chemical transport emergency rescue guide sub-unit to instruct a driver and a passenger to perform prelimi-nary emergency disposal.

Based on FIG. 1, the alarm prompt unit 500 in this system may be disposed inside the vehicle cab, outside the vehicle, and monitoring client software of the remote management unit 600, and is associated with the in-vehicle gateway unit 400 of the vehicle.

The alarm prompt unit 500 is disposed in the cabin of the vehicle and outside the vehicle by using a local audible and visual alarm device or a voice prompt device, and is con-nected to the in-vehicle gateway unit. In this way, the local alarm prompt unit gives a voice prompt or an audible and visual alarm according to the monitoring and analysis result sent by the in-vehicle gateway unit.

This alarm prompt unit 500 is also connected to the in-vehicle gateway unit via the government industry man-agement client software, enterprise operation and manage-ment client software and driver and passenger service client software set in the remote management unit via the remote monitoring client. In this way, monitoring client of the remote alarm prompt unit generates a voice or text prompt according to the monitoring analysis result sent by the in-vehicle gateway unit.

Figure 28:
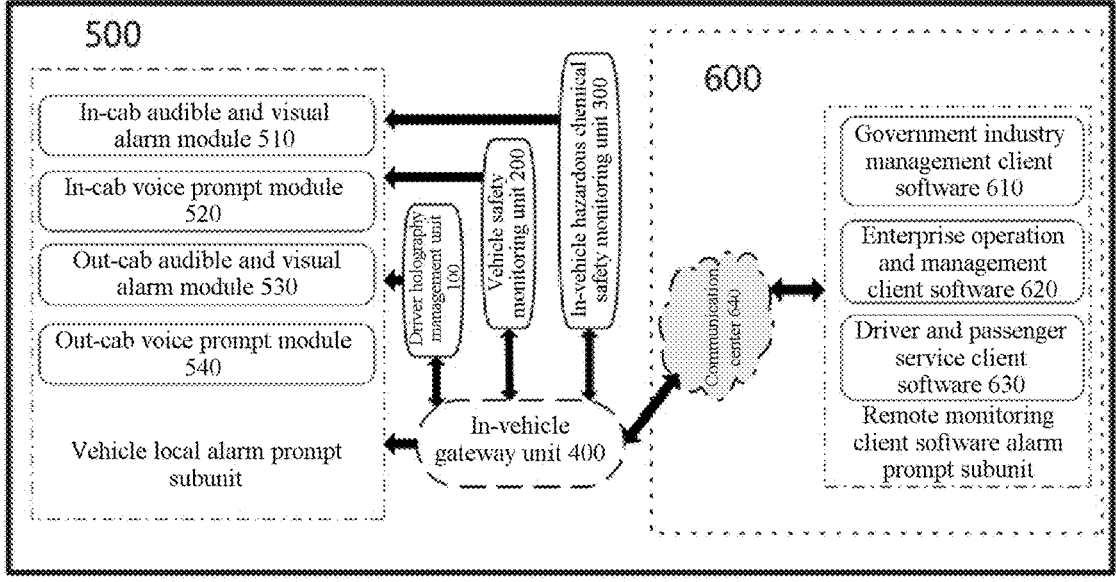
FIG. 28 is a schematic diagram of a composition principle and a use procedure of an alarm prompt unit according to an embodiment of the present invention.

FIG. 28 is a schematic diagram of a composition principle and a use procedure of the alarm prompt unit 500 according to this example.

Based on FIG. 28, the alarm prompt unit 500 provided in this example includes vehicle local alarm prompt subunits such as an in-cab audible and visual alarm module 510, an in-cab voice prompt module 520, an out-cab audible and visual alarm module 530, and an out-cab voice prompt module 540, and remote monitoring client software alarm prompt subunits such as the government industry manage-ment client 610, the enterprise operation and management client 620, and the driver and passenger service client 630 that cooperate with each other.

During specific deployment, the alarm prompt unit 500 in this embodiment may be directly associated with the driver identity verification subunit, the driver status monitoring subunit, and the in-vehicle gateway unit 400 in the driver holography management unit 100. When the vehicle local alarm prompt subunit receives a driver identity verification failure result sent by the driver identity verification subunit 110 or the driver identity verification subunit 110 by using the in-vehicle gateway unit 400, the alarm prompt unit 500 sends an audible and visual alarm, and prompts, via voice, the driver to adjust the posture for re-verification.

When the vehicle local alarm prompt subunit receives an abnormal driver emotion identification result, an abnormal behavior monitoring result, or an abnormal fatigue status monitoring result that is sent by the driver status monitoring subunit 120 or sent by the driver status monitoring subunit 120 by using the in-vehicle gateway unit 400, the alarm prompt unit 500 sends an audible and visual alarm and prompts, via voice, the driver to adjust the emotion, correct the unsafe driving behavior, concentrate, or stop nearby.

When the vehicle local alarm prompt subunit receives a severely abnormal monitoring result of the driver emotion identification result, behavior monitoring, or fatigue status that is sent by the driver status monitoring subunit 120 or sent by the driver status monitoring subunit 120 by using the in-vehicle gateway unit 400, the alarm prompt unit 500 sends an audible and visual alarm inside and outside the vehicle and voice inside and outside the vehicle to prompt the driver to adjust the emotion, correct the unsafe driving behavior, concentrate, or stop nearby, and instruct a passerby to be vigilant about the abnormal vehicle, avoid in time, or immediately report to the police.

When the remote monitoring client software alarm prompt subunit receives a driver identity verification failure result that is sent by the driver identity verification subunit 110 by using the in-vehicle gateway unit 400 and the communication center, the alarm prompt unit 500 sends an alarm prompt.

When the remote monitoring client software alarm prompt subunit receives an abnormal driver emotion identification result, an abnormal behavior monitoring result, or an abnormal fatigue status monitoring result that is sent by the driver status monitoring subunit 120 by using the in-vehicle gateway unit 400 and the communication center, the alarm prompt unit 500 sends an alarm prompt or sends a voice prompt.

When the remote monitoring client software alarm prompt subunit receives a severely abnormal monitoring result of the driver emotion identification result, the behavior monitoring, or the fatigue status that is sent by the driver status monitoring subunit 120 by using the in-vehicle gateway unit 400 and the communication center, the alarm prompt unit 500 sends an emergency alarm and a voice prompt, and starts the emergency management procedure according to the emergency plan by default.

During specific deployment, the alarm prompt unit 500 in this embodiment is indirectly associated with the vehicle safety monitoring unit 200 by using the in-vehicle gateway unit 400.

During such deployment, the in-cab audible and visual alarm module 510 in the alarm prompt unit 500 is configured to: when real-time tire pressure monitoring warning information, vehicle overheat monitoring warning information, or new energy vehicle lithium-ion power battery explosion warning information is received, send an audible and visual alarm. The light emitted by the audible and visual alarm of the audible and visual alarm module is red by default.

The in-cab voice prompt module 520 in the alarm prompt unit 500 is configured to: when real-time tire pressure monitoring warning information, vehicle overheat monitoring warning information, or new energy vehicle lithium-ion power battery explosion warning information is received, send a voice prompt to prompt the driver to stop nearby or immediately stop the vehicle for check. The in-cab voice prompt module and the in-cab audible and visual alarm module may be independently disposed or combined into a voice audible and visual alarm.

The out-cab audible and visual alarm module 530 in the alarm prompt unit 500 is configured to: when high-risk-level real-time tire pressure monitoring warning information, vehicle overheat monitoring warning information, or new energy vehicle lithium-ion power battery explosion warning information is received, send an audible and visual alarm. Generally, the light emitted by the audible and visual alarm device of the audible and visual alarm module is red by default, and the volume of the alarm sound is enough to alert passersby in a noisy environment.

The out-cab voice prompt module 540 in the alarm prompt unit 500 is configured to: when high-risk-level real-time tire pressure monitoring warning information, vehicle overheat monitoring warning information, or new energy vehicle lithium-ion power battery explosion warning information is received, send a voice prompt to prompt another person on the road to avoid as soon as possible. Voice alert content is spoken clearly enough to be clearly understood by the listener.

The government industry management client 610 in the alarm prompt unit 500 is configured to: when high-risk-level real-time tire pressure monitoring warning information, vehicle overheat monitoring warning information, or new energy vehicle lithium-ion power battery explosion warning information occurs, receive alarm information forwarded by the in-vehicle gateway unit by using the communication center. The government industry management client 610 starts the emergency management procedure according to the emergency plan by default when receiving high-risk-level real-time tire pressure monitoring warning information, vehicle overheat monitoring warning information, or new energy vehicle lithium-ion battery explosion warning information.

The enterprise operation and management client 620 in the alarm prompt unit 500 is configured to: when real-time tire pressure monitoring warning information, vehicle overheat monitoring warning information, or new energy vehicle lithium-ion power battery explosion warning information occurs, receive alarm information forwarded by the in-vehicle gateway unit by using the communication center. The enterprise operation and management client 620 starts the emergency management procedure according to the emergency plan by default and sends emergency alarm information to the government industry management client when receiving high-risk-level real-time tire pressure monitoring warning information, vehicle overheat monitoring warning information, new energy vehicle lithium-ion battery explosion warning information, or the like.

The driver and passenger service client 630 in the alarm prompt unit 500 is configured to: when real-time tire pressure monitoring warning information, vehicle overheat monitoring warning information, or new energy vehicle lithium-ion power battery explosion warning information occurs, receive alarm information forwarded by the in-vehicle gateway unit by using the communication center. The driver and passenger service client 630 sends a voice prompt while sending alarm information.

Based on FIG. 1 and FIG. 28, when receiving the real-time tire pressure monitoring warning information, the vehicle overheat monitoring warning information, or the new energy vehicle lithium-ion power battery explosion warning information by using the in-cab audible and visual alarm module 510, the alarm prompt unit 500 disposed in this way sends an audible and visual alarm.

When real-time tire pressure monitoring warning information, vehicle overheat monitoring warning information, or new energy vehicle lithium-ion power battery explosion warning information is received, a voice prompt is sent by using the in-cab voice prompt module 520 to prompt the driver to stop nearby or immediately stop the vehicle for check.

When high-risk-level real-time tire pressure monitoring warning information, vehicle overheat monitoring warning information, or new energy vehicle lithium-ion power battery explosion warning information is received, an audible and visual alarm is sent by using the out-cab audible and visual alarm module 530.

When high-risk-level real-time tire pressure monitoring warning information, vehicle overheat monitoring warning information, or new energy vehicle lithium-ion power battery explosion warning information is received, a voice prompt is sent by using the out-cab voice prompt module 540 to prompt another person on the road to avoid as soon as possible.

When high-risk-level real-time tire pressure monitoring warning information, vehicle overheat monitoring warning information, or new energy vehicle lithium-ion battery explosion warning information forwarded by the vehicle gateway by using the communication center is received, the emergency management procedure is started by using the government industry management client 610 according to the emergency plan.

When real-time tire pressure monitoring warning information, vehicle overheat monitoring warning information, or new energy vehicle lithium-ion battery explosion warning information forwarded by the vehicle gateway by using the communication center is received, and when high-risk-level warning or alarm information is received, the emergency management procedure is started by using the enterprise operation and management client 620 according to the emergency plan and emergency alarm information is sent to the government industry management client.

When real-time tire pressure monitoring warning information, vehicle overheat monitoring warning information, or lithium-ion power battery explosion warning information forwarded by the in-vehicle gateway unit by using the communication center is received, a voice prompt is sent by using the driver and passenger service client 630.

During specific deployment, the alarm prompt unit 500 in this embodiment is indirectly associated with the in-vehicle hazardous chemical safety monitoring unit 300 by using the in-vehicle gateway unit 400.

When the alarm prompt unit 500 deployed in this way exchanges data with the in-vehicle hazardous chemical safety monitoring unit 300, the in-cab audible and visual alarm module 510 in the alarm prompt unit 500 is configured to send an audible and visual alarm when in-vehicle hazardous chemical physical and chemical safety monitoring warning information and in-vehicle hazardous chemical anti-theft and robbery monitoring warning information are received. For example, the light emitted by the audible and visual alarm of the audible and visual alarm module is generally red by default.

The in-cab voice prompt module 520 in the alarm prompt unit 500 is configured to: when receiving high-risk-level in-vehicle hazardous chemical physical and chemical safety monitoring warning information, and in-vehicle hazardous chemical anti-theft and robbery monitoring warning information, send a voice prompt to prompt the driver to stop nearby or immediately for check, or when receiving in-vehicle hazardous chemical emergency rescue guide information, send a voice broadcast so as to instruct the driver and the passenger to perform preliminary emergency disposal. For example, the in-cab voice prompt module and the in-cab audible and visual alarm module may be independently disposed or combined into a voice and visual alarm.

The out-cab audible and visual alarm module 530 in the alarm prompt unit 500 is configured to: when receiving high-risk-level in-vehicle hazardous chemical physical and chemical safety monitoring warning information or in-vehicle hazardous chemical anti-theft and robbery monitoring warning information, send an audible and visual alarm. For example, the light emitted by the audible and visual alarm of the audible and visual alarm module is generally red by default, and the volume of the alarm sound is sufficient to alert a passersby in a noisy environment.

The out-cab voice prompt module 540 in the alarm prompt unit 500 is configured to: when receiving high-risk-level in-vehicle hazardous chemical physical and chemical safety monitoring warning information or in-vehicle hazardous chemical anti-theft and robbery monitoring warning information, send a voice prompt, so as to prompt another person on the road to avoid as soon as possible or warn lawbreakers to stop their robbery or crime. As an example, the voice alert content is clear enough to be clearly understood by the listener.

The government industry management client software 610 is configured to: when high-risk-level in-vehicle hazardous chemical physical and chemical safety monitoring warning information or in-vehicle hazardous chemical anti-theft and robbery monitoring warning information occurs, receive alarm information forwarded by the vehicle gateway by using the communication center. For example, when receiving high-risk-level in-vehicle hazardous chemical physical and chemical safety monitoring warning information or in-vehicle hazardous chemical anti-theft and robbery monitoring warning information, the government industry management client software starts the emergency management procedure by default according to the emergency plan.

The enterprise operation and management client software 620 is configured to: when in-vehicle hazardous chemical physical and chemical safety monitoring warning information or in-vehicle hazardous chemical anti-theft and robbery monitoring warning information occurs, receive alarm information forwarded by the vehicle gateway by using the communication center. For example, when receiving high-risk-level in-vehicle hazardous chemical physical and chemical safety monitoring warning information or in-vehicle hazardous chemical anti-theft and robbery monitoring warning information, the enterprise operation and management client software starts the emergency management procedure according to the emergency plan by default, pushes in-vehicle hazardous chemical emergency rescue guide file information to the in-vehicle hazardous chemical emergency rescue guide module, and sends emergency alarm information to the government industry management client.

The driver and passenger service client software 630 is configured to: when in-vehicle hazardous chemical physical and chemical safety monitoring warning information or in-vehicle hazardous chemical anti-theft and robbery monitoring warning information occurs, receive alarm information forwarded by the vehicle gateway by using the communication center or push in-vehicle hazardous chemical emergency rescue guide file information. For example, the driver and passenger service client sends a voice prompt while sending alarm information.

Based on FIG. 1 and FIG. 28, the alarm prompt unit 500 disposed in this way may be configured to send an audible and visual alarm by using the in-cab audible and visual alarm module 510 when receiving the in-vehicle hazardous chemical physical and chemical safety monitoring warning information sent by the in-vehicle hazardous chemical anti-theft and robbery monitoring and warning subunit in the in-vehicle hazardous chemical safety monitoring and warning unit 300 and the in-vehicle hazardous chemical anti-theft and robbery monitoring warning information sent by the in-vehicle hazardous chemical anti-theft and robbery monitoring and warning subunit.

The in-cab voice prompt module 520 may be configured to: when receiving the in-vehicle hazardous chemical physical and chemical safety monitoring warning information sent by the hazardous chemical physical and chemical safety monitoring and warning unit, or when receiving the in-vehicle hazardous chemical anti-theft and robbery monitoring warning information sent by the in-vehicle hazardous chemical anti-theft and robbery monitoring and warning subunit, send a voice prompt to remind the driver to stop nearby or immediately for check, or when receiving the in-vehicle hazardous chemical emergency rescue guide information sent by the hazardous chemical transport emergency rescue guide subunit, send a voice broadcast to instruct the driver and the passenger to perform preliminary emergency disposal.

The out-cab audible and visual alarm module 530 may be configured to: when receiving the high-risk-level in-vehicle hazardous chemical physical and chemical safety monitoring warning information sent by the hazardous chemical physical and chemical safety monitoring and warning unit or the in-vehicle hazardous chemical anti-theft and robbery monitoring warning information sent by the in-vehicle hazardous chemical anti-theft and robbery monitoring and warning subunit, send an audible and visual alarm.

The out-cab voice prompt module 540 may be configured to: when receiving the high-risk-level in-vehicle hazardous chemical physical and chemical safety monitoring warning information sent by the hazardous chemical physical and chemical safety monitoring and warning unit or the in-vehicle hazardous chemical anti-theft and robbery monitoring warning information sent by the in-vehicle hazardous chemical anti-theft and robbery monitoring and warning subunit, send a voice prompt, so as to prompt another person on the road to avoid as soon as possible or warn lawbreakers to stop their robbery or crime.

The alarm prompt unit 500 disposed in this way can be further configured to receive, by using the government industry management client software 610, the alarm information forwarded by the in-vehicle gateway unit 400 by using the communication center when the high-risk-level in-vehicle hazardous chemical physical and chemical safety monitoring warning information or the in-vehicle hazardous chemical anti-theft and robbery monitoring warning information occurs.

The enterprise operation and management client software 620 is configured to receive the alarm information forwarded by the in-vehicle gateway unit 400 by using the communication center when the in-vehicle hazardous chemical physical and chemical safety monitoring warning information or the in-vehicle hazardous chemical anti-theft and robbery monitoring warning information occurs. When receiving high-risk-level in-vehicle hazardous chemical physical and chemical safety monitoring warning information or in-vehicle hazardous chemical anti-theft and robbery monitoring warning information, the enterprise operation and management client software starts the emergency management procedure according to the emergency plan by default, pushes in-vehicle hazardous chemical emergency rescue guide file information to the in-vehicle hazardous chemical emergency rescue guide module, and sends emergency alarm information to the government industry management client 610.

The driver and passenger service client software 630 is configured to receive the alarm information forwarded by the in-vehicle gateway unit 400 by using the communication center or push the in-vehicle hazardous chemical emergency rescue guide file information when the in-vehicle hazardous chemical physical and chemical safety monitoring warning information or the in-vehicle hazardous chemical anti-theft and robbery monitoring warning information occurs. The driver and passenger service client sends a voice prompt while sending alarm information.

The remote management unit 600 in this system is constructed based on a cloud platform, and is disposed on a cloud platform and/or a local storage server of a government industry supervisory department related to vehicle transportation and/or a personal handheld intelligent terminal of a related management staff, a cloud platform and/or a local storage server of a transportation enterprise to which the vehicle belongs and/or a related transportation party and/or a personal handheld intelligent terminal of a related management staff, or a personal handheld intelligent terminal of a driver or a passenger, and is associated with the driver holography management unit 100, the vehicle safety monitoring unit 200, and the in-vehicle hazardous chemical safety monitoring unit 300 (hereinafter referred to as front-end monitoring units for ease of description) on a front-end vehicle.

The remote management unit 600 is deployed in a multi-level real-time synchronous linkage manner, and can receive real-time information sent by the front-end monitoring unit, perform multi-level synchronization display on the received information, and/or perform multi-level synchronization processing according to the received information, so as to form corresponding feedback information for the front-end monitoring unit.

The remote management unit 600 can receive a driver identity verification result, a driver status monitoring result, and a vehicle management and driver management control instruction that are sent by the front-end monitoring unit, or receive a driver identity information collection result and a driver status monitoring information collection result that are sent by the front-end monitoring unit, compare and identify identity information of the driver or consistency between the identity information and the biometric feature information or related identity information, a biometric feature and official archive database information, and enterprise archive information to which the driver belongs, perform identification, analysis, and determining on a real-time emotion and/or abnormal driving behavior and/or fatigue status of the driver, provide a vehicle management and driver management control instruction according to the emotion identification result and/or the abnormal behavior analysis result and/or the fatigue status determination result, and feed back the vehicle management and driver management control instruction to the receiving front-end monitoring unit, so as to send an audible and visual alarm, a voice prompt, or control the vehicle ACC to start or stop, or control the vehicle to perform speed limit, deceleration, or emergency braking.

The remote management unit 600 can set, according to an instruction sent by the front-end monitoring unit, an alarm threshold for adjusting a related sensor, send emergency rescue guide information to the hazardous chemical transport emergency rescue guide subunit, perform voice broadcast guidance or video file guidance, and receive in-vehicle hazardous chemical physical and chemical safety monitoring information and in-vehicle hazardous chemical anti-theft and robbery monitoring warning information sent by the front-end monitoring unit.

The remote management unit 600 can receive risk alarm information sent by the front-end monitoring unit, and send emergency disposal and emergency rescue management information according to the emergency plan when receiving a high-risk alarm.

Figure 29:
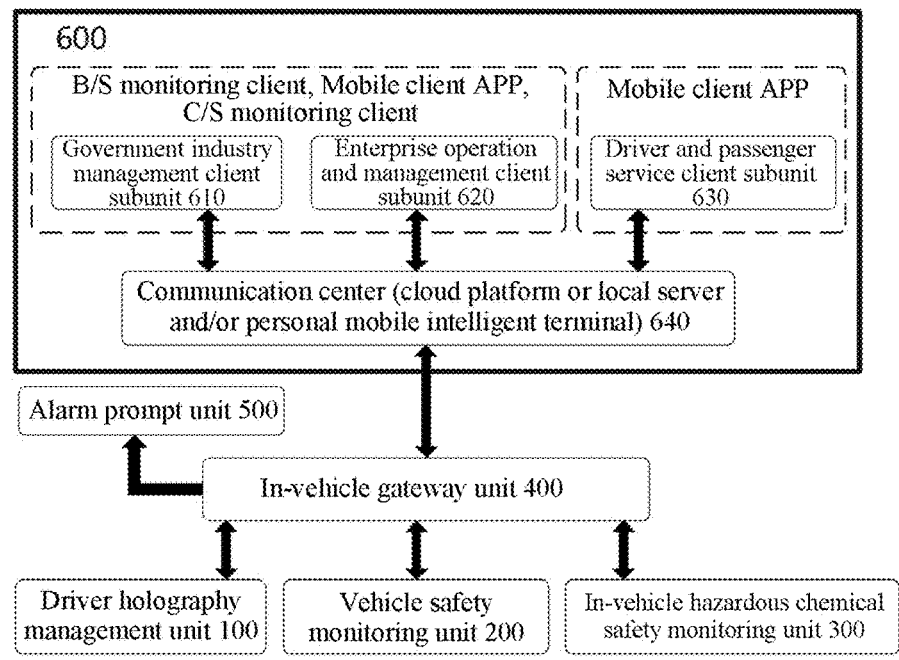
FIG. 29 is a schematic diagram of a composition principle and a use procedure of a remote management unit according to an embodiment of the present invention.

FIG. 29 is a schematic diagram of a composition principle and a use procedure of the remote management unit 600 according to this example.

Based on FIG. 29, the remote management unit 600 provided in this example includes a government industry management client subunit 610, an enterprise operation and management client subunit 620, a driver and passenger service client subunit 630, and a communication center (a cloud platform or a local server and/or a personal mobile intelligent terminal) 640 that cooperate with each other.

The government industry management client subunit 610 can receive and display the driver identity certificate collection result, the driver biometric feature information collection result, and the identity verification result that are sent by the front-end monitoring unit, perform supplementary content identity verification according to the driver identity certificate collection result and the driver biometric feature information collection result, receive and display the driver status monitoring result sent by the front-end monitoring unit, send a related management instruction according to the received driver status monitoring result, and manage the driver; and when the driver status monitoring result shows a severe abnormality, start the emergency management procedure and issue a related emergency disposal instruction.

The government industry management client subunit 610 is further configured to: receive the high-risk-level real-time tire pressure monitoring warning information, the vehicle overheat monitoring warning information, and the new energy vehicle lithium-ion power battery explosion warning information that are sent by the front-end monitoring unit, send a related management instruction according to the received warning information, start the emergency management procedure, and issue a related emergency disposal instruction.

The government industry management client subunit 610 is further configured to receive and display high-risk-level in-vehicle hazardous chemical physical and chemical safety monitoring warning information or in-vehicle hazardous chemical anti-theft and robbery monitoring warning information sent by the front-end monitoring unit, send a related management instruction according to the received warning information, start the emergency management procedure, and issue a related emergency disposal instruction.

The enterprise operation and management client subunit 620 receives and displays the driver identity certificate collection result, the driver biometric feature information collection result, and the identity verification result that are sent by the front-end monitoring unit for the driver of the hazardous chemical transport vehicle, performs supplementary content identity verification according to the driver identity certificate collection result and the driver biometric feature information collection result, receives and displays the driver status monitoring result sent by the front-end monitoring unit, sends a related management instruction according to the received driver status monitoring result, and manages the driver; and when the driver status monitoring result shows a severe abnormality, start the emergency management procedure, send an emergency alarm to the government industry management client, and issue a related emergency disposal instruction.

The enterprise operation and management client subunit 620 is further configured to receive and display real-time tire pressure monitoring warning information, vehicle overheat monitoring warning information, or new energy vehicle lithium-ion power battery explosion warning information sent by the front-end monitoring unit for the hazardous chemical transport vehicle, and send a related management instruction according to the received warning or alarm information. When receiving high-risk-level real-time tire pressure monitoring warning information, vehicle overheat monitoring warning information, or new energy vehicle lithium-ion power battery explosion warning information, the enterprise operation and management client subunit 620 starts the emergency management procedure, sends an emergency alarm to the government industry management client, and issues a related emergency disposal instruction.

The enterprise operation and management client subunit 620 is further configured to receive and display in-vehicle hazardous chemical physical and chemical safety monitoring warning information or in-vehicle hazardous chemical anti-theft and robbery monitoring warning information sent by the front-end monitoring unit for the in-vehicle hazardous chemicals, and send a related management instruction or emergency rescue guide information according to the received warning and alarm information; and when receiving high-risk-level in-vehicle hazardous chemical physical and chemical safety monitoring warning information or in-vehicle hazardous chemical anti-theft and robbery monitoring warning information, start the emergency management procedure, push in-vehicle hazardous chemical emergency rescue guide file information to the front-end monitoring unit, send an emergency alarm to the government industry management client, and issue a related emergency disposal instruction.

The driver and passenger service client subunit 630 receives and displays the identity verification result sent by the front-end monitoring unit for the driver of the hazardous chemical transport vehicle, sends a vehicle start prompt or a posture adjustment re-verification prompt according to the driver identity verification result, receives and displays the driver status monitoring result sent by the front-end monitoring unit, and sends a related alarm prompt according to the received driver status monitoring result.

The driver and passenger service client subunit 630 is further configured to: receive and display real-time tire pressure monitoring warning information, vehicle overheat monitoring warning information, or new energy vehicle lithium-ion power battery explosion warning information sent by the front-end monitoring unit for the hazardous chemical transport vehicle, and according to the received alarm or warning information, send an audible and visual alarm, a voice prompt, and an emergency rescue guide corresponding to the alarm or warning information, prompt the driver to stop nearby or immediately for check, and provide a corresponding emergency disposal guiding solution.

The driver and passenger service client subunit 630 is further configured to: receive and display in-vehicle hazardous chemical physical and chemical safety monitoring warning information or in-vehicle hazardous chemical anti-theft and robbery monitoring warning information sent by the front-end monitoring unit for the in-vehicle hazardous chemicals, and according to the received alarm or warning information, send an audible and visual alarm, a voice prompt, and an emergency rescue guide corresponding to the alarm or warning information, prompt the driver to stop nearby or immediately for check, and provide a corresponding emergency disposal guiding solution.

The communication center 640 is also used as a computer system environment of the government industry management client subunit 610, the enterprise operation and management client subunit 620, and the driver and passenger service client subunit 630, supports related software applications, and forwards a management instruction or a response instruction of the government industry management client subunit, the enterprise operation and management client subunit, and the driver and passenger service client subunit to the in-vehicle gateway unit.

Specifically, the communication center 640 may communicate with the front-end monitoring unit, receive and store the driver identity certificate collection result, the driver biometric feature information collection result, or the identity verification result that is sent by the front-end monitoring unit for the driver of the hazardous chemical transport vehicle, and receive and store the facial expression dynamic information of the current driver, the collected head and face action and body action posture information of the current driver, the collected head and face action information of the current driver, and the collected load situation information or the driver status monitoring result at different points of the seat under the driver. When the biometric feature information comparison component, the emotion intelligent analysis and identification component, the abnormal behavior analysis and identification component, the fatigue status analysis component based on video analysis, or the fatigue status analysis component based on sensor network analysis is disposed in the remote management unit 600, biometric feature information comparison, emotion intelligent analysis and identification, abnormal behavior analysis and identification, and fatigue status analysis and determining may be performed by using the cloud platform or the local server of the communication center 640.

The communication center 640 further receives and stores real-time tire pressure monitoring warning information, vehicle overheat monitoring warning information, or new energy vehicle lithium-ion power battery explosion warning information sent by the front-end monitoring unit for the hazardous chemical transport vehicle, and separately forwards the information to the government industry management client subunit 610, the enterprise operation and management client subunit 620, and the driver and passenger service client subunit 630.

The communication center 640 further receives and stores in-vehicle hazardous chemical physical and chemical safety monitoring warning information or in-vehicle hazardous chemical anti-theft and robbery monitoring warning information sent by the front-end monitoring unit for the in-vehicle hazardous chemicals, and separately forwards the information to the government industry management client subunit 610, the enterprise operation and management client subunit 620, and the driver and passenger service client subunit 630.

The remote management unit 600 formed in this way effectively manages and monitors transportation of hazardous chemicals across administrative regions and levels, links the in-vehicle hazardous chemical physical and chemical safety monitoring information and anti-theft and robbery monitoring information with the supervisory industry department and the belonging department in real time, and effectively improves emergency disposal efficiency of hazardous chemical transport safety accidents and anti-terrorism and defense capability of hazardous chemical transport.

The vehicle transport safety monitoring system for hazardous chemicals developed based on the foregoing solution can implement all-element management for the transportation process of hazardous chemicals, that is, for the transportation process of hazardous chemicals, comprehensive real-time monitoring and risk warning on a person (a driver and/or an escort), a vehicle (vehicle carrying hazardous chemicals), and a thing (in-vehicle hazardous chemicals) are performed simultaneously, and multi-industry and multi-level linkage control can be performed, so as to ensure transport safety of the hazardous chemicals and eliminate various safety risks. This vehicle transport safety monitoring system for hazardous chemicals is applicable to vehicles that transport hazardous chemicals, especially vehicles that carry explosive hazardous chemicals.

Based on this, the embodiments of the present invention further clearly provide specific devices that may be involved in composition modules of units in the vehicle transport safety monitoring system for hazardous chemical.

Figure 4:
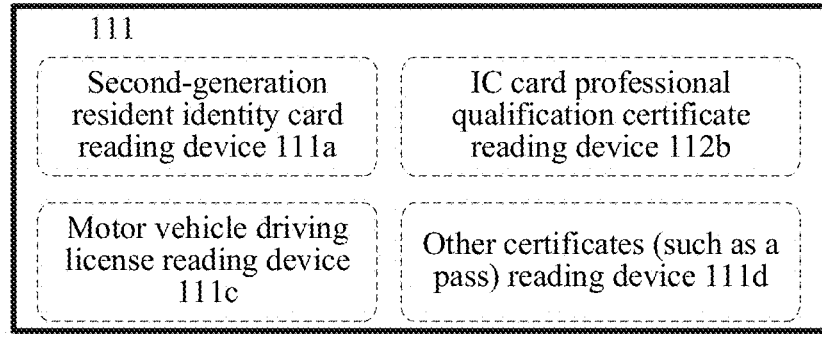
FIG. 4 is a schematic diagram of a driver identity certificate reading module of a driver identity verification subunit according to an embodiment of the present invention.

FIG. 4 is a schematic composition diagram of the driver identity certificate reading module 111 in the driver identity verification subunit 110 according to this embodiment.

Based on FIG. 4, the identity certificate reading module 111 in the driver identity verification subunit 110 provided in this embodiment includes but is not limited to a second-generation resident identity card reading device 111a, an IC card qualification certificate reading device 111B, and/or a motor vehicle driving license reading device 1/1c and/or another certificate (such as a passport) reading device 111d. A specific type of the device to be used is determined according to a management requirement, and is not limited herein. Generally, at least the second-generation resident identity card reading device 111a should be available, and for a type of an operating vehicle for which the driver needs to hold a qualification certificate for work, at least the second-generation resident identity card reading device 111a and the IC card qualification certificate reading device 111B should be available.

According to this configuration, the identity certificate reading module 111 may read the second-generation resident identity card of the driver by using the second-generation resident identity card reading device 111a. Forms of the second-generation resident identity card reading device 111a include but are not limited to an external independent resident identity card reader, an embedded resident identity card reading module, or a built-in resident identity card reading component of an intelligent terminal. This is specifically determined according to installation conditions of the vehicle, and is not limited herein.

The identity certificate reading module 111 may use the IC card qualification certificate reading device 111B to read the IC card qualification certificates of road transport practitioners such as road passenger transport drivers, road hazardous cargo transport practitioners, road passenger and cargo transport drivers, and some taxi drivers. Specific forms of the IC card qualification certificate reading device 111B include but are not limited to a radio frequency identification (RFID) card reader or an intelligent handheld terminal that has an NFC function and that reads chip information of the IC card qualification certificate, a code scanner that reads two-dimensional code information on the surface of the IC card qualification certificate or an intelligent handheld terminal that has a two-dimensional code scanning function, a certificate collector that reads text information on the surface of the IC card qualification certificate, or an intelligent handheld terminal that has an OCR function. This is specifically determined according to installation conditions of the vehicle, and is not limited herein.

The identity certificate reading module 111 may read, by using the motor vehicle driving license reading device 111c, the motor vehicle driving license held by the driver. The forms of the motor vehicle driving license reading device 111c include but are not limited to a radio frequency identification (RFID) card reader for reading a chip-included motor vehicle driving license or an intelligent handheld terminal that has an NFC function, a code scanner for reading two-dimensional code information on the surface of the motor vehicle driving license, or an intelligent handheld terminal that has a two-dimensional code scanning function, a certificate collector for reading text information on the surface of the motor vehicle driving license, or an intelligent handheld terminal that has an OCR function. This is specifically determined according to installation conditions of the vehicle, and is not limited herein.

The identity certificate reading module 111 reads, by using another certificate (such as a pass) reading device 111d, another certificate such as a pass held by the driver. The form of the another certificate (such as a pass) reading device 111d is determined according to a status of the read certificate, and includes but is not limited to a radio frequency identification (RFID) card reader for reading a chip-included certificate or an intelligent handheld terminal that has an NFC function, a code scanner for reading two-dimensional code information on the surface of the certificate or an intelligent handheld terminal that has a two-dimensional code scanning function, a certificate collector for reading text information on the surface of the certificate, or an intelligent handheld terminal that has an OCR function. This is specifically determined according to installation conditions of the vehicle, and is not limited herein.

Figure 5:
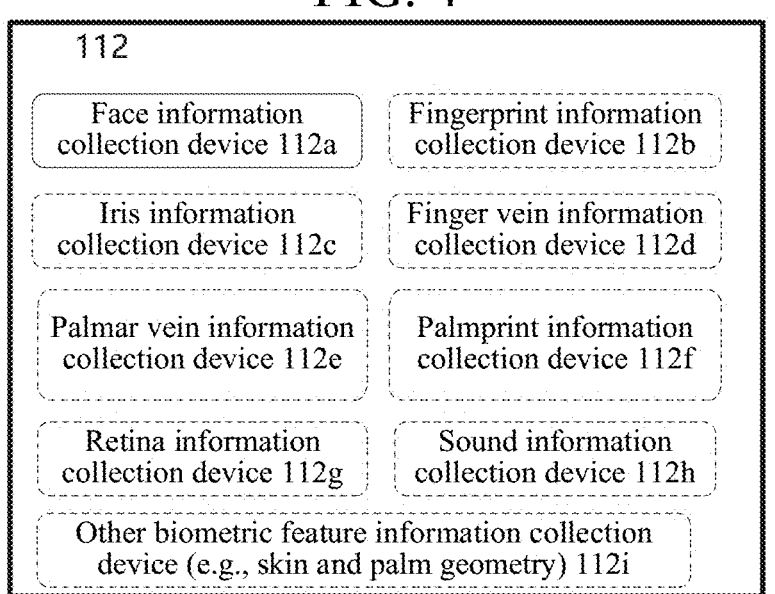
FIG. 5 is a schematic diagram of a biometric feature information collection module of a driver identity verification subunit according to an embodiment of the present invention.

Further, FIG. 5 is a schematic diagram of composition of the biometric feature information collection module 112 according to this example.

Based on FIG. 5, the biometric feature information collection module 112 provided in this embodiment includes but is not limited to a face information collection device 112a, a fingerprint information collection device 112b, an iris information collection device 112c, a finger vein information collection device 112d, a palm vein information collection device 112e, a palm print information collection device 112f, a retina information collection device 112g, a sound information collection device 112h, or another biometric feature information (such as a skin or a geometric feature of a palm) collection device 112i. This is specifically determined according to a requirement of a related government industry supervisory department, and is not limited herein. However, a non-contact biometric feature collection manner such as the face information collection device 112a, the iris information collection device 112c, the retina information collection device 112g, or the sound information collection device 112h is preferably used.

The biometric feature information collection module 112 may collect the front face information of the driver by using the face information collection device 112a. A specific form of the face information collection device 112a includes but is not limited to an external video collection camera and an embedded video collection camera, and a specific type includes but is not limited to a visible light video collection camera, a near-infrared video collection camera, a dedicated camera or a three-dimensional face collector for collecting three-dimensional face information. This is specifically determined according to the installation conditions of the vehicle and carrier department management requirements, and is not limited herein.

The biometric feature information collection module 112 may collect the fingerprint information of the driver by using the fingerprint information collection device 112b. A form of the fingerprint information collection device 112b includes but is not limited to an external fingerprint collector and an embedded fingerprint collection component. A specific type includes but is not limited to an optical fingerprint collector, a thermal fingerprint collector, and a biological radio frequency fingerprint collector. This is specifically determined according to the installation conditions of the vehicle and carrier department management requirements, and is not limited herein.

The biometric feature information collection module 112 may collect the iris information of the driver by using the iris information collection device 112c. A specific form of the iris information collection device 112c includes but is not limited to an external iris collector and an embedded iris collector. The type of the iris information collection device includes but is not limited to a monocular iris collector (device) and a binocular iris collector (device). This is specifically determined according to the installation conditions of the vehicle and carrier department management requirements, and is not limited herein.

The biometric feature information collection module 112 may collect the finger vein information of the driver by using the finger vein information collection device 112d. A specific form of the vein information collection device 124 includes but is not limited to an external finger vein collector and an embedded finger vein collection component. The type of the vein information collection device includes but is not limited to a single-finger vein collector and a vein-plus-fingerprint composite collector. This is specifically determined according to the installation conditions of the vehicle and carrier department management requirements, and is not limited herein.

The biometric feature information collection module 112 may collect palm vein information of the driver by using the palm vein information collection device 112e. A specific form of the palm vein information collection device 112e includes but is not limited to an external desktop palm vein collector, an external handheld palm vein collector, and an embedded palm vein collection component. The type of the palm vein information collection device includes but is not limited to a single-palm vein collector and a palm vein plus palmprint composite collector. This is specifically determined according to the installation conditions of the vehicle and carrier department management requirements, and is not limited herein.

The biometric feature information collection module 112 may collect the palmprint information of the driver by using the palmprint information collection device 112f. A specific form of the palmprint information collection device 112f includes but is not limited to an external desktop palmprint collector, an external handheld palmprint collector, and an embedded palmprint collection component. In addition, the type of the palmprint information collection device includes but is not limited to a single-palmprint collector and a palmprint plus palm vein composite collector. This is specifically determined according to the installation conditions of the vehicle and carrier department management requirements, and is not limited herein.

The biometric feature information collection module 112 may collect the retina information of the driver by using the retina information collection device 112g. A specific form of the retina information collection device 112g includes but is not limited to an external retinal collector and an embedded retinal collector. The type of the retina information collection device includes but is not limited to a monocular retinal collector (device) and a binocular retinal collector (device). This is specifically determined according to the installation conditions of the vehicle and carrier department management requirements, and is not limited herein.

The biometric feature information collection module 112 may collect the sound information of the driver by using the sound information collection device 112h. A specific form of the sound information collection device 112h includes but is not limited to an external sound collector and an embedded sound collector. The type of the sound information collection device includes but is not limited to a microphone, a mic, and a sound pickup. This is specifically determined according to the installation conditions of the vehicle and carrier department management requirements, and is not limited herein.

The biometric feature information collection module 112 may collect, by using the another biometric feature information (for example, a skin or a geometric feature of a palm) collection device 112i, other biometric feature information such as interior live-body feature information of the driver's skin, and physical feature information of the palm and the finger. A specific form of the another biometric feature information (for example, a skin or a geometric feature of a palm) collection device 112*i* herein includes but is not limited to an external other biometric feature information (such as a skin and a geometric feature of a palm) collector, and an embedded other biometric feature information (such as a skin and a geometric feature of a palm) collector. In addition, the type of the another biometric feature information (for example, a skin or a geometric feature of a palm) collection device herein includes but is not limited to a skin light print collector and a hand shape reader. This is specifically determined according to the installation conditions of the vehicle and carrier department management requirements, and is not limited herein.

In cooperation with this embodiment, the biometric feature information comparison module 113 of the driver identity verification subunit in this embodiment specifically includes but is not limited to a face information comparison device, a fingerprint information comparison device, an iris information comparison device, a finger vein information comparison device, a palm vein information comparison device, a palmprint information comparison device, a retina information comparison device, a sound information comparison device, or another biometric feature information (such as a skin or a geometric feature of a palm) comparison device.

The face information comparison device herein is configured to: perform 1:1 comparison and verification on the digital face photo and/or the surface face image in the chip in the read identity certificate or another certificate and the face image information of the driver collected on the site, and perform 1:1 comparison and verification on the face image information of the driver collected on the site and face information that is in the database and corresponding to the read identity, and/or perform 1:N comparison and verification on the face image information of the driver collected on the site and face information of all authorized drivers in the database.

The form of the face information comparison device includes but is not limited to an authorized-person facial database and a comparison and identification component that are built in the identity verification unit, an authorized-person facial database and a comparison and identification component that are in the in-vehicle gateway unit, and an authorized-person facial database and a comparison and identification component that are in the remote management unit. This is specifically determined according to the installation conditions of the vehicle and carrier department management requirements, and is not limited herein.

The fingerprint information comparison device herein is configured to: perform 1:1 comparison and verification on the fingerprint information that is in the chip and that is in the read identity certificate or another certificate and the fingerprint information of the driver collected on the site, and perform 1:1 comparison and verification on the fingerprint information of the driver collected on the site and fingerprint information that is in the database and that is corresponding to the read identity, and/or perform 1:N comparison and verification on the fingerprint information of the driver collected on the site and fingerprint information that is of all authorized drivers and that is in the database.

Forms of the fingerprint information comparison device include but are not limited to an authorized-person fingerprint database and a comparison and identification component that are built in the identity verification unit, an authorized-person fingerprint database and a comparison and identification component that are in the in-vehicle gateway unit, and an authorized-person fingerprint database and a comparison and identification component that are in the remote management unit. This is specifically determined according to the installation conditions of the vehicle and carrier department management requirements, and is not limited herein.

The iris information comparison device herein is configured to: perform 1:1 comparison and verification on the read iris information (if any) in the chip in the identity certificate or another certificate and the iris information of the driver collected on the site, and/or perform 1:1 comparison and verification on the iris information of the driver collected on the site and iris information that is in the database and that is corresponding to the read identity, and/or perform 1:N comparison and verification on the iris information of the driver collected on the site and iris information of all authorized drivers in the database.

The iris information comparison device form includes but is not limited to an authorized-person iris database and a comparison and identification component that are built in the identity verification unit, an authorized-person iris database and a comparison and identification component that are in the in-vehicle gateway unit, and an authorized-person iris database and a comparison and identification component that are in the remote management unit. This is specifically determined according to the installation conditions of the vehicle and carrier department management requirements, and is not limited herein.

The finger vein information comparison device herein is configured to: perform 1:1 comparison and verification on the read finger vein information (if any) in the chip in the identity certificate or another certificate and the finger vein information of the driver collected on the site, and/or perform 1:1 comparison and verification on the finger vein information of the driver collected on the site and the finger vein information that is in the database and that corresponds to the read identity, and/or perform 1:N comparison and verification on the finger vein information of the driver collected on the site and the finger vein information of all authorized drivers in the database. Forms of the finger vein information comparison device include but are not limited to: an authorized-person finger vein database and a comparison and identification component that are built in the identity verification unit, an authorized-person finger vein database and a comparison and identification component that are in the in-vehicle gateway unit, and an authorized-person finger vein database and a comparison and identification component that are in the remote management unit. This is specifically determined according to the installation conditions of the vehicle and carrier department management requirements, and is not limited herein.

The palm vein information comparison device herein is configured to: perform 1:1 comparison and verification on the read palm vein information (if any) in the chip in the identity certificate or another certificate and the palm vein information of the driver collected on the site, and/or perform 1:1 comparison and verification on the palm vein information of the driver collected on the site and palm vein information that is in the database and that is corresponding to the read identity, and/or perform 1:N comparison and verification on the palm vein information of the driver collected on the site and palm vein information of all authorized drivers in the database. Forms of the palm vein information comparison device include but are not limited to an authorized-person palm vein database and a comparison and identification component that are built in the identity verification unit, an authorized-person palm vein database and a comparison and identification component that are in the in-vehicle gateway unit, and an authorized-person palm vein database and a comparison and identification component that are in the remote management unit. This is specifically determined according to the installation conditions of the vehicle and carrier department management requirements, and is not limited herein.

The palmprint information comparison device herein is configured to: perform 1:1 comparison and verification on the read palmprint information (if any) in the chip in the identity certificate or another certificate and the palmprint information of the driver collected on the site, and/or perform 1:1 comparison and verification on the palmprint information of the driver collected on the site and palmprint information that is in the database and that corresponds to the read identity, and/or perform 1:N comparison and verification on the palmprint information of the driver collected on the site and palmprint information of all authorized drivers in the database.

Forms of the palmprint information comparison device include but are not limited to an authorized-person palmprint database and a comparison and identification component that are built in the identity verification unit, an authorized-person palmprint database and a comparison and identification component that are in the in-vehicle gateway unit, and an authorized-person palmprint database and a comparison and identification component that are in the remote management unit. This is specifically determined according to the installation conditions of the vehicle and carrier department management requirements, and is not limited herein.

The retina information comparison device herein is configured to: perform 1:1 comparison and verification on the retina information (if any) in the chip in the read identity certificate or another certificate and the retina information of the driver collected on the site, and/or perform 1:1 comparison and verification on the retina information of the driver collected on the site and the retina information that is in the database and that is corresponding to the read identity, and/or perform 1:N comparison and verification on the retina information of the driver collected on the site and the retina information of all authorized drivers in the database.

Forms of the retina information comparison device include but are not limited to an authorized-person retina database and a comparison and identification component that are built in the identity verification unit, an authorized-person retina database and a comparison and identification component that are in the in-vehicle gateway unit, and an authorized-person retina database and a comparison and identification component that are in the remote management unit. This is specifically determined according to the installation conditions of the vehicle and carrier department management requirements, and is not limited herein.

The sound information comparison device herein is configured to: perform 1:1 comparison and verification on the read sound information feature (if any) in the chip in the identity certificate or another certificate and the sound information feature of the driver collected on the site, and/or perform 1:1 comparison and verification on the sound information feature of the driver collected on the site and the sound information feature that is in the database and that is corresponding to the read identity, and/or perform 1:N comparison and verification on the sound information feature of the driver collected on the site and the sound information features of all authorized drivers in the database.

Forms of the sound information comparison device include but are not limited to an authorized-person sound feature database and a comparison and identification component that are built in the identity verification unit, an authorized-person sound feature database and a comparison and identification component that are in the in-vehicle gateway unit, and an authorized-person sound feature database and a comparison and identification component that are in the remote management unit. This is specifically determined according to the installation conditions of the vehicle and carrier department management requirements, and is not limited herein.

The another biometric feature information comparison device such as a skin and a geometric feature of a palm herein is configured to: perform 1:1 comparison and verification on other biometric feature information (if any) such as the skin and the geometric feature of the palm in the chip in the read identity card or another certificate and other biometric feature information such as the skin and the geometric feature of the palm of the driver collected on site, and/or perform 1:1 comparison and verification on other biometric feature information such as the skin and the geometric feature of the palm of the driver collected on site and other biometric feature information that is corresponding to the read identity and that is in the database, and/or perform 1:N comparison and verification on other biometric feature information such as the skin and the geometric feature of the palm of the driver collected on site and other biometric feature information such as the skin and the geometric features of the palms of all authorized drivers in the database.

Forms of the another biometric feature information comparison device such as the skin and the geometric feature of the palm include but are not limited to an authorized-person another biometric feature database such as the skin and the geometric feature of the palm, and a comparison and identification component that are built in the identity verification unit, an authorized-person another biometric feature database such as the skin and the geometric feature of the palm, and a comparison and identification component that are in the in-vehicle gateway unit, and an authorized-person another biometric feature database such as the skin and the geometric feature of the palm, and a comparison and identification component that are in the remote management unit. This is specifically determined according to the installation conditions of the vehicle and carrier department management requirements, and is not limited herein.

Therefore, when the driver identity verification subunit 110 formed by the identity certificate reading module 111, the biometric feature information collection module 112, and the biometric feature information comparison module 113 that cooperate with each other is deployed, the driver identity verification subunit 110 may be directly associated with the vehicle control subunit, or may be indirectly associated with the vehicle control subunit and/or the remote management unit by using the in-vehicle gateway unit.

When the driver identity verification subunit 110 is directly associated with the vehicle control subunit 130, the vehicle ACC switch can be normally enabled after the driver identity verification succeeds. Otherwise, the vehicle ACC switch cannot be normally enabled. The alarm prompt unit 500 sends a verification failure alarm and prompts the driver to adjust the posture to re-collect the biometric feature. The verification result and the vehicle start status are uploaded to the remote management unit 600 by using the in-vehicle gateway unit 400.

When the driver identity verification subunit 110 is indirectly associated with the vehicle control subunit 130 by using the in-vehicle gateway unit 400, after the driver identity verification result is generated, the in-vehicle gateway unit 400 sends an instruction to the vehicle control subunit 130. After the verification succeeds, the vehicle ACC switch can be normally enabled. Otherwise, the vehicle ACC switch cannot be normally enabled. The alarm prompt unit 500 sends a verification failure alarm and prompts the driver to adjust the posture to re-collect the biometric feature. The verification result and the vehicle start status are uploaded to the remote management unit 600 by using the in-vehicle gateway unit 400.

When the driver identity verification subunit 110 is indirectly associated with the vehicle control subunit 130 by using the in-vehicle gateway unit 400, but the biometric feature database and the comparison and identification component are in the remote management unit, the driver identity certificate reading information and the biometric feature collection information are uploaded to the remote management unit 600 by using the in-vehicle gateway unit 400. After performing biometric feature information comparison and identification, the remote management unit 600 returns a verification result to the in-vehicle gateway unit 400. The in-vehicle gateway unit 400 sends an instruction to the vehicle control subunit 130. After verification succeeds, the vehicle ACC switch can be normally enabled. Otherwise, the vehicle ACC switch cannot be normally enabled. The alarm prompt unit 500 sends a verification failure alarm and prompts the driver to adjust the posture to re-collect the biometric feature. The vehicle start status is uploaded to the remote management unit 600 by using the in-vehicle gateway unit 400.

In a special state, the driver identity verification subunit 110 supports remote emergency authorization by using the remote management unit.

Further, FIG. 7 is a schematic diagram of a composition principle and a use procedure of the real-time emotion identification module 121 in the driver status monitoring unit 120 according to this example.

Based on FIG. 7, the real-time emotion identification module 121 in the driver status monitoring subunit 120 used in the vehicle transport safety monitoring system in this example includes a facial high-speed camera device 121a and an emotion intelligent analysis and identification device 121b.

The facial high-speed video camera device 121a herein is configured to collect facial expression dynamics of the current driver. The facial high-speed camera device 121a includes but is not limited to an external high-speed video capture camera and an embedded high-speed video capture camera. The type of the facial high-speed video camera device includes but is not limited to a visible light high-speed video collection camera, a near-infrared high-speed video collection camera, a dedicated high-speed camera for collecting three-dimensional facial expression motion, or a three-dimensional high-speed facial expression motion collector. This is specifically determined according to the installation conditions of the vehicle and carrier department management requirements, and is not limited herein.

The emotion intelligent analysis and identification device 121b herein is configured to perform intelligent analysis and identification on the facial expression dynamics collected by the facial high-speed camera device 121a, to determine a real-time emotion status of the current driver. The form of the emotion intelligent analysis and identification device includes but is not limited to an emotion intelligent analysis and identification component built in the driver status monitoring subunit, an emotion intelligent analysis and identification component in the in-vehicle gateway unit, and an emotion intelligent analysis and identification component in the remote management unit. In addition, that the types of the emotion intelligent analysis and identification device are different according to a technical principle includes but is not limited to facial expression analysis, micro-expression analysis, and facial micro-vibration analysis. This is specifically determined according to the installation conditions of the vehicle and carrier department management requirements, and is not limited herein.

Further, FIG. 8 is a schematic diagram of a composition principle and a use procedure of the abnormal behavior monitoring module 122 in the driver status monitoring unit 120 according to this example.

Based on FIG. 8, the abnormal behavior monitoring module 122 in the driver status monitoring subunit 120 provided in this example includes a head and face video collection device 122a, a body panoramic video collection device 122b, and an abnormal behavior analysis and identification device 122c.

The head and face video collection device 122a herein is configured to collect a head and face action of the current driver. The head and face video collection device 122a includes but is not limited to an external video collection camera and an embedded video collection camera. In addition, the type of the head and face video collection device 122a includes but is not limited to a visible light video collection camera and a near-infrared video collection camera. This is specifically determined according to the installation conditions of the vehicle and carrier department management requirements, and is not limited herein.

The body panoramic video collection device 122b herein is configured to collect a body action posture of the current driver. The body panoramic video collection device 122b includes but is not limited to an external video collection camera and an embedded video collection camera. In addition, the type of the body panoramic video collection device includes but is not limited to a visible light video collection camera and an infrared video collection camera. This is specifically determined according to the installation conditions of the vehicle and carrier department management requirements, and is not limited herein.

The abnormal behavior analysis and identification device 122c herein is configured to perform intelligent analysis and identification on the head and face action collected by the head and face video collection device 122a and the body action posture collected by the body panoramic video collection device 122b, so as to determine whether the current behavior status of the driver is abnormal in real time. The abnormal behavior analysis and identification device 122c includes but is not limited to an abnormal behavior analysis and identification component built in the driver status monitoring subunit, an abnormal behavior analysis and identification component in the in-vehicle gateway unit, and an abnormal behavior analysis and identification component in the remote management unit. In addition, the type of the abnormal behavior analysis and identification device includes head and face action analysis or body action posture analysis. This is specifically determined according to the installation conditions of the vehicle and carrier department management requirements, and is not limited herein.

Further, FIG. 9 is a schematic diagram of a composition principle and a use procedure of the fatigue status monitoring module 123 in the driver status monitoring subunit 120 according to this example.

Based on FIG. 9, the fatigue status monitoring module 123 provided in this example includes a head and face video collection device 123a, a fatigue status analysis device 123b based on video analysis, a seat load status collection device 123c, and a fatigue status analysis device 123d based on sensor network analysis.

The head and face video collection device 123a herein is configured to collect a head and face action of the current driver. The head and face video collection device includes but is not limited to an external video collection camera and an embedded video collection camera. In addition, the type of the head and face video collection device includes but is not limited to a visible light video collection camera and a near-infrared video collection camera. This is specifically determined according to the installation conditions of the vehicle and carrier department management requirements, and is not limited herein.

The fatigue status analysis device 123b based on video analysis herein is configured to perform intelligent analysis and identification on the head and face action collected by the head and face video collection device 123a, to determine a real-time fatigue degree of the current driver. The fatigue status analysis device based on video analysis includes but is not limited to a fatigue status analysis component based on video analysis built in the driver status monitoring subunit, a fatigue status analysis component based on video analysis in the in-vehicle gateway unit, and a fatigue status analysis component based on video analysis in the remote management unit. This is specifically determined according to the installation conditions of the vehicle and carrier department management requirements, and is not limited herein.

The seat load status collection device 123c herein is configured to collect load distribution situations at different points of the seat under the driver. The seat load status collection device includes but is not limited to a pressure sensor on an external seat cushion and a back rest that are laid on the seat, and an embedded pressure sensor built in the seat. In addition, according to different technical principles, types of the seat load status collection devices include but are not limited to a piezoelectric sensor, a piezoresistance sensor, and a strain sensor. This is specifically determined according to the installation conditions of the vehicle and carrier department management requirements, and is not limited herein.

The fatigue status analysis device 123d based on sensor network analysis herein is configured to perform intelligent analysis and identification on load situations and load status change situations of the seat under the driver seat at different points that are collected by the seat load status collection device 123c, so as to determine the real-time fatigue degree of the current driver. The fatigue status analysis device 123d based on sensor network analysis includes but is not limited to a fatigue status analysis component based on sensor network analysis built in the driver status monitoring subunit, a fatigue status analysis component based on sensor network analysis in the in-vehicle gateway unit, and a fatigue status analysis component based on sensor network analysis in the remote management unit. This is specifically determined according to the installation conditions of the vehicle and carrier department management requirements, and is not limited herein.

Therefore, when the driver status monitoring subunit 120 formed by the real-time emotion identification module 121, the abnormal behavior monitoring module 122, and the fatigue status monitoring module 123 that cooperate with each other is deployed, the driver status monitoring subunit 120 may be directly associated with the vehicle control subunit 130, or may be indirectly associated with the vehicle control subunit 130 and/or the remote management unit 600 by using the in-vehicle gateway unit 400.

When the driver status monitoring subunit 120 is directly associated with the vehicle control subunit 130, and when a real-time emotion identification result and/or an abnormal behavior monitoring result and/or a fatigue status monitoring result of the driver reach or exceed a risk threshold, the vehicle control subunit 130 controls the vehicle to perform speed limit, deceleration, or emergency braking, and the alarm prompt unit sends an alarm prompt of a hazardous state or hazardous behavior, and uploads an analysis or identification or determination result and an action status of the vehicle control subunit to the remote management unit 600 by using the in-vehicle gateway unit 400.

When the driver status monitoring subunit 120 is indirectly associated with the vehicle control subunit 130 by using the in-vehicle gateway unit 400, after a real-time emotion identification result and/or abnormal behavior monitoring result and/or fatigue status monitoring result of the driver reach or exceed the risk threshold, the in-vehicle gateway unit 400 sends an instruction to the vehicle control subunit 130. The vehicle control subunit 130 controls the vehicle to perform speed limit, deceleration, or emergency braking. The alarm prompt unit sends an alarm prompt of a hazardous state or hazardous behavior, and uploads an analysis or identification or determination result and an action status of the vehicle control subunit 130 to the remote management unit 600 by using the in-vehicle gateway unit 400.

The driver status monitoring subunit 120 is indirectly associated with the vehicle control subunit 130 by using the in-vehicle gateway unit 400. However, when the fatigue status analysis component based on video analysis or the fatigue status analysis component based on sensor network analysis is in the remote management unit 600, the facial expression dynamic information of the current driver that is collected by the facial high-speed camera device in the real-time emotion identification module 121 in the driver status monitoring subunit 120, the head and face action and body action posture information of the current driver that are collected by the head and face video collection device and the body panoramic video collection device in the abnormal behavior monitoring module 122, the head and face action information of the current driver that is collected by the head and face video collection device in the fatigue status monitoring module 123, and the load situation information of the different points of the seat under the driver that is collected by the seat load status collection device are uploaded the remote management unit 600 by using the in-vehicle gateway unit 400. The remote management unit 600 performs intelligent analysis identification or determining and returns the analysis identification or determination result to the in-vehicle gateway unit 400. The in-vehicle gateway unit 400 sends an instruction to the vehicle control subunit 130. The vehicle control subunit 130 controls the vehicle to perform speed limit, deceleration, or emergency braking, and the alarm prompt unit 500 sends an alarm prompt of a hazardous state or hazardous behavior, and uploads the action situation of the vehicle control subunit 130 to the remote management unit 600 by using the in-vehicle gateway unit.

FIG. 13 is a schematic diagram of composition of the tire air leakage monitoring module 211 in the real-time tire pressure monitoring and warning subunit 210 according to this example.

Based on FIG. 13, the tire air leakage monitoring module 211 provided in this example specifically includes a tire valve core air leakage monitoring device 211a, a tire tread air leakage monitoring device 211b, a tire foreign matter monitoring device 211c, a tire side and inner edge breakage monitoring device 211d, a hub flange deformation sensing and monitoring device 211e, a hub rupture monitoring device 211f, a sensing and transmitting device 211h corresponding thereto, and the like that cooperate with each other.

The tire valve core air leakage monitoring device 211a in the tire air leakage monitoring module 211 is configured to collect air flow information near the tire valve core.

The tire tread air leakage monitoring device 211b in the tire air leakage monitoring module 211 is configured to collect whether a tread with slow air leakage exists on the tire surface.

The tire foreign matter monitoring device 211c in the tire air leakage monitoring module 211 is configured to monitor whether a tire is inserted with a foreign matter such as a nail, a screw, an iron wire, a glass fragment, a spike, or a tile that may cause air leakage of the tire.

The tire side and inner edge breakage monitoring device 211d in the tire air leakage monitoring module 211 is configured to monitor whether breakage caused by friction or the like occurs on the side and the inner edge of the tire.

The hub flange deformation sensing and monitoring device 211e in the tire air leakage monitoring module 211 is configured to monitor deformation of the hub flange.

The hub rupture monitoring device 211f in the tire air leakage monitoring module 211 monitors the vehicle hub for rupture.

The tire air leakage monitoring module 211 disposed in this way collects air flow information near the tire air valve core by using the tire valve core air leakage monitoring device 211a, collects, by using the tire tread air leakage monitoring device 211b, whether a tread with slow air leakage exists on the tire surface; monitors, by using the tire foreign matter monitoring device 211c, whether a tire is inserted with an iron nail, a screw, an iron wire, a glass fragment, a sharp stone, a tile, and the like that may cause air leakage of the tire, monitors, by using the tire side and inner edge breakage monitoring device 211d, whether breakage caused by friction or the like occurs on the tire side and inner edge, monitors deformation of the hub flange by using the hub flange deformation sensing and monitoring device 211e, monitors, by using the hub rupture monitoring device 211f, whether the vehicle hub is ruptured, and uploads, by using the sensing and transmitting device 211h corresponding thereto, monitoring information to the edge computing module 430 of the in-vehicle gateway unit 400 for intelligent analysis and determining.

When the air leakage or deformation of the corresponding monitored object or the intelligent temperature analysis result triggers a tire air leakage warning, the network communication module 410 of the in-vehicle gateway unit 400 sends a corresponding audible and visual alarm or voice prompt to the alarm prompt unit 500, and at the same time, the network communication module 410 of the in-vehicle gateway unit 400 uploads the alarm prompt information to the remote management unit 600.

In a preferred solution, the tire low pressure monitoring module 212 in the real-time tire pressure monitoring and warning subunit 210 may include a direct tire pressure monitoring device, an indirect tire pressure monitoring device, and a sensing and transmitting device corresponding thereto.

The direct tire pressure monitoring device is configured to collect real-time pressure value information in a tire, and visually determine whether the tire is in a low pressure state.

The indirect tire pressure monitoring device is configured to collect a real-time speed difference between different tires of a vehicle, and determine consistency of rolling radii of wheels by using a rotation speed difference, so as to determine whether a tire is in a low air pressure state.

In a preferred solution, the tire temperature monitoring module 213 in the real-time tire pressure monitoring and warning subunit 210 may include a temperature sensing and monitoring device in each tire and a sensing and transmitting device corresponding thereto.

The temperature sensing and monitoring device in the tire herein is configured to obtain real-time information about a temperature status of each tire in the vehicle, and then determine, by using the temperature and the air pressure, whether there is a tire burst risk. Generally, the temperature sensing and monitoring device and the tire pressure monitoring device of the tire may be combined for deployment, for example, an integrated pressure and temperature sensor is used.

Therefore, during specific deployment, the real-time tire pressure monitoring and warning subunit 210 is preferably directly associated with the in-vehicle gateway unit 400, and is indirectly associated with the alarm prompt unit 500 and the remote management unit 600 of the vehicle by using the in-vehicle gateway unit 400. In this way, various monitoring devices of the tire air leakage monitoring module, the tire low pressure monitoring module, and the tire temperature monitoring module in the real-time tire pressure monitoring and warning subunit 210 send the monitoring information to the network communication module of the in-vehicle gateway unit by using the corresponding sensing and transmitting device, aggregate the monitoring data to the data storage module of the in-vehicle gateway unit, and perform intelligent analysis by using the edge computing module of the in-vehicle gateway unit. When the air leakage, deformation, or temperature analysis result of the corresponding monitored object triggers a real-time tire air leakage, tire low air pressure, or tire burst monitoring warning, the network communication module of the in-vehicle gateway unit sends a corresponding audible and visual alarm or voice prompt to the alarm prompt unit, and at the same time, the network communication module of the in-vehicle gateway unit uploads alarm prompt information to the remote management unit.

In this embodiment, the vehicle overheat monitoring and warning subunit 220 is preferably directly associated with the in-vehicle gateway unit 400 during specific deployment, and is indirectly associated with the alarm prompt unit 500 and the remote management unit 600 of the vehicle by using the in-vehicle gateway unit 400. Each type of temperature monitoring device in the engine/motor temperature monitoring module 221, the differential lock system temperature monitoring module 222, the tire temperature monitoring module 223, and/or the exhaust pipe temperature monitoring module 224 in the vehicle overheat monitoring and warning subunit 220 deployed in this way aggregates monitoring data into the data storage module of the in-vehicle gateway unit by using the network communication module of the in-vehicle gateway unit, and performs intelligent analysis by using the edge computing module of the in-vehicle gateway unit. In this way, when the temperature analysis result of the corresponding monitored object triggers a vehicle overheat monitoring warning, the network communication module of the in-vehicle gateway unit sends a corresponding audible and visual alarm or voice prompt to the alarm prompt unit, and at the same time, the network communication module of the in-vehicle gateway unit uploads alarm prompt information to the remote management unit.

For a composition feature of the new energy vehicle lithium-ion power battery and an existing safety problem, this embodiment provides corresponding specific composition example solutions for the battery cell temperature monitoring module 231, the battery cell deformation monitoring module 232, the battery cell air pressure monitoring module 233, the battery cell liquid leakage monitoring module 234, the battery compartment explosive gas monitoring module 235, the battery compartment ambient temperature monitoring module 236, the battery compartment smoke detection module 237, and the battery explosion suppression module 238 in the new energy vehicle lithium-ion power battery explosion prevention and control subunit 230.

For example, during specific construction, the battery cell temperature monitoring module 231 in the new energy vehicle lithium-ion power battery explosion prevention and control subunit 230 includes but is not limited to a battery cell internal temperature sensing and monitoring device and/or a battery cell internal resistance tomography device and a sensing and transmitting device corresponding thereto.

The battery cell internal temperature sensing and monitoring device is configured to obtain real-time information about a temperature status inside the new energy vehicle lithium-ion power battery cell, and determine, by using the temperature, whether the battery cell has an explosion risk.

The battery cell internal resistance tomography device herein is configured to obtain internal resistivity distribution information of the new energy vehicle lithium-ion power battery cell, and determine, according to distribution regularities of the temperature field and the electric field in the battery cell, whether there is a temperature abnormality and whether an explosion risk exists in the battery cell.

During specific construction, the battery cell deformation monitoring module 232 in the new energy vehicle lithium-ion power battery explosion prevention and control subunit 230 includes but is not limited to a battery cell internal deformation sensing and monitoring device and/or a battery cell surface variable resistance monitoring device and a sensing and transmitting device corresponding thereto.

The battery cell internal deformation sensing and monitoring device herein is configured to obtain real-time information about a deformation status of the new energy vehicle lithium-ion power battery cell, and determine, by using deformation, whether the battery ell has a risk of bulging or explosion.

The battery cell surface variable resistance monitoring device is configured to obtain variable resistance information on the surface of the new energy vehicle lithium-ion power battery cell, and determine, according to a rule that the variable resistance increases with a battery deformation quantity, whether the battery is deformed and whether there is a risk of explosion.

During specific construction, the battery cell air pressure monitoring module 233 in the new energy vehicle lithium-ion power battery explosion prevention and control subunit 230 includes but is not limited to a battery cell internal air pressure monitoring device and a sensing and transmitting device corresponding thereto. The battery cell internal air pressure monitoring device herein is configured to obtain real-time information about an air pressure status of the new energy vehicle lithium-ion power battery cell, and determine, by using the air pressure, whether the battery cell has an explosion risk.

During specific construction, the battery cell liquid leakage monitoring module 234 in the new energy vehicle lithium-ion power battery explosion prevention and control subunit 230 includes but is not limited to a battery bus insulation impedance monitoring device and/or a battery positive/negative bus current monitoring device and/or a VOC volatile detection device, and a sensing and transmitting device corresponding thereto.

The battery bus insulation impedance monitoring device herein is configured to obtain real-time insulation impedance information of a new energy vehicle lithium-ion power battery cell bus, and determine, by using insulation impedance fluctuation, whether the battery cell has a liquid leakage risk.

The battery positive/negative bus current monitoring device herein is configured to obtain a status such as current equalization on a new energy vehicle lithium-ion power battery positive/negative bus, and determine, by using a current short-circuit status, whether liquid leakage exists in the battery cell.

The VOC volatile detection device herein is configured to: obtain an organic volatile component of new energy vehicle lithium-ion power battery cell liquid leakage, and determine, according to a specific gas component and a corresponding concentration, whether liquid leakage exists in the battery cell.

During specific construction, the battery compartment explosive gas monitoring module 235 in the new energy vehicle lithium-ion power battery explosion prevention and control subunit 230 includes but is not limited to a CO explosive gas detection, sensing, and monitoring device, an $H_2$ explosive gas detection, sensing, and monitoring device, a $CH_4$ explosive gas detection, sensing, and monitoring device, a VOC volatile detection device, and a sensing and transmitting device corresponding thereto.

The CO explosive gas detection, sensing, and monitoring device herein is configured to obtain real-time information about whether CO exist in the new energy vehicle lithium-ion power battery compartment and a gas concentration of the CO, and determine, by using a monitoring result, whether the CO in the battery compartment reaches an explosion upper and lower limit.

The $H_2$ explosive gas detection, sensing, and monitoring device herein is configured to obtain real-time information about whether $H_2$ exists in the new energy vehicle lithium-ion power battery compartment and a gas concentration of the $H_2$, and determine, according to a monitoring result, whether $H_2$ in the battery compartment reaches an explosion upper and lower limit.

The $CH_4$ explosive gas detection, sensing, and monitoring device herein is configured to obtain real-time information about whether $CH_4$ exists in the new energy vehicle lithium-ion power battery compartment and a gas concentration of the $CH_4$, and determine, according to a monitoring result, whether the $CH_4$ in the battery compartment reaches an explosion upper and lower limit.

The VOC volatile detection device herein is configured to: obtain real-time information about whether CO exist in the new energy vehicle lithium-ion power battery compartment and a corresponding gas concentration, and determine, by using a monitoring result, whether the CO and the like in the battery compartment reach an explosive upper and lower limit.

During specific construction, the battery compartment ambient temperature monitoring module 236 in the new energy vehicle lithium-ion power battery explosion prevention and control subunit 230 includes but is not limited to a battery compartment internal temperature sensing and monitoring device and a sensing and transmitting device corresponding thereto.

The battery compartment internal temperature sensing and monitoring device herein is configured to obtain real-time information about a temperature status inside the new energy vehicle lithium-ion power battery compartment, and determine, by using the temperature, whether the battery pack has an explosion risk.

During specific construction, the battery compartment smoke detection module 237 in the new energy vehicle lithium-ion power battery explosion prevention and control subunit 230 includes but is not limited to an ionization smoke sensor, a photoelectric smoke sensor, an infrared beam smoke sensor, a video analysis smoke sensor, a light-sensitive fire sensor, a video analysis flame sensor, and a sensing and transmitting device corresponding thereto.

The ionization smoke sensor, the photoelectric smoke sensor, the infrared beam smoke sensor, and the video analysis smoke sensor herein are configured to obtain real-time information about a smoke status inside the new energy vehicle lithium-ion power battery compartment, and determine, by using the smoke status, whether there is a risk of fire or combustion or explosion in the battery pack.

The light-sensitive fire detector and the video analysis flame detector herein are configured to obtain real-time information about a fire condition inside the new energy vehicle lithium-ion power battery compartment, and determine, by using the fire condition, whether there is a risk of fire combustion or explosion in the battery pack.

During specific construction, the battery explosion suppression module 238 in the new energy vehicle lithium-ion power battery explosion prevention and control subunit 230 includes but is not limited to a circuit controller and/or an intelligent circuit breaker and/or a lithium-ion battery box fire suppression device and/or an automatic fire suppression linkage control device.

The circuit controller herein is configured to receive circuit control information that is sent by the remote management unit and forwarded by the in-vehicle gateway unit, and cut off a power battery power supply line.

The intelligent circuit breaker herein is configured to automatically cut off the power battery power supply line when a new energy vehicle lithium-ion power battery explosion warning occurs.

The lithium-ion battery box fire suppression device herein is configured to: when a new energy vehicle lithium-ion power battery explosion warning occurs, automatically spray and release a fire extinguishing reagent, and perform fire suppression on the lithium-ion power battery box.

The automatic fire extinguishing linkage control device herein is configured to: when a new energy vehicle lithium-ion power battery explosion warning occurs, spray a highly efficient cooling suppressant, to reduce the temperature of a heat runaway battery and suppress the fire.

Therefore, the new energy vehicle lithium-ion power battery explosion prevention and control subunit 230 formed in this way is preferably directly associated with the in-vehicle gateway unit 400 during specific deployment, and is indirectly associated with the alarm prompt unit 500 and the remote management unit 600 of the vehicle by using the in-vehicle gateway unit 400. In this way, in the new energy vehicle lithium-ion power battery explosion prevention and control subunit 230, various sensing and monitoring devices of the battery cell temperature monitoring module, the battery cell deformation monitoring module, the battery cell air pressure monitoring module, the battery cell liquid leakage monitoring module, the battery compartment explosive gas monitoring module, the battery compartment ambient temperature monitoring module, and the battery compartment smoke detection module aggregate monitoring data into the data storage module of the in-vehicle gateway unit by using the network communication module of the in-vehicle gateway unit, and perform intelligent analysis by using the edge computing module of the in-vehicle gateway unit. When a monitoring and analysis result of a corresponding monitored object triggers a lithium-ion power battery explosion warning, the network communication module of the in-vehicle gateway unit sends a corresponding audible and visual alarm or voice prompt to the alarm prompt unit, and simultaneously uploads alarm prompt information to the remote management unit by using the network communication module of the in-vehicle gateway unit.

With reference to FIG. 16 and FIG. 17, when being deployed, the in-vehicle hazardous chemical physical and chemical safety monitoring and warning subunit 310 in this system is preferably directly associated with the in-vehicle gateway unit 400, and is indirectly associated with the alarm prompt unit 500 and the remote management unit 600 of the vehicle by using the in-vehicle gateway unit 400.

In the in-vehicle hazardous chemical physical and chemical safety monitoring and warning subunit 310 deployed in this way, various monitoring devices in the temperature monitoring module 311, the humidity monitoring module 312, the pressure monitoring module 313, the vibration monitoring module 314, and the leakage monitoring module 315 send monitoring information to the network communication module of the in-vehicle gateway unit 400, aggregate monitoring data to the data storage module of the in-vehicle gateway unit, and perform intelligent analysis by using the edge computing module of the in-vehicle gateway unit 400. When a temperature, humidity, pressure, vibration intensity, or leakage monitoring result is higher than a set threshold, and a risk of combustion, explosion, or leakage of the hazardous chemicals may occur, the network communication module of the in-vehicle gateway unit sends a corresponding audible and visual alarm or voice prompt to the alarm prompt unit 500, and meanwhile, the network communication module of the in-vehicle gateway unit 400 uploads alarm prompt information to the remote management unit 600.

Figure 19:
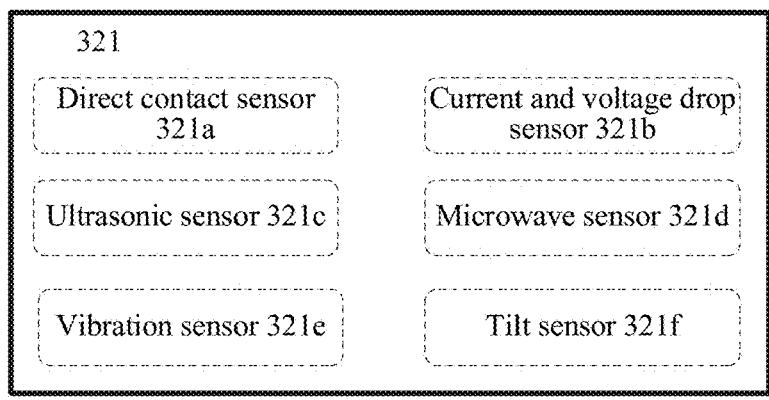
FIG. 19 is a schematic diagram of composition of a vehicle anti-theft alarm module of an anti-theft and robbery monitoring and warning unit according to an embodiment of the present invention.

With reference to FIG. 18 and FIG. 19, this example provides a schematic diagram of composition of the vehicle anti-theft alarm module 321 in the anti-theft and robbery monitoring and warning unit.

Based on FIG. 19, the vehicle anti-theft alarm module 321 in the anti-theft and robbery monitoring and warning unit 320 provided in this embodiment includes a direct contact sensor 321a and/or a current and voltage drop sensor 321b and/or an ultrasonic sensor 321c and/or a microwave sensor 321d and/or a vibration sensor 321e and/or a tilt sensor 321f.

The direct contact sensor 321a is configured to trigger an alarm when a vehicle door, a luggage compartment, a rear compartment door, or the like is forcibly opened.

The current and voltage drop sensor 321b is configured to monitor a change of a vehicle circuit system, for example, trigger an alarm when the vehicle circuit system changes.

The ultrasonic sensor 321c is configured to monitor a change of air pressure inside the vehicle cab, for example, trigger an alarm when a window is broken or someone enters the vehicle cab in the stop state of the vehicle.

The microwave sensor 321d is configured to monitor a solid object that passes through all beams emitted from an entry point in the vehicle cab, for example, trigger an alarm when someone enters the vehicle cab in the stop state of the vehicle.

The vibration sensor 321e is configured to monitor sudden vehicle vibration, for example, trigger an alarm when someone attempts to smash the glass to enter the vehicle cab or damage the vehicle.

The tilt sensor 321f is configured to monitor sudden vehicle tilts, for example, trigger an alarm when someone attempts to tow the vehicle.

Figure 20:
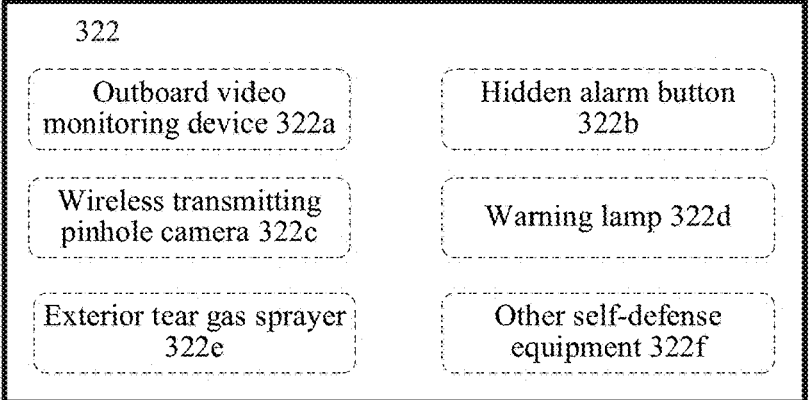
FIG. 20 is a schematic diagram of composition of a vehicle anti-robbery monitoring module of an anti-theft and robbery monitoring and warning unit according to an embodiment of the present invention.

With reference to FIG. 20, this example provides a schematic solution of composition of the vehicle anti-robbery monitoring module 322 in the anti-theft and robbery monitoring and warning unit.

Based on FIG. 20, the vehicle anti-robbery monitoring module 322 provided in this example includes an outboard video monitoring apparatus 322a, a hidden alarm button 322b, a wireless transmitting pinhole video camera 322c, a warning lamp 322d, an off-vehicle tear air ejector 322e, and another self-defense equipment 322f.

The outboard video monitoring apparatus 322a is configured to: collect an image of a person that appears around the vehicle, and trigger an alarm when multiple armed persons are close or when non-normal persons gather.

The hidden alarm button 322b is configured to send a robbery emergency alarm when the driver confirms that a robbery event occurs.

The wireless transmitting pinhole video camera 322c is configured to collect pictures of robbery lawbreaker actions when triggering a robbery emergency alarm.

The off-vehicle tear gas ejector 322e is configured to automatically release common tear gas sprays such as CS (ortho-chlorobenzalmalononitrile) and/or CN (benzoacetone) and/or OC (capsaicin) when a robbery emergency alarm is triggered.

The warning lamp 322d is configured to flash continuously on the roof when a robbery emergency alarm is triggered, to act as a psychological deterrent to the robbers on the robbery site, and to guide the vehicle for the police to reach the robbery site.

The another self-defense equipment 322f includes but is not limited to a glare flashlight, an expandable baton, a flash bomb, or a small dry powder fire extinguisher, and is configured to trigger the driver and passenger to delay a robbery operation performed by a robber when a robbery emergency alarm is triggered, so as to improve a sense of safety and a self-defense capability of the driver and passenger.

Figure 21:
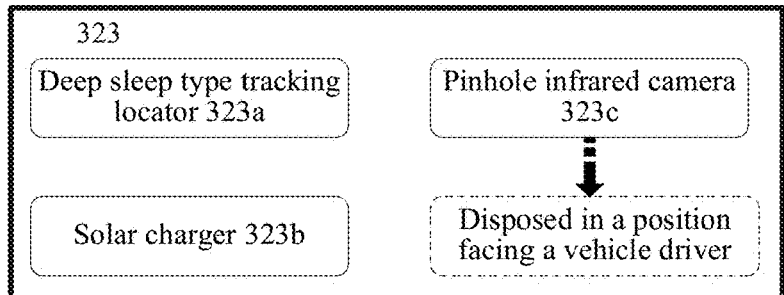
FIG. 21 is a schematic diagram of composition of a vehicle anti-theft and robbery positioning and tracking module of an anti-theft and robbery monitoring and warning unit according to an embodiment of the present invention.

With reference to FIG. 21, this example provides a specific schematic composition solution of the vehicle anti-theft and robbery positioning and tracking module 323 in the anti-theft and robbery monitoring and warning unit.

Based on FIG. 21, the vehicle anti-theft and robbery positioning and tracking module 323 provided in this example includes a deep sleep tracking locator 323a, a solar charger 323b, and a pinhole infrared camera 323c at the position of the vehicle driver.

The deep sleep tracking locator 323a is configured to start real-time positioning after the vehicle is stolen or robbed and a satellite positioning system of the in-vehicle terminal unit is damaged or powered off. For example, the tracking locator herein includes but is not limited to the BeiDou satellite positioning and/or GPS positioning and/or GLONASS positioning and/or GSNS satellite positioning.

The solar charger 323b is configured to charge the deep sleep tracking locator to ensure that the deep sleep tracking locator is in an operating state after the deep sleep tracking locator is started. The pinhole infrared camera 323c at the position of the vehicle driver is configured to collect pictures of people at the position of the vehicle driver when the deep sleep tracking locator is started.

Figure 22:
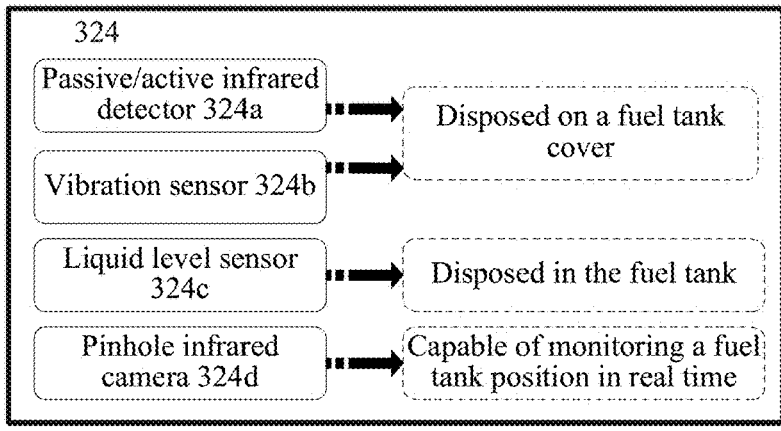
FIG. 22 is a schematic diagram of composition of a vehicle fuel tank safety monitoring module of an anti-theft and robbery monitoring and warning unit according to an embodiment of the present invention.

With reference to FIG. 22, this example provides a specific schematic composition solution of the vehicle fuel tank safety monitoring module 324 in the anti-theft and robbery monitoring and warning unit.

Based on FIG. 22, the vehicle fuel tank safety monitoring module 324 provided in this example includes an infrared detector 324a disposed on the fuel tank cover, a vibration sensor 324b, a liquid level sensor 324c disposed in the fuel tank, and a pinhole infrared camera 324d that can monitor the position of the fuel tank in real time.

The infrared detector 324a is configured to detect a person close to the fuel tank in a defense state in which the fuel tank does not need to be filled with oil, and trigger an alarm when a person enters the detection area in the defense state.

The vibration sensor 324b is configured to detect abnormal vibration of the fuel tank cover in the defense state in which the fuel tank does not need to be filled with oil, and trigger an alarm when the fuel tank cover vibrates in the defense state.

The liquid level sensor 324c in the fuel tank is configured to detect abnormal decrease of the level of petrol or diesel in the fuel tank, and trigger an alarm when the level of oil rapidly decreases in the defense state.

The pinhole infrared camera 324d that can monitor the position of the fuel tank in real time is configured to collect the pictures of the person close to the fuel tank when the fuel tank does not need to be filled with oil. The camera is started when a vehicle fuel tank safety monitoring alarm is triggered.

Figure 23:
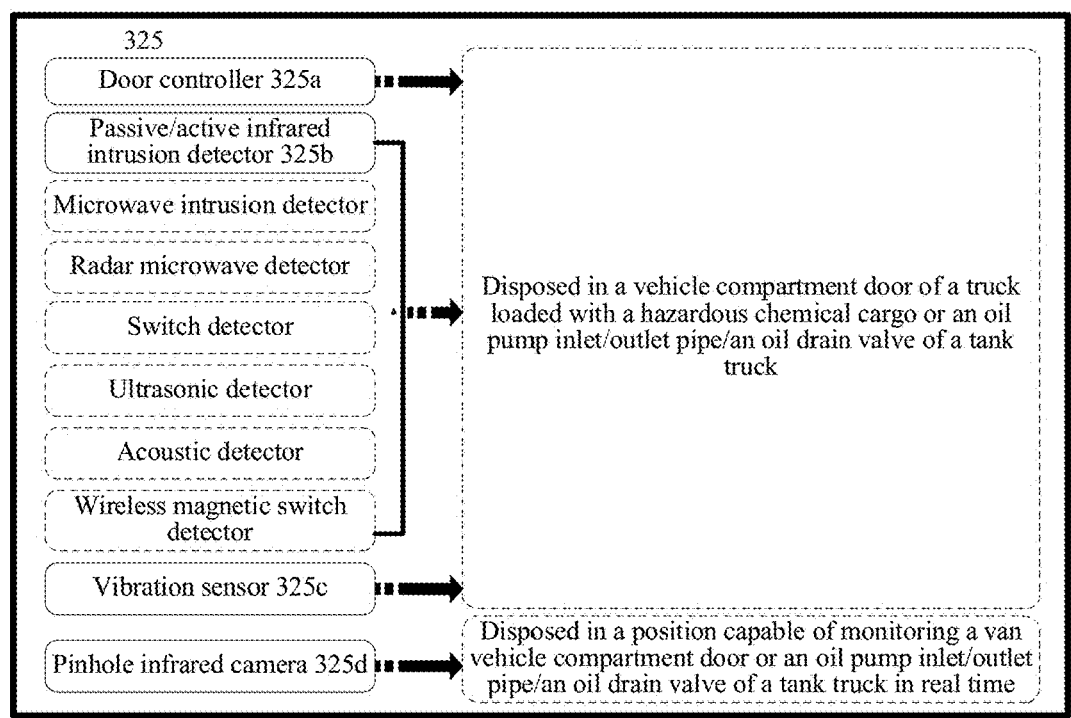
FIG. 23 is a schematic diagram of composition of a door control intrusion detection module of an anti-theft and robbery monitoring and warning unit according to an embodiment of the present invention.

With reference to FIG. 23, this example provides a specific schematic composition solution of the door control intrusion detection module 325 in the anti-theft and robbery monitoring and warning unit.

Based on FIG. 23, the door control intrusion detection module 325 provided in this example includes a door controller 325a that is disposed at the position of the compartment door of the truck carrying a hazardous chemical cargo or the oil pump inlet/outlet pipe/oil drain valve of the tank truck, a passive infrared intrusion detector 325b (in addition, an active infrared intrusion detector, a microwave intrusion detector, a radar microwave detector, a switch detector, an ultrasonic detector, a voice-activated detector, or a wireless magnetic switch detector may be further selected), a vibration sensor 325c, and a pinhole camera 325d that can monitor in real time the position of the compartment door of the truck or the oil pump inlet/outlet pipe/oil drain valve of the tank truck.

The door controller 325a is configured to control opening and closing of the compartment door of the truck carrying a hazardous chemical cargo or the oil pump inlet/outlet pipe/oil drain valve of the tank truck, and trigger an alarm when an exception occurs.

The passive infrared intrusion detector and/or the active infrared intrusion detector and/or the microwave intrusion detector and/or the radar microwave detector and/or the switch detector and/or the ultrasonic detector and/or the voice-activated detector and/or the wireless magnetic switch detector 325b are configured to detect a person's proximity or abnormal opening of the vehicle compartment door and the inlet/outlet pipe/oil drain valve in the defense state, and trigger an alarm in the case of the person's proximity or abnormal opening of the vehicle compartment door and the inlet/outlet pipe/oil drain valve in the defense state.

The vibration sensor 325c is configured to: when the vehicle compartment door and the inlet/outlet pipe/oil drain valve vibrate abnormally in the defense state, and the vehicle compartment door and the inlet/outlet pipe/oil drain valve vibrate in the defense state, trigger an alarm.

The pinhole camera 325*d* at the position of the vehicle compartment door and the inlet/outlet pipe/oil drain valve of the tank truck is configured to collect the pictures of the persons close to the vehicle compartment door and inlet/outlet pipe/oil drain valve in the defense state, and start the camera when a door control intrusion monitoring alarm is triggered.

In this embodiment, specific use of the passive infrared intrusion detector or another type of intrusion detector may be determined according to an actual vehicle structure feature and requirements of different users, which is not limited herein.

Figure 24:
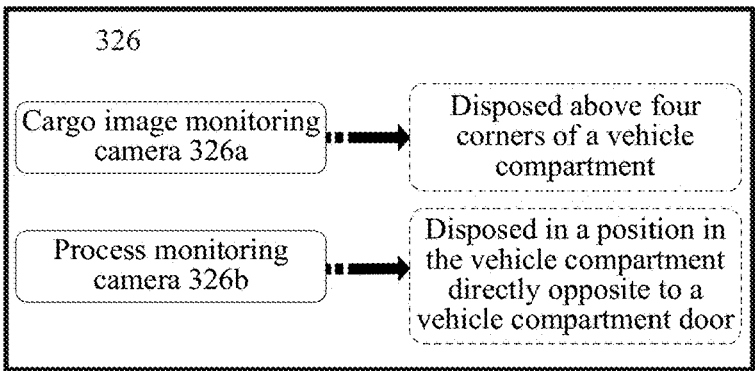
FIG. 24 is a schematic diagram of composition of a cargo anti-theft video monitoring module of an anti-theft and robbery monitoring and warning unit according to an embodiment of the present invention.

With reference to FIG. 24, this example provides a specific schematic composition solution of the cargo anti-theft video monitoring module 326 in the anti-theft and robbery monitoring and warning unit.

Based on FIG. 24, the cargo anti-theft video monitoring module 326 provided in this example includes cargo image monitoring cameras 326*a* disposed above four wall corners in the vehicle compartment and a process monitoring camera 326*b* disposed in the vehicle compartment and facing the vehicle compartment door.

The cargo image monitoring cameras 326*a* are disposed above four wall corners of the vehicle compartment, and are configured to collect real-time images obtained after a hazardous chemical cargo is loaded. The process monitoring camera 326*b* is disposed at the position that is in the vehicle compartment and that directly faces the vehicle compartment door, and is configured to collect images of the loading process and the unloading process.

Figure 25:
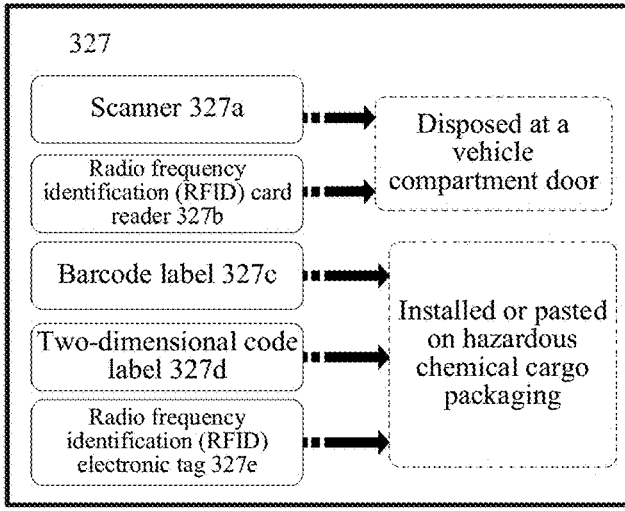
FIG. 25 is a schematic diagram of composition of a hazardous chemical cargo automatic inventory module of an anti-theft and robbery monitoring and warning unit according to an embodiment of the present invention.

With reference to FIG. 25, this example provides a specific schematic solution of the hazardous chemical cargo automatic inventory module in the anti-theft and robbery monitoring and warning unit 327.

Based on FIG. 25, the hazardous chemical cargo automatic inventory module 327 provided in this example includes a scanner 327*a* or a radio frequency identification (RFID) card reader 327*b* disposed at the vehicle compartment door, and a barcode label 327*c*, a two-dimensional code label 327*d*, or a radio frequency identification (RFID) electronic tag 327*e* installed or affixed to the hazardous chemical cargo packaging.

The code scanner 327*a* or the radio frequency identification (RFID) card reader 327*b* is configured to read the barcode label 327*c*, the two-dimensional code label 327*d*, or the radio frequency identification (RFID) electronic tag 327*e* on the hazardous chemical cargo packaging.

The barcode label 327*c*, the two-dimensional code label 327*d*, or the radio frequency identification (RFID) electronic tag 327*e* is used to be pasted on the hazardous chemical cargo packaging for the purpose of reading and counting during loading and unloading.

The combination of the radio frequency identification (RFID) card reader 327*b* and the radio frequency identification (RFID) electronic tag 327*e* may be used for regular or irregular inventory during loading. The specific use of the code scanner or the radio frequency identification (RFID) card reader can be determined based on the nature of the label on the outer packaging of the hazardous chemical cargo, which is not limited herein.

When being deployed, the in-vehicle hazardous chemical anti-theft and robbery monitoring and warning subunit 320 constituted in this way is preferably directly associated with the in-vehicle gateway unit 400, and is indirectly associated with the alarm prompt unit 500 and the remote management unit 600 of the vehicle by using the in-vehicle gateway unit 400. In this way, various monitoring devices, detection devices, and cameras in the vehicle anti-theft alarm module, the vehicle anti-robbery monitoring module, the vehicle anti-theft and robbery positioning and tracking module, the vehicle fuel tank safety monitoring module, the door control intrusion detection module, the cargo anti-theft video monitoring module, and/or the hazardous chemical cargo automatic inventory module in the in-vehicle hazardous chemical anti-theft and robbery monitoring and warning subunit aggregate monitoring data into the data storage module of the in-vehicle gateway unit by using the network communication module of the in-vehicle gateway unit, and perform intelligent analysis by using the edge computing module of the in-vehicle gateway unit. When a corresponding anti-theft and robbery warning is triggered, a corresponding audible and visual alarm or voice prompt is sent to the alarm prompt unit by using the network communication module of the in-vehicle gateway unit, and alarm prompt information is uploaded to the remote management unit by using the network communication module of the in-vehicle gateway unit.

With reference to FIG. 16 and FIG. 26, when being deployed, the hazardous chemical transport emergency rescue guide subunit 330 in this embodiment is preferably directly associated with the in-vehicle gateway unit 400, and is indirectly associated with the alarm prompt unit 500 and the remote management unit 600 of the vehicle by using the in-vehicle gateway unit 400.

The hazardous chemical transport emergency rescue guide subunit 330 deployed in this way can transmit emergency rescue guide information by using the network communication module of the in-vehicle gateway unit, transmit emergency rescue guide information by using a module of the in-vehicle gateway unit, store emergency rescue guide information by using data storage of the in-vehicle gateway unit or the remote management unit, play the emergency rescue guide information by using a separately disposed voice broadcast module or a voice prompt module of a shared alarm prompt unit, and display a pushed emergency rescue guide information file by using an independently disposed display device or the driver and passenger client software.

FIG. 27 is a schematic diagram of a composition principle of the in-vehicle gateway unit 400 and the network communication module of the in-vehicle gateway unit 400 according to this example.

Based on FIG. 27, the network communication module 410 in the in-vehicle gateway unit 400 provided in this example is formed by a combination of a 5G communication device 411, a CAN bus communication device 412, a TCP/IP communication device 413, a Bluetooth (Bluetooth) communication device 414, another wireless communication (WiFi, UWB, Zigbee, and the like) device 415, and the like.

The network communication module 410 performs communication between the in-vehicle gateway unit 400 and the remote management unit 600 by using the 5G communication device 411.

The network communication module 410 may implement, by using the CAN bus communication device 412, wired communication in a CAN bus manner between the in-vehicle gateway unit 400 and the front-end monitoring units (that is, the driver holography management unit 100, the vehicle safety monitoring unit 200, and the in-vehicle hazardous chemical safety monitoring unit 300, which are the same hereinafter).

The network communication module 410 may implement, by using the TCP/IP communication device 413, wired or wireless communication between the in-vehicle gateway unit 400 and the front-end monitoring units and the remote management unit 600 in a TCP/IP manner.

The network communication module 410 may implement wireless communication based on the Bluetooth (Bluetooth) protocol between the in-vehicle gateway unit 400 and the front-end monitoring units and the alarm prompt unit 500 by using the Bluetooth (Bluetooth) communication device 414.

The network communication module 410 may implement wireless communication based on corresponding protocols such as WiFi, UWB, and Zigbee between the in-vehicle gateway unit 400 and the front-end monitoring units and the alarm prompt unit 500 by using the another wireless communication (WiFi, UWB, and Zigbee) device 415.

In a preferred solution, the network communication module 410 in this embodiment has at least three communication devices: the 5G communication device 411, the CAN bus communication device 412, and the TCP/IP communication device 413. The another wireless communication device is equipped according to specific communication manners used by the camera, the sensor, the certificate collection device, and the biometric feature collection device that are mounted on the vehicle. This is not limited herein.

With reference to FIG. 27, the data storage module 420 in the in-vehicle gateway unit 400 provided in this example includes a built-in data storage device and an external data storage device.

The built-in data storage device is configured to store the identity certificate reading data, the biometric feature information collection data, or the identity information database and the biometric feature information database of the authorized driver that are uploaded by the driver identity verification subunit, and the facial expression dynamic information of the current driver and/or the head and face motion information and the body action information of the current driver, and/or the information about the load distribution at different points in the seat under the driver that are uploaded by the driver status monitoring subunit.

The built-in data storage device specifically includes but is not limited to a built-in static random access memory SRAM, a built-in dynamic random access memory DRAM, a built-in hard disk, and a built-in read-only memory ROM. The built-in read-only memory ROM is configured to store the identity information database and the biometric feature information database of the authorized driver.

The external data storage device herein includes but is not limited to an external removable hard disk, a USB flash drive, a TF memory card, an SD memory card, a rewritable CD-RW, a DVD-RAM optical disc, a non-rewritable CD-ROM, and a DVD-ROM optical disc. The non-rewritable CD-ROM and the DVD-ROM optical disc are used to store the identity information database and the biometric feature information database of the authorized driver.

With reference to FIG. 27, the edge computing module 430 in the in-vehicle gateway unit 400 provided in this example includes an AI smart chip with an edge computing function and a terminal SDK with edge computing.

The circuit board AI smart chip with the edge computing function and the terminal SDK with edge computing herein may be configured to perform comparison and verification on the identity certificate reading data, the biometric feature information collection data, and information in the identity information database and the biometric feature information database of the authorized driver that are uploaded by the driver identity verification subunit, and perform emotion intelligent analysis and identification and/or abnormal behavior analysis and identification and/or fatigue status analysis and determining on the facial expression dynamic information of the current driver and/or the head and face motion information and the body action information of the current driver and/or the information about the load distribution at different points of the seat under the driver that are/is uploaded by the driver status monitoring subunit.

The circuit board AI smart chip with the edge computing function and the terminal SDK with edge computing herein may be configured to perform intelligent analysis and determining on the monitoring information uploaded by the real-time tire pressure monitoring and warning subunit, the vehicle overheat monitoring and warning subunit, and the new energy vehicle lithium-ion power battery explosion prevention and control subunit.

The circuit board AI smart chip with the edge computing function and the terminal SDK with edge computing herein are configured to perform intelligent analysis and determining on the monitoring information uploaded by the in-vehicle hazardous chemical physical and chemical safety monitoring and warning subunit and the in-vehicle hazardous chemical anti-theft and robbery monitoring and warning subunit.

During specific deployment, the in-vehicle gateway unit 400 may be directly associated with the driver holography management unit 100, the vehicle safety monitoring unit 200, an in-vehicle hazardous chemical safety monitoring unit 300, the alarm prompt unit 500, and the remote management unit 600.

The in-vehicle gateway unit 400 is associated with the driver holography management unit 100 to exchange data.

When the in-vehicle gateway unit 400 receives the driver identity verification pass result, the in-vehicle gateway unit 400 sends an instruction to the vehicle control subunit 130 to control the vehicle to start up the ACC, and forwards the driver identity verification result and the action information of the vehicle control subunit to the remote management unit 600.

When the in-vehicle gateway unit 400 receives a driver identity verification failure result, the in-vehicle gateway unit 400 sends an instruction to the vehicle control subunit 130 to control the vehicle to turn off the ACC, sends an instruction to the alarm prompt unit 500 to prompt the driver to adjust the posture for re-verification, and forwards the driver identity verification result and the action information of the vehicle control subunit to the remote management unit 600.

When the in-vehicle gateway unit 400 receives an abnormal driver status monitoring result, the in-vehicle gateway unit 400 sends an instruction to the vehicle control subunit 130 to control the vehicle to perform speed limiting, deceleration, or emergency braking, sends a hazardous state or hazardous behavior alarm to the alarm prompt unit 500, and gives a voice prompt to prompt the driver to eliminate an abnormal emotion or an abnormal behavior, or prompt the driver to stop and rest nearby, and forwards the driver status monitoring result and the action information of the vehicle control subunit to the remote management unit 600.

When the fatigue status analysis component based on video analysis or the fatigue status analysis component based on sensor network analysis is in the remote management unit 600, the in-vehicle gateway unit 400 forwards, to the remote management unit 600, the facial expression dynamic information that is of the current driver and that is collected by the facial high-speed camera device, the head and face action and body action posture information that are of the current driver and that are collected by the head and face video collection device and the body panoramic video collection device, the head and face action information that is of the current driver and that is collected by the head and face video collection device, and the load situation information at different points of the seat under the driver collected by the seat load status collection device; and after the remote management unit 600 performs intelligent analysis, identification, or determining, receives an analysis, identification, or determination result, sends an instruction to the vehicle control subunit 130 and/or the alarm prompt unit 500, and then uploads an action status of the vehicle control subunit to the remote management unit 600.

The in-vehicle gateway unit 400 is associated with the vehicle safety monitoring unit 200 to exchange data.

When the in-vehicle gateway unit receives monitoring information of the real-time tire pressure monitoring and warning subunit, the vehicle overheat monitoring and warning subunit, and the new energy vehicle lithium-ion power battery explosion prevention and control subunit, and determines, through analysis, to trigger a related warning or alarm such as low tire pressure, vehicle overheat, or lithium-ion power battery explosion, the in-vehicle gateway unit sends an audible and visual alarm or voice prompt information to the alarm prompt unit, and sends warning or alarm information and real-time monitoring data information to the remote management unit.

When the in-vehicle gateway unit receives an alarm instruction, a voice prompt instruction, alarm threshold setting adjustment, or circuit control information sent by the remote management unit, the in-vehicle gateway unit sends an alarm instruction and voice prompt instruction information to the alarm prompt unit, and sends instruction information such as alarm threshold setting adjustment and circuit control information to the related monitoring devices of the real-time tire pressure monitoring and warning subunit, the vehicle overheat monitoring and warning subunit, and the new energy vehicle lithium-ion power battery explosion prevention and control subunit to perform operations such as monitoring sensor alarm threshold adjustment and power battery circuit cut-off.

The in-vehicle gateway unit 400 is associated with the in-vehicle hazardous chemical safety monitoring unit 300 to exchange data.

According to the in-vehicle gateway unit 400 deployed in this way, when the in-vehicle gateway unit receives the monitoring information of the in-vehicle hazardous chemical physical and chemical safety monitoring and warning subunit and the in-vehicle hazardous chemical anti-theft and robbery monitoring and warning subunit, and determines, through analysis, to trigger a warning or an alarm related to combustion or explosion or theft or robbery of the hazardous chemicals, the in-vehicle gateway unit sends an audible and visual alarm or voice prompt information to the alarm prompt unit, and sends warning or alarm information and real-time monitoring information to the remote management unit.

When the in-vehicle gateway unit receives an alarm instruction, a voice prompt instruction, or alarm threshold setting adjustment or emergency rescue guide information sent by the remote management unit, the in-vehicle gateway unit sends an alarm instruction and voice prompt instruction information to the alarm prompt unit, sends instruction information such as alarm threshold setting adjustment and circuit control to related monitoring devices of the in-vehicle hazardous chemical physical and chemical safety monitoring and warning subunit and the in-vehicle hazardous chemical anti-theft and robbery monitoring and warning subunit to adjust an alarm threshold of a monitoring sensor, start a positioning and tracking device or a related pinhole camera, and sends emergency rescue guide voice broadcast information to the voice broadcast module of the hazardous chemical transport emergency rescue guide subunit to instruct the driver and passenger to perform preliminary emergency disposal.

Referring to FIG. 1 and FIG. 28, in this embodiment, during deployment, the alarm prompt unit 500 is preferably directly associated with the in-vehicle gateway unit 400, and is indirectly associated with the driver holography management unit 100, the vehicle safety monitoring unit 200, the in-vehicle hazardous chemical safety monitoring unit 300, and the remote management unit 600 by using the in-vehicle gateway unit 400.

When the alarm prompt unit 500 deployed in this way works with the driver holography management unit 100, when the vehicle local alarm prompt subunit receives a driver identity verification failure result that is sent by the driver identity verification subunit or that is sent by the driver identity verification subunit by using the in-vehicle gateway unit, the alarm prompt unit sends an audible and visual alarm and a voice prompt for the driver to adjust the posture for re-verification.

When the vehicle local alarm prompt subunit receives an abnormal driver emotion identification result, an abnormal behavior monitoring result, or an abnormal fatigue status monitoring result that is sent by the driver status monitoring subunit or sent by the driver status monitoring subunit by using the in-vehicle gateway unit, the alarm prompt unit sends an audible and visual alarm and a voice prompt for the driver to adjust the emotion, correct an unsafe driving behavior, concentrate, or stop the vehicle nearby.

When the vehicle local alarm prompt subunit receives a monitoring result of a severe abnormal driver emotion identification result, a severe abnormal behavior monitoring or severe abnormal fatigue status monitoring result that is sent by the driver status monitoring subunit or sent by the driver status monitoring subunit by using the in-vehicle gateway unit, the alarm prompt unit sends an audible and visual alarm inside and outside the vehicle and voice inside and outside the vehicle to prompt the driver to adjust the emotion, correct an unsafe driving behavior, concentrate, or stop the vehicle nearby, and instructs a passerby to be vigilant about the abnormal vehicle, avoid in time, or immediately report to the police.

When the remote monitoring client software alarm prompt subunit receives a driver identity verification failure result sent by the driver identity verification subunit by using the in-vehicle gateway unit and the communication center, the alarm prompt unit sends an alarm prompt.

When the remote monitoring client software alarm prompt subunit receives an abnormal driver emotion identification result, an abnormal behavior monitoring result, or an abnormal fatigue status monitoring result that is sent by the driver status monitoring subunit by using the in-vehicle gateway unit and the communication center, the alarm prompt unit sends an alarm prompt or sends a voice prompt.

When the remote monitoring client software alarm prompt subunit receives a severe abnormal driver emotion identification result, a severe abnormal behavior monitoring or severe abnormal fatigue status monitoring result that is sent by the driver status monitoring subunit by using the in-vehicle gateway unit and the communication center, the alarm prompt unit sends an emergency alarm and a voice prompt, and starts emergency according to the emergency plan by default.

When the alarm prompt unit 500 deployed in this way works with the vehicle safety monitoring unit 200, when the local alarm prompt subunit receives medium-risk-level or low-risk-level real-time tire pressure monitoring warning information, vehicle overheat monitoring warning information, and new energy vehicle lithium-ion power battery explosion warning information sent by the in-vehicle gateway unit, the alarm prompt unit sends an audible and visual alarm inside the cab, and prompts, via voice, the driver to stop the vehicle nearby or immediately stop the vehicle for check.

When the local alarm prompt subunit receives high-risk-level real-time tire pressure monitoring warning information, vehicle overheat monitoring warning information, and new energy vehicle lithium-ion power battery explosion warning information, the alarm prompt unit sends an audible and visual alarm inside and outside the cab and a voice inside and outside the cab to prompt the driver to immediately stop the vehicle for check, and instruct the passerby to alert the abnormal vehicle, avoid in time, or immediately report to the police.

When the remote monitoring client software alarm prompt subunit receives medium-risk-level or low-risk-level real-time tire pressure monitoring warning information, vehicle overheat monitoring warning information, and new energy vehicle lithium-ion power battery explosion warning information, the alarm prompt unit sends an alarm prompt.

When the remote monitoring client software alarm prompt subunit receives high-risk-level real-time tire pressure monitoring warning information, vehicle overheat monitoring warning information, and new energy vehicle lithium-ion battery explosion warning information, the alarm prompt unit sends an emergency alarm and voice prompt, and starts the emergency management procedure according to the emergency plan by default.

When the alarm prompt unit 500 deployed in this way works with the in-vehicle hazardous chemical safety monitoring unit 300, when the local alarm prompt subunit receives medium-risk-level or low-risk-level in-vehicle hazardous chemical physical and chemical safety monitoring warning information or in-vehicle hazardous chemical anti-theft and robbery monitoring warning information sent by the in-vehicle gateway unit, the alarm prompt unit sends an audible and visual alarm inside the cab and prompts, via voice, the driver to stop the vehicle nearby or immediately stop the vehicle for check.

When the local alarm prompt subunit receives high-risk-level in-vehicle hazardous chemical physical and chemical safety monitoring warning information or in-vehicle hazardous chemical anti-theft and robbery monitoring warning information, the alarm prompt unit sends an audible and visual alarm inside and outside the cab and a voice inside and outside the cab to prompt the driver to immediately stop the vehicle for check, and prompt the passersby to alert the abnormal vehicle, avoid in time, or immediately report to the police or warn the lawbreakers who are currently engaged in robbery or theft to stop their criminal activities.

When the remote monitoring client software alarm prompt subunit receives medium-risk-level or low-risk-level in-vehicle hazardous chemical physical and chemical safety monitoring warning information or in-vehicle hazardous chemical anti-theft and robbery monitoring warning information, the alarm prompt unit sends an alarm prompt.

When the remote monitoring client software alarm prompt subunit receives high-risk-level in-vehicle hazardous chemical physical and chemical safety monitoring warning information or in-vehicle hazardous chemical anti-theft and robbery monitoring warning information, the alarm prompt unit sends an emergency alarm and voice prompt, sends emergency rescue guide information, and starts the emergency management procedure according to the emergency plan by default.

Figure 30:
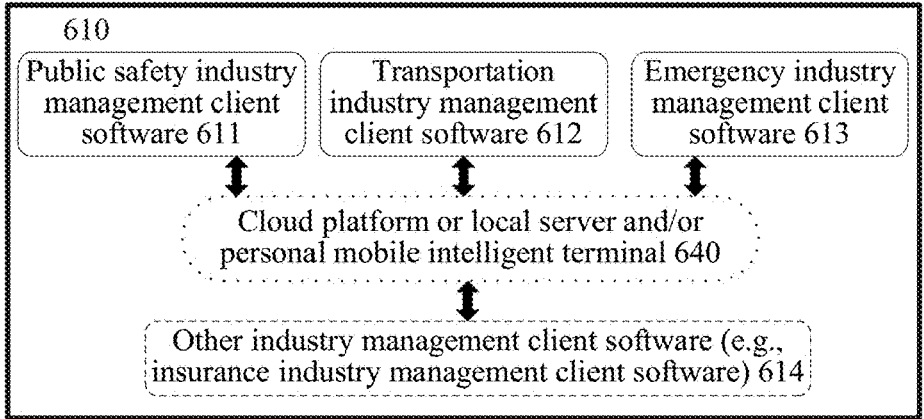
FIG. 30 is a schematic diagram of a composition principle of a government industry management client according to an embodiment of the present invention.

FIG. 29 and FIG. 30 are schematic diagrams of a composition principle of the government industry management client subunit 610 in the remote management unit 600 according to this example.

Based on FIG. 30, the government industry management client 610 provided in this example includes public safety industry management client software 611, transportation industry management client software 612, emergency industry management client software 613, and another industry management client software (for example, insurance industry management client software) 614 according to different supervisory industry departments.

Based on FIG. 30, the public safety industry management client software 611 of the government industry management client 610 in this embodiment is used for driver identity verification management, driver identity management, and driver abnormal behavior and fatigue status monitoring and alarm.

The driver identity verification management can receive a driver and passenger identity verification result, and perform statistics collection and query. The driver identity management can receive driver identity information and an identity verification result, and can compare and analyze the driver identity information and the driver identity verification result with motor vehicle driving license file information of a public safety department. An alarm is sent when driver identity information or a vehicle model allowed to be driven is inconsistent with driver license file information or a vehicle model allowed to be driven corresponding to driver identity information does not include B2, the alarm is sent to the enterprise operation and management client subunit and the driver service client unit in a manner of text, image, voice, or file, and linkage management information is sent according to emergency plan setting. The driver abnormal behavior and fatigue status monitoring and alarm can receive and display the driver abnormal emotion, abnormal behavior, and fatigue status monitoring and alarm information. When a high-risk alarm is received, the driver abnormal behavior and fatigue status monitoring and alarm information can be sent to the enterprise operation and management client subunit and the driver and passenger service client subunit in a manner of a text, an image, a voice, or a file, and linkage management information is sent according to the emergency plan setting.

The public safety industry management client software 611 is further configured to: receive and display high-risk-level real-time tire pressure monitoring warning information, vehicle overheat monitoring warning information, and new energy vehicle lithium-ion power battery explosion warning information that are forwarded by the communication center 640 and sent by the vehicle safety monitoring unit 200 for the hazardous chemical transport vehicle, send, according to the information type, a traffic management instruction to the road duty traffic police at the position of the vehicle, send a corresponding vehicle and position traffic accident handling instruction to the related traffic accident handling personnel, and send other linkage management information such as 120 emergency rescue according to the emergency plan setting.

The public safety industry management client software 611 is further configured to: receive and display high-risk-level in-vehicle hazardous chemical physical and chemical safety monitoring warning information or in-vehicle hazardous chemical anti-theft and robbery monitoring warning information that is forwarded by the communication center 640 and sent by the in-vehicle hazardous chemical safety monitoring unit 300 for the hazardous chemicals, send, according to the information type, a traffic management instruction to the road duty traffic police at the position of the vehicle, send a corresponding vehicle and position traffic accident handling instruction to a related traffic accident handler, and send other linkage management information such as 120 emergency rescue according to emergency plan setting.

In this example, the transportation industry management client software 612 of the government industry management client 610 is used for driver identity verification management, driver permission supervision, driver abnormal behavior and fatigue status monitoring, driver and passenger file management, and driver behavior evaluation.

The driver identity verification management can receive a driver identity verification result, and perform statistics collection and query. The driver permission supervision can receive and display driver identity verification alarm information, monitor a permission of a driver to drive a vehicle, and perform emergency authorization on the driver permission. The driver abnormal behavior and fatigue status monitoring alarm can receive and display the driver abnormal emotion, abnormal behavior and fatigue status monitoring alarm information. When a high-risk alarm is received, alarm information can be sent to the enterprise operation and management client and driver and passenger service client in a manner of text, image, voice and file, and linkage management information can be sent according to the emergency plan setting. The driver and passenger file management can manage the files of vehicle occupants such as the driver or the escrow of hazardous chemical transport vehicles. The file management contents include the name, gender, identity card number, company name, qualification certificate number, validity period of the qualification certificate, and personnel category. The driver behavior evaluation supports driver behavior evaluation based on related information such as different alarm types, alarm quantities, and alarm levels.

The transportation industry management client software 612 is further configured to: receive and display high-risk-level real-time tire pressure monitoring warning information, vehicle overheat monitoring warning information, and new energy vehicle lithium-ion power battery explosion warning information that are forwarded by the communication center 640 and sent by the vehicle safety monitoring unit 200 for the hazardous chemical transport vehicle, send a management instruction to a related traffic safety owner according to the information type, and send other linkage management information according to the emergency plan setting.

The transportation industry management client software 612 is further configured to: receive and display in-vehicle hazardous chemical physical and chemical safety monitoring warning information or in-vehicle hazardous chemical anti-theft and robbery monitoring warning information that is forwarded by the communication center 640 and sent by the in-vehicle hazardous chemical safety monitoring unit 300 for the hazardous chemicals, send a management instruction to a related traffic safety owner according to the information type, and send other linkage management information according to the emergency plan setting.

In this example, the emergency industry management client software 613 of the government industry management client 610 is used for driver identity verification management and driver abnormal behavior and fatigue status monitoring and alarm.

The driver identity verification management can receive a driver and passenger identity verification result, and perform statistics collection and query. The driver abnormal behavior and fatigue status monitoring alarm can receive and display the driver abnormal emotion, abnormal behavior and fatigue status monitoring alarm information. When a high-risk alarm is received, alarm information can be sent to the enterprise operation and management client and driver and passenger service client in a manner of text, image, voice and file, and linkage management information can be sent according to the emergency plan setting.

The emergency industry management client software 613 is further configured to: receive and display high-risk-level real-time tire pressure monitoring warning information, vehicle overheat monitoring warning information, and new energy vehicle lithium-ion power battery explosion warning information that are forwarded by the communication center 640 and sent by the vehicle safety monitoring unit 200 for the hazardous chemical transport vehicle, send, according to the information type, the vehicle type, the cargo loading type of the cargo vehicle, and the like, an emergency disposal instruction to the related emergency response personnel such as the fire fighting personnel, and send other linkage management information according to the emergency plan setting.

The emergency industry management client software 613 is further configured to: receive and display high-risk-level in-vehicle hazardous chemical physical and chemical safety monitoring warning information or in-vehicle hazardous chemical anti-theft and robbery monitoring warning information that is forwarded by the communication center 640 and sent by the in-vehicle hazardous chemical safety monitoring unit 300 for the in-vehicle hazardous chemicals, send, according to the information type, the vehicle type, the cargo loading type of the cargo vehicle, and the like, an emergency disposal instruction to related emergency response personnel such as fire fighting personnel, and send other linkage management information according to the emergency plan setting.

The another industry management client software 614 (e.g., insurance industry management client software 114) of the government industry management client 610 in this example is used for driver identity verification management and the like. A driver identity verification result can be received, counted, and queried by using the driver identity verification management.

The another industry management client software 614 is further configured to: receive and display real-time tire pressure monitoring warning information, vehicle overheat monitoring warning information, and new energy vehicle lithium-ion power battery explosion warning information that are forwarded by the communication center 640 and sent by the vehicle safety monitoring unit 200 for the hazardous chemical transport vehicle, start the insurance claim service according to an information status, and send other linkage management information according to the emergency plan setting.

The another industry management client software 614 is further configured to: receive and display in-vehicle hazardous chemical physical and chemical safety monitoring warning information or in-vehicle hazardous chemical anti-theft and robbery monitoring warning information that are forwarded by the communication center 640 and sent by the in-vehicle hazardous chemical safety monitoring unit 300 for the in-vehicle hazardous chemicals, start an insurance claim service according to an information status, and send other linkage management information according to the emergency plan setting.

It should be noted herein that the another industry management client software further supports function customization according to a corresponding industry management requirement, or enables or disables a related monitoring client function independently within a user permission range. This is not limited herein.

Figure 31:
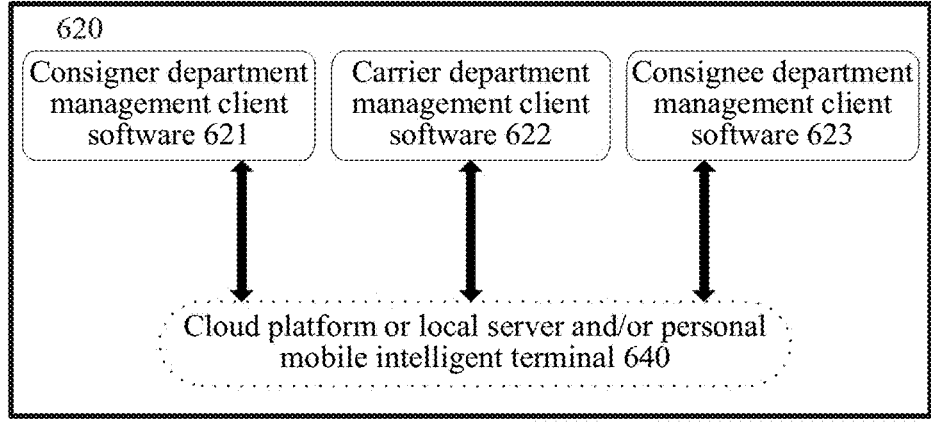
FIG. 31 is a schematic diagram of a composition principle of an enterprise operation and management client according to an embodiment of the present invention.

FIG. 31 is a schematic diagram of a composition principle of the enterprise operation and management client 620 in the remote management unit 600 according to this example.

Based on FIG. 31, the enterprise operation and management client 620 provided in this example includes consignor department management client software 621, carrier department management client software 622, and consignee department management client software 623 according to different users.

Based on FIG. 29 and FIG. 31, in this embodiment, the consignor department management client software 621 of the enterprise operation and management client 620 is configured to query driver identity information. For example, the software supports querying the identity information, qualification certificate, and current transportation identity verification result of the current transportation driver or hazardous cargo transport vehicle escort corresponding to the electronic waybill number.

Further, the consignment department management client software 621 is further configured to receive safety tracking and query information that displays the consignment cargo vehicle (that is, the hazardous chemical transport vehicle).

In this embodiment, the carrier department management client software 622 is used for driver identity verification management, driver abnormal behavior and fatigue status monitoring, driver overtime driving alarm management, driver and passenger file management, and driver behavior evaluation.

For example, the driver identity verification management herein can receive driver identity information and an identity verification result, and perform identity verification and comparison analysis on the received driver identity information and the driver and passenger file information and the electronic waybill scheduling information of the current company. When the driver identity verification succeeds and is consistent with the driver and passenger file information and the electronic waybill scheduling information of the current company, a driving permission instruction is sent, and the vehicle can start and travel normally. When the driver identity verification fails or is inconsistent with the driver and passenger file information and electronic waybill scheduling information of the current company, the driver and passenger driver sends a driving forbidden instruction. The vehicle cannot start driving normally and sends warning information to the driver and passenger service client in a manner of text, image, voice, or file. If the driver identity verification fails or is inconsistent with the driver and passenger profile information and electronic waybill scheduling information of the company, when the vehicle is started and driven abnormally, an emergency alarm prompt will be displayed and a corresponding unit of the in-vehicle device will be controlled to give audible and visual alarm information inside and outside the vehicle. The driver identity verification management of the carrier department management client supports remote driver permission authorization and remote emergency activation of the vehicle ACC switch, and supports statistics, analysis, and query of received driver and passenger identity verification results, driver and passenger identity information, and comparison analysis results with the driver and passenger file information and electronic waybill scheduling information of the current company.

The driver abnormal behavior and fatigue status monitoring alarm can receive and display the driver abnormal emotion, abnormal behavior, and fatigue status monitoring alarm information. When an alarm is received, the driver abnormal behavior and fatigue status monitoring alarm information is sent to the driver and passenger service client in a manner of text, image, voice, file, or the like. When a high-risk alarm is received, the driver abnormal behavior and fatigue status monitoring alarm information is sent to the driver and passenger service client in a manner of text, image, voice, file, or the like, and the driver abnormal behavior and fatigue status monitoring alarm information are synchronously sent to the government industry management client immediately according to the emergency plan setting.

The driver overtime driving alarm management can receive and display driver overtime driving alarm information. When an alarm is received, the driver overtime driving alarm management sends alarm information to the driver and passenger service client in a manner of text, image, voice, file, or the like. When a high-risk alarm is received, the driver overtime driving alarm management sends alarm information to the driver and passenger service client in a manner of text, image, voice, file, or the like, and immediately and synchronously sends linkage alarm information to the government industry management client according to the emergency plan setting.

The driver and passenger file management is used to manage the files of drivers, vehicles with hazardous chemicals, and other vehicle-accompanying personnel. The file management contents include the information such as name, gender, identity card number, qualification certificate number, and qualification certificate validity period, personnel type, user registration address, actual residence address, family member status, and major social relations. The driver and passenger file contents can be queried, added, deleted, and modified/edited. When adding, deleting, and editing the driver and passenger file information contents, the system sends prompt information to the driver and passenger service client. The corresponding added/deleted personnel or the modified/edited file information contents will take effect after logging in and confirming the change. The driver and passenger can add, delete, and modify the driver and passenger file information through the carrier department management client after submitting the application for adding, deleting, and modifying/editing through the driver and passenger service client.

The driver behavior evaluation supports driver behavior evaluation based on related information such as different alarm types, alarm quantity, alarm level, and alarm processing status. Different weights are assigned to different alarm types, alarm quantities, alarm levels, alarm processing response time, and alarm processing rates. The weights can be adjusted. The driver behavior evaluation result is quantized, and the result ranking is quantified and a report is generated. Queries can be performed based on the evaluation result ranking status, vehicle type information, license plate number information, or driver information.

The carrier department management client software 622 is further configured to: receive and display real-time tire pressure monitoring warning information, vehicle overheat monitoring warning information, and new energy vehicle lithium-ion power battery explosion warning information that are forwarded by the communication center 640 and sent by the vehicle safety monitoring unit 200 for the hazardous chemical transport vehicle; when receiving warning or alarm information, send emergency rescue guide information to the driver and passenger service client subunit 630 in a manner of text, image, voice, file, or the like; and when receiving a high-risk-level warning or alarm, send emergency rescue guide information to the driver and passenger service client subunit 630 in a manner of text, image, voice, file, or the like, and immediately send emergency rescue guide information to the government industry management client subunit 610 according to the emergency plan settings.

The carrier department management client software 622 is further configured to receive and display in-vehicle hazardous chemical physical and chemical safety monitoring warning information or in-vehicle hazardous chemicals anti-theft and robbery monitoring warning information that is forwarded by the communication center 640 and sent by the in-vehicle hazardous chemical safety monitoring unit 300 for the in-vehicle hazardous chemicals; when receiving warning or alarm information, send emergency rescue guide information to the driver and passenger service client subunit 630 in a manner of text, image, voice, file, or the like; and when receiving a high-risk-level warning or alarm, send emergency rescue guide information to the driver and passenger service client subunit 630 in a manner of text, image, voice, file, or the like, and immediately send emergency rescue guide information to the government industry management client subunit 610 according to the emergency plan settings.

The consignee department management client software 623 in this example is further configured to query driver identity information, and is further configured to receive and display safety tracking and query information of a consignment cargo vehicle (hazardous chemical transport vehicle). For example, the consignee department management client software 623 supports querying the identity information, qualification certificate, and current transportation identity verification result of the current transportation driver or hazardous cargo transport vehicle escort corresponding to the electronic waybill number.

Figure 32:
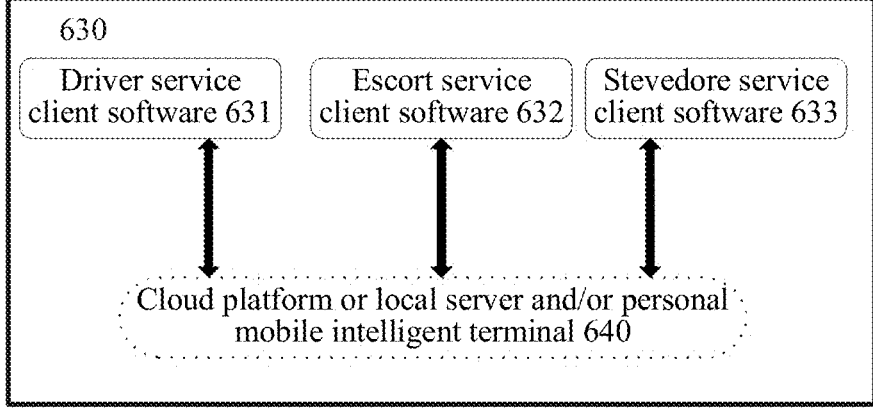
FIG. 32 is a schematic diagram of a composition principle of a driver and passenger service client according to an embodiment of the present invention.

FIG. 32 is a schematic diagram of a composition principle of the driver and passenger service client subunit 630 in the remote management unit 600 according to this example.

Based on FIG. 32, the driver and passenger service client subunit 630 provided in this example includes driver service client software 631, escort service client software 632, and stevedore service client software 633 according to different users.

With reference to FIG. 29 and FIG. 32, in this example, the driver service client software 631 of the driver and passenger service client subunit 630 is used for driver identity verification, driver abnormal behavior and fatigue status monitoring alarm, and driver overtime driving alarm.

For example, the driver identity verification herein can receive driver identity certificate information, biometric feature information, and an identity verification result. When the identity verification succeeds and is consistent with the driver and passenger profile information of the current company and the electronic waybill scheduling information, a driving permission instruction sent by the carrier department management client is received and broadcast via voice, so as to prompt the driver to normally start and drive the vehicle. When the identity verification fails or is inconsistent with the driver and passenger profile information of the current company and the electronic waybill scheduling information, a driving permission instruction sent by the carrier department management client is received and broadcast via voice, and the driver is prompted via voice to adjust the posture and check the certificate.

The driver abnormal behavior and fatigue status monitoring alarm can receive and display driver abnormal behavior and fatigue status monitoring alarm information. When a medium-risk-level or low-risk-level alarm is received, alarm information is sent via voice, a specific preset sound, or the like. When a high-risk alarm delivered by the government industry management client and the carrier department management client is received, alarm information is sent by using a high-level alarm content setting voice, a specific high-level alarm preset sound, or the like. In addition, a correction situation and a correction action can be fed back in a manner of text, image, voice, file, or the like within a specified time period.

The driver overtime driving alarm can receive and display driver overtime driving alarm information. When the driver overtime driving alarm information delivered by the government industry management client and the carrier department management client is received, the driver overtime driving alarm information is broadcast via voice, and after the vehicle corrects the overtime driving violation, the driver overtime driving alarm information is automatically fed back to the government industry management client and the carrier department management client.

The driver service client software 631 is further configured to: receive and display real-time tire pressure monitoring warning information, vehicle overheat monitoring warning information, and new energy vehicle lithium-ion power battery explosion warning information, which belong to the operating vehicle, that are forwarded by the communication center 640 and sent by the vehicle safety monitoring unit 200 for the hazardous chemical transport vehicle; and receive and display emergency rescue guide information sent by the carrier department management client 622 in a manner of text, image, voice, file, or the like.

The driver service client software 631 is further configured to: receive and display in-vehicle hazardous chemical safety monitoring warning information or in-vehicle hazardous chemical anti-theft and robbery monitoring warning information that is forwarded by the communication center 640 and sent by the in-vehicle hazardous chemical safety monitoring unit 300 for the hazardous chemicals, and receive and display emergency rescue guide information sent by the carrier department management client software 622 in a manner of text, an image, voice, a file, or the like, or display emergency rescue guide information that is automatically pushed by the driver service client software after the carrier management client software 622 triggers related warning or alarm information.

It should be noted herein that the driver service client software 631 supports voice broadcasting of alarm information. For an operating vehicle, the risk inspection status and disposal result can be fed back to the government industry management client 610 and the carrier department management client 622 after the driver completes the risk inspection.

In this embodiment, the escort service client software 632 of the driver and passenger service client subunit 630 is used for a driver abnormal behavior and fatigue status monitoring alarm, and a driver overtime driving alarm.

For example, the driver abnormal behavior and fatigue status monitoring alarm herein can receive and display driver abnormal behavior and fatigue status monitoring alarm information; when a medium-risk-level or low-risk-level alarm is received, send alarm information via voice, a specific preset sound, or the like; when a high-risk alarm delivered by the government industry management client and the carrier department management client is received, send alarm information by using high-level alarm content set voice, a specific high-level alarm preset sound, or the like, and continuously prompt the escort via voice to supervise the driver to correct the abnormal behavior or stop the vehicle for rest, and support feeding back, in a manner of text, image, voice, file, or the like, a correction situation and a correction measure within a specified time.

The driver overtime driving alarm can receive and display driver overtime driving alarm information; when the driver overtime driving alarm is delivered by the government industry management client and the carrier department management client, send alarm information via voice, a preset sound, or the like; continuously prompt the escort via voice to supervise the driver to stop the vehicle for rest, and automatically feed back a correction status of the overtime driving violation to the government industry management client and the carrier department management client after the vehicle corrects the overtime driving violation.

The escort service client software 632 is further configured to: receive and display real-time tire pressure monitoring warning information, vehicle overheat monitoring warning information, and new energy vehicle lithium-ion power battery explosion warning information, which belong to an operating vehicle, that are forwarded by the communication center 640 and sent by the vehicle safety monitoring unit 200 for the hazardous chemical transport vehicle; and receive and display emergency rescue guide information sent by the carrier department management client 622 in a manner of text, image, voice, file, or the like.

The escort service client software 632 is further configured to: receive and display in-vehicle hazardous chemical physical and chemical safety monitoring warning information or in-vehicle hazardous chemical anti-theft and robbery monitoring warning information that is forwarded by the communication center 640 and sent by the in-vehicle hazardous chemical safety monitoring unit 300 for the hazardous chemicals; and receive and display emergency rescue guide information sent by the carrier department management client software 622 in a manner of text, image, voice, file, or the like, or display emergency rescue guide information that is automatically pushed after the carrier department management client software 622 triggers related warning or alarm information.

The escort service client software 632 herein supports broadcasting of alarm information via voice. After the driver checks the risk, the escort service client software 632 feeds back a risk check situation and disposal result to the government industry management client 610 and the carrier department management client 622.

In this example, the stevedore service client software 633 of the driver and passenger service client subunit 630 is configured to receive and display the hazardous cargo road transport electronic waybill and the quantity change and the inventory information of the hazardous chemical loading/unloading process and that are uploaded by the front-end monitoring unit, and support query of a type, a quantity, a loading/unloading requirement, a physical characteristic, a chemical characteristic, a physical and chemical risk, and corresponding emergency rescue guide information that are of the currently carried hazardous chemicals.

Figure 33:
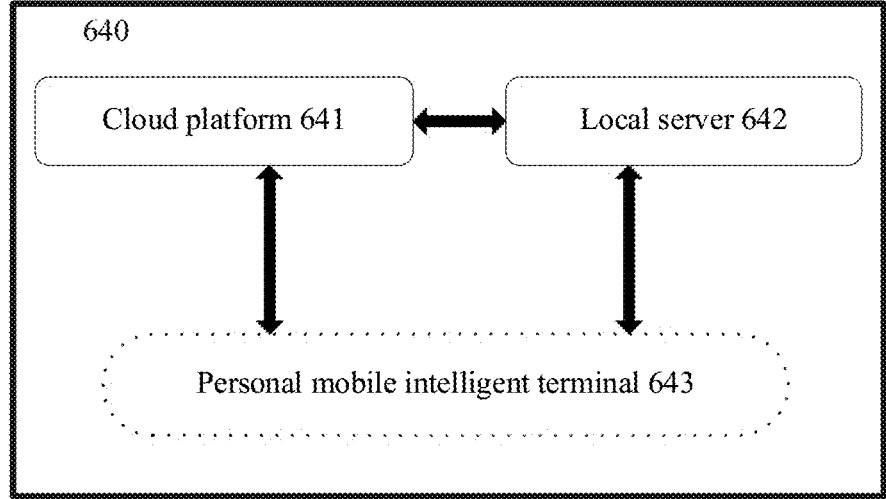
FIG. 33 is a schematic diagram of composition of a communication center according to an embodiment of the present invention.

FIG. 33 is a schematic diagram of composition of the communication center 640 in the remote management unit 600 according to this example.

Based on FIG. 33, the communication center 640 provided in this embodiment includes a cloud platform 641, a local server 642, and a personal mobile intelligent terminal 643. In this example, the application manner in which the cloud platform 641 is combined with the communication center of the personal mobile intelligent terminal 643 is preferably used, which may be specifically determined according to actual communication conditions of different users, which is not limited herein.

Based on FIG. 29 and FIG. 33, in this example, the cloud platform 641 of the communication center 640 is configured to store data information and alarm information uploaded by the in-vehicle gateway unit 400, a shared data resource pool used to receive and invoke data of the government industry management client subunit 610/the enterprise operation and management client subunit 620/the driver and passenger service client subunit 630, a computer hardware platform environment used to support an application of the government industry management client subunit 610/the enterprise operation and management client subunit 620/the driver and passenger service client subunit 630, and the government industry management client subunit 610/the enterprise operation and management client subunit 620/the driver and passenger service client subunit 630 to communicate and interact with the front-end monitoring unit.

The cloud platform 641 may communicate with the front-end monitoring units (that is, the driver holography management unit 100, the in-vehicle safety monitoring unit 200, and the in-vehicle hazardous chemical safety monitoring unit 300), receive and store the driver identity certificate collection result, the driver biometric feature information collection result, or the identity verification result that is sent by the driver holography management unit 100, and receive and store the facial expression dynamic information of the current driver collected by the front-end monitoring unit, the collected head and face action and body action posture information of the current driver, the collected current driver head and face action information, and the collected load situation information or driver status monitoring result of the different points of the seat under the driver. When the biometric feature information comparison component, the emotion intelligent analysis and identification component, the abnormal behavior analysis and identification component, the fatigue status analysis component based on video analysis, or the fatigue status analysis component based on sensor network analysis is disposed on the cloud platform 641, biometric feature information comparison, emotion intelligent analysis and identification, abnormal behavior analysis and identification, and fatigue status analysis and determining are performed by using the cloud platform 641, and a management instruction or a response instruction of the government industry management client subunit 610, the enterprise operation and management client subunit 620, and the driver and passenger service client subunit 630 is forwarded to the front-end monitoring unit.

The cloud platform 641 further receives and stores the real-time tire pressure monitoring warning information, the vehicle overheat monitoring warning information, the new energy vehicle lithium-ion power battery explosion warning information, and the related monitoring data information that are sent by the vehicle safety monitoring unit 200, and forwards a management instruction or a response instruction of the government industry management client subunit 610, the enterprise operation and management client subunit 620, and the driver and passenger service client subunit 630 to the front-end monitoring unit.

The cloud platform 641 further receives and stores the in-vehicle hazardous chemical physical and chemical safety monitoring warning information or the in-vehicle hazardous chemical anti-theft and robbery monitoring warning information that is sent by the in-vehicle hazardous chemical safety monitoring unit 300, and forwards a management instruction or a response instruction of the government industry management client subunit 610, the enterprise operation and management client subunit 620, and the driver and passenger service client subunit 630 to the front-end monitoring unit.

For example, the cloud platform 641 herein supports an application of a B/S monitoring client, and the B/S monitoring client is preferably developed based on a latest high-safety operating system and a high-safety browser.

In this example, the local server 642 in the communication center 640 is configured to store data information and alarm information uploaded by the front-end monitoring unit, a data resource pool that is separately received and invoked by the government industry management client subunit 610/the enterprise operation and management client subunit 620/the driver and passenger service client subunit 630, a computer hardware platform environment that supports an application of the government industry management client subunit 610/the enterprise operation and management client subunit 620/the driver and passenger service client subunit 630, and communication and interaction between the government industry management client subunit 610/the enterprise operation and management client subunit 620/the driver and passenger service client subunit 630 and the front-end monitoring unit.

The local server 642 communicates with the front-end monitoring unit, receives and stores a driver identity certificate collection result, a driver biometric feature information collection result, or an identity verification result that is sent by the front-end monitoring unit for a driver of the hazardous chemical vehicle, and receives and stores the facial expression dynamic information of the current driver collected by the front-end monitoring unit, the collected head and face action and body action posture information of the current driver, the collected current driver head and face action information, and the collected load situation information or driver status monitoring results of the different points of the seat under the driver.

When the biometric feature information comparison component, the emotion intelligent analysis and identification component, the abnormal behavior analysis and identification component, the fatigue status analysis component based on video analysis, or the fatigue status analysis component based on sensor network analysis is disposed on the local server 642, biometric feature information comparison, emotion intelligent analysis and identification, abnormal behavior analysis and identification, and fatigue status analysis and determining are performed by using the local server 642, and a management instruction or a response instruction of the government industry management client subunit 610, the enterprise operation and management client subunit 620, and the driver and passenger service client subunit 630 is separately forwarded to the front-end monitoring unit.

The local server 642 is further configured to: receive and store the real-time tire pressure monitoring warning information, the vehicle overheat monitoring warning information, the new energy vehicle lithium-ion power battery explosion warning information, and the related monitoring data information that are sent by the front-end monitoring unit for the hazardous chemical transport vehicle, and forward a management instruction or a response instruction of the government industry management client subunit 610, the enterprise operation and management client subunit 620, and the driver and passenger service client subunit 630 to the front-end monitoring unit.

The local server 642 is further configured to receive and store the in-vehicle hazardous chemical physical and chemical safety monitoring warning information or the in-vehicle hazardous chemical anti-theft and robbery monitoring warning information that is sent by the front-end monitoring unit for the hazardous chemicals, and forward a management instruction or a response instruction of the government industry management client subunit 610, the enterprise operation and management client subunit 620, and the driver and passenger service client subunit 630 to the front-end monitoring unit.

For example, the local server 642 herein supports a C/S monitoring client application, and the C/S monitoring client is developed based on various latest high-safety operating systems of Linux kernel.

In this example, the personal handheld intelligent terminal 643 in the communication center 640 is configured to store data information and alarm information uploaded by the front-end monitoring units (that is, the driver holography management unit 100, the vehicle safety monitoring unit 200, and the in-vehicle hazardous chemical safety monitoring unit 300), an online query tool and temporary storage space for data information uploaded by the government industry management client APP software 610/the enterprise operation and management client APP software 620/the driver and passenger service client APP software 630, a hardware platform environment of a microcomputer that supports an application of the government industry management client APP software 610/the enterprise operation and management client APP software 620/the driver and passenger service client APP software 630, and communication and interaction between the government industry management client APP software 610/the enterprise operation and management client APP software 620/the driver and passenger service client APP software 630 and the in-vehicle gateway unit 400.

Further, the personal handheld intelligent terminal 643 can further communicate with the front-end monitoring unit by using the cloud platform 641 or the local server 642, receive a driver identity certificate collection result, a driver biometric feature information collection result, or an identity verification result that is sent by the driver holography management unit 100 for the driver of the hazardous chemical transport vehicle, receive driver status monitoring alarm information that is sent by the front-end monitoring unit for the driver of the hazardous chemical transport vehicle, and forward, to the front-end monitoring unit, a management instruction or a response instruction of the government industry management mobile client APP software 610/the enterprise operation and management mobile client APP software 620/the driver and passenger service mobile client APP software 630.

The personal handheld intelligent terminal 643 further receives and stores the real-time tire pressure monitoring warning information, the vehicle overheat monitoring warning information, the new energy vehicle lithium-ion power battery explosion warning information, and the related monitoring data information that are sent by the vehicle safety monitoring unit 200 for the hazardous chemical transport vehicle, and forwards a management instruction or a response instruction of the government industry management client APP software 610/the enterprise operation and management client APP software 620/the driver and passenger service client APP software 630 to the in-vehicle gateway unit 400.

The personal handheld intelligent terminal 643 further receives and stores in-vehicle hazardous chemical safety monitoring warning information or in-vehicle hazardous chemical anti-theft and robbery monitoring warning information sent by the in-vehicle hazardous chemical safety monitoring unit 300 for the hazardous chemicals, and forwards, to the in-vehicle gateway unit 400, a management instruction or a response instruction or emergency rescue guide information of the government industry management mobile client APP software 610/the enterprise operation and management mobile client APP software 620/the driver and passenger service mobile client APP software 630.

For example, the mobile monitoring client APP herein is preferably developed based on an operating system that is based on a Linux kernel, such as a HarmonyOS microkernel or Android (Android).

The remote management unit 600 constituted in this way is preferably deployed in a cloud platform and/or a local storage server of a government industry department related to vehicle traffic management or operation management and/or a personal handheld intelligent terminal of a related management staff, a cloud platform and/or a local storage server of a transportation enterprise to which the vehicle belongs and a related transportation party and/or a personal handheld intelligent terminal of a related management staff, and a personal handheld intelligent terminal of a driver and a passenger, and is associated with the front-end monitoring units (for example, the driver holography management unit 100, the vehicle safety monitoring unit 200, and the in-vehicle hazardous chemical safety monitoring unit 300).

The remote management unit 600 deployed in this way receives real-time monitoring information and warning or alarm information that are sent by the front-end monitoring unit about the hazardous chemicals, the hazardous chemical transport vehicle, and the driver of the hazardous chemical transport vehicle, provides a management operation instruction according to the alarm information, and feeds back a management operation instruction to the front-end monitoring unit. In this way, the monitoring information of all aspects of the in-vehicle hazardous chemicals, including objects, vehicles, and persons, can be linked to the supervisory industry departments and affiliated units in real time. This helps the driver and passenger to handle on-site and prevent accidents. In addition, it gains time for the early deployment of the emergency response and anti-terrorism protection forces, emergency response, and anti-terrorism investigation. This helps improve the monitoring and early prevention capabilities of the hazardous chemical transport safety accidents, the emergency response efficiency of the hazardous chemical transport safety accidents, and the anti-terrorism protection capabilities of the hazardous chemical transport.

The foregoing method, or a specific system unit, or some units thereof, of the present invention is a pure software architecture, and may be laid out in a physical medium, such as a hard disk, an optical disc, or any electronic device (such as an intelligent mobile phone or a computer-readable storage medium) by using program code. When program code is loaded and executed (such as loaded and executed by an intelligent mobile phone) by a machine, the machine becomes a device for implementing the present invention. The foregoing method and device in the present invention may also be transmitted in a program code mode by using some transmission media, such as a cable, an optical fiber, or any transmission mode. When the program code is received, loaded, and executed by a machine (such as an intelligent mobile phone), the machine becomes a device for implementing the present invention.

The basic principles, main features, and advantages of the present invention are shown and described above. Persons skilled in the art should understand that the present invention is not limited to the foregoing embodiments, and the foregoing embodiments and descriptions in the specification merely describe principles of the present invention. Without departing from the spirit and scope of the present invention, the present invention further has various variations and improvements, and the variations and improvements fall within the scope of the present invention that claims protection. The protection scope of the present invention is defined by the appended claims and their equivalents.

What is claimed is:

1. A vehicle transport safety monitoring system for hazardous chemicals based on all-element management, comprising:

a driver holography management unit, wherein the driver holography management unit is associated with an in-vehicle gateway unit, and performs data exchange with a remote management unit by using the in-vehicle gateway unit, and the driver holography management unit performs multi-factor identity verification and multi-dimension driver status monitoring for a driver, and implementing linkage with vehicle control according to an identity verification and/or status monitoring result;

a vehicle safety monitoring unit, wherein the vehicle safety monitoring unit is associated with the in-vehicle gateway unit, and performs data exchange with the remote management unit by using the in-vehicle gateway unit, and the vehicle safety monitoring unit automatically monitors vehicle safety status, and forming warning or alarm information according to a monitoring result;

an in-vehicle hazardous chemical safety monitoring unit, wherein the in-vehicle hazardous chemical safety monitoring unit is associated with the in-vehicle gateway unit, and performs data exchange with the remote management unit by using the in-vehicle gateway unit and the in-vehicle hazardous chemical safety monitoring unit comprehensively monitors physical and chemical safety parameters of in-vehicle hazardous chemicals and in-vehicle hazardous chemical anti-theft and robbery information during transportation, and forming warning or alarm information according to a monitoring result;

the in-vehicle gateway unit, wherein the in-vehicle gateway unit is separately associated with the driver holography management unit, the vehicle safety monitoring unit, the in-vehicle hazardous chemical safety monitoring unit, an alarm prompt unit, and the remote management unit, and establishes a communication channel among the units to complete data exchange and the in-vehicle gateway unit is further capable of cooperating with the driver holography management unit and/or the vehicle safety monitoring unit and/or the in-vehicle hazardous chemical safety monitoring unit to complete data intelligent analysis and risk warning processing according to data collected by the corresponding unit;

the alarm prompt unit, wherein the alarm prompt unit is connected to the in-vehicle gateway unit, and completes a local alarm on a vehicle and/or completing a remote alarm by using the in-vehicle gateway unit associated with the remote management unit; and the remote management unit, wherein the remote management unit is deployed in a multi-level real-time synchronous linkage manner, is associated with the in-vehicle gateway unit, is indirectly associated with the driver holography management unit, the vehicle safety monitoring unit, the in-vehicle hazardous chemical safety monitoring unit, and the alarm prompt unit by using the in-vehicle gateway unit, and receiving warning or alarm information sent by the in-vehicle gateway unit, and when receiving a high-risk-level warning or alarm, forming emergency disposal and emergency rescue management information according to an emergency plan requirement and the remote management unit is further capable of cooperating with the driver holography management unit and/or the vehicle safety monitoring unit and/or the in-vehicle hazardous chemical safety monitoring unit to complete data intelligent analysis and risk warning processing according to data collected by the corresponding unit, wherein the driver holography management unit comprises a driver identity verification subunit, wherein the driver identity verification subunit collects current driver certificate information and biometric feature information, perform person-certificate consistency comparison on currently collected real-time driver identity information and biometric feature information and comparison and verification with driver identity information and biometric feature information that have been stored in an authorized driver database, and control a working status of a vehicle start system according to a verification result;

wherein the driver identity verification subunit comprises an identity certificate reading module, a biometric feature information collection module, and a biometric feature information comparison module;

wherein the biometric feature information collection module comprises a finger vein information collection device or a palm vein information collection device, and is configured to:

obtain biometric feature information of the current driver, and transmit the obtained information to a biometric feature information comparison module thereof, the biometric feature information comparison module of the in-vehicle gateway unit, or the biometric feature information comparison module of the remote management unit by using the in-vehicle gateway unit;

wherein the biometric feature information comparison module comprises a finger vein information comparison device or a palm vein information comparison device and is configured to compare and verify biometric feature information corresponding to the obtained identity information of the certificate held by the driver with the biometric feature information of the current driver, and confirm whether the information belongs to a same person and is configured to compare and verify the obtained identity information of the certificate held by the driver and the biometric feature information of the current driver with the driver identity information and the biometric feature information that have been stored in the authorized driver database, to determine whether the current driver is authorized, wherein the system performs real-time monitoring on temperature of in-vehicle hazardous chemicals, and temperature in a vehicle compartment, level of humidity of in-vehicle hazardous chemicals and humidity in a vehicle compartment, pressure of in-vehicle hazardous chemicals and pressure in a vehicle compartment or tank, level of vibration of a vehicle compartment, a position of a tank carrying the in-vehicle hazardous chemicals, a level of leakage of in-vehicle hazardous chemicals, a level of liquid or gas leakage in a vehicle compartment carrying the in-vehicle hazardous chemicals, a level of liquid or gas leakage at outlet of the tank; and comprehensively determine whether the hazardous chemicals are at risk of combustion, explosion, or leakage, wherein the driver holography management unit further comprises:

a driver status monitoring subunit, wherein the driver status monitoring subunit monitors an emotion and/or a driving behavior and/or a physical fatigue status of the driver in real time, performs emotion identification and/or behavior analysis and/or fatigue status determining, directly associates with a vehicle control subunit according to a real-time emotion identification result and/or abnormal behavior analysis result and/or fatigue status determination result, or associates with the vehicle control subunit by using the in-vehicle gateway unit, to control a vehicle running status; and the vehicle control subunit, wherein the vehicle control subunit links with a start system, a speed control system, and a braking system of the vehicle, and is associated with the in-vehicle gateway unit, the driver identity verification subunit, and the driver status monitoring subunit, and the vehicle control subunit controls, according to a driver identity verification result sent by the driver identity verification subunit or sent by the in-vehicle gateway unit, whether the vehicle can be started; and control a vehicle driving status according to a driver real-time emotion status analysis result, driving behavior analysis result, and fatigue status determination result that are sent by the driver status monitoring subunit or the in-vehicle gateway unit, and wherein the vehicle control subunit comprises an ACC vehicle start control module and/or an anti-lock module and/or a speed limit management module and/or an intelligent brake management module and/or an electronic control brake assist module;

the ACC vehicle start control module is configured to determine, according to a received driver identity verification result, whether to allow to enable a vehicle switch, allow the vehicle to start when the driver identity verification result is passed, and not allow the vehicle to start when the driver identity verification result is not passed;

the anti-lock module is configured to: when an abnormal driver status monitoring result is received, prevent potential loss of vehicle driving direction control or skidding during emergency braking;

the speed limit management module is configured to control a maximum vehicle driving speed when an abnormal driver status monitoring result is received;

the intelligent brake management module is configured to enable an intelligent braking device to reduce a realtime vehicle driving speed when an abnormal driver status monitoring result is received; and the electronic control brake assist module is configured to quickly enable all braking forces when emergency braking is required when an abnormal driver status monitoring result is received.

2. The vehicle transport safety monitoring system for hazardous chemicals based on all-element management according to claim 1, the identity certificate reading module comprises a second-generation resident identity card reading device, an IC card qualification certificate reading device and/or motor vehicle driving license reading device and/or another certificate (such as a pass) reading device, and is configured to: obtain identity information of a certificate held by a current driver, and transmit the obtained identity information of the held certificate to the biometric feature information comparison module thereof, or a biometric feature information comparison module of the in-vehicle gateway unit, or a biometric feature information comparison module of the remote management unit by using the in-vehicle gateway unit.

3. The vehicle transport safety monitoring system for hazardous chemicals based on all-element management according to claim 1, wherein the driver status monitoring subunit comprises a real-time emotion identification module and/or an abnormal behavior monitoring module and/or a fatigue status monitoring module;

the real-time emotion identification module comprises a facial high-speed camera device and an emotion intelligent analysis and identification device, and is configured to: obtain a facial expression dynamics of the current driver, and transmit the obtained facial expression dynamics to an intelligent emotion analysis module thereof, an intelligent emotion analysis module of the in-vehicle gateway unit, or an intelligent emotion analysis module of the remote management unit by using the in-vehicle gateway unit; wherein the facial high-speed camera device is configured to collect the facial expression dynamics of the current driver; and the emotion intelligent analysis and identification device is configured to: perform intelligent analysis and identification on the facial expression dynamics collected by the facial high-speed camera device, and determine a real-time emotion status of the current driver; the abnormal behavior monitoring module comprises a head and face video collection device, a body panoramic video collection device, and an abnormal behavior analysis and identification device, and is configured to: obtain a face action or a body action of the current driver, and transmit the obtained face action or body action to an abnormal behavior analysis module thereof, an abnormal behavior analysis module of the in-vehicle gateway unit, or an abnormal behavior analysis module of the remote management unit by using in-vehicle gateway unit; wherein the head and face video collection device is configured to collect a head and face action of the current driver; the body panoramic video collection device is configured to collect a body action gesture of the current driver; and the abnormal behavior analysis and identification device is configured to: perform intelligent analysis and identification on the head and face action collected by the head and face video collection device and the body action posture collected by the body panoramic video collection device, to determine whether a real-time behavior status of the current driver is abnormal; and the fatigue status monitoring module comprises a head and face video collection device, a fatigue status analysis device based on video analysis, a seat load status collection device, and a fatigue status analysis device based on sensor network analysis, and is configured to: obtain fatigue status monitoring information of the current driver, and transmit the obtained information to a fatigue status determining module thereof, a fatigue status determining module of the in-vehicle gateway unit, or a fatigue status determining module of the remote management unit by using the in-vehicle gateway unit; wherein the head and face video collection device is configured to collect a head and face action of the current driver; the fatigue status analysis device based on video analysis is configured to perform intelligent analysis and identification on the head and face action collected by the head and face video collection device to determine a real-time fatigue degree of the current driver; the seat load status collection device is configured to collect load situations and load status change situations of different positions of a seat under the driver; and the fatigue status analysis device based on sensor network analysis is configured to perform intelligent analysis and identification on the load situations and the load status change situations that are of different positions of the seat under the driver and that are collected by the seat load status collection device, so as to determine the real-time fatigue degree of the current driver.

4. The vehicle transport safety monitoring system for hazardous chemicals based on all-element management according to claim 1, wherein the vehicle safety monitoring unit comprises: a real-time tire pressure monitoring and warning subunit, wherein the real-time tire pressure monitoring and warning subunit is associated with the in-vehicle gateway unit, and is associated with the alarm prompt unit and the remote management unit by using the in-vehicle gateway unit; and the real-time tire pressure monitoring and warning subunit collects various pieces of information related to tire pressure in realtime, and perform tire air leakage, in-tire pressure, and in-tire temperature analysis, and risk warning directly or in cooperation with the in-vehicle gateway unit according to the collected information; a vehicle overheat monitoring and warning subunit, wherein the vehicle overheat monitoring and warning subunit is associated with the in-vehicle gateway unit, and is associated with the alarm prompt unit and the remote management unit by using the in-vehicle gateway unit; and the vehicle overheat monitoring and warning subunit collects, in real time, temperature information of a component that is on the current vehicle and is directly related to the vehicle running status, and determine, according to the collected information, whether the vehicle is overheated and has a risk of combustion and explosion or damage directly or in cooperation with the in-vehicle gateway unit; and a new energy vehicle lithium-ion power battery explosion prevention and control subunit, wherein a sensor of the new energy vehicle lithium-ion power battery explosion prevention and control subunit is disposed in a new energy vehicle lithium-ion power battery cell and a battery compartment, is associated with the in-vehicle gateway unit, and is associated with the alarm prompt unit and the remote management unit by using the in-vehicle gateway unit and the new energy vehicle lithium-ion power battery explosion prevention and control subunit collects a battery cell temperature, battery cell deformation, battery cell air pressure, battery cell liquid leakage, battery compartment explosive gas concentration, battery compartment ambient temperature, and battery compartment smoke information of the current vehicle; and directly determine, through calculation, whether the vehicle power battery has an explosion risk or a combustion risk according to the collected information or through cooperation with the in-vehicle gateway unit, and enable a battery explosion suppression function when it is determined that a monitoring information analysis result is higher than a related set threshold to trigger an alarm of a hazard of the power battery cell or a hazard of the battery compartment.

5. The vehicle transport safety monitoring system for hazardous chemicals based on all-element management according to claim 4, wherein the real-time tire pressure monitoring and warning subunit comprises a tire air leakage monitoring module, a tire low pressure monitoring module, and a tire temperature monitoring module; and the tire air leakage monitoring module comprises a tire valve core air leakage monitoring device, a tire tread air leakage monitoring device, a tire foreign matter monitoring device, a tire side and inner edge breakage monitoring device, a hub flange deformation sensing and monitoring device, a hub rupture monitoring device, and a sensing and transmitting device corresponding thereto, and is configured to obtain real-time information about whether air leakage exists on each tire of the vehicle, and transmit the obtained information to the in-vehicle gateway unit or the remote management unit by using the in-vehicle gateway unit; wherein the tire valve core air leakage monitoring device is configured to collect air flow information near a tire valve core; the tire tread air leakage monitoring device is configured to collect whether there is a tread with slow air leakage on a surface of a tire; the tire foreign matter monitoring device is configured to monitor whether a foreign matter that is possible to cause tire air leakage is inserted into the tire; the tire side and inner edge breakage monitoring device is configured to monitor whether a tire side and inner edge are broken; the hub flange deformation sensing and monitoring device is configured to monitor a deformation status of a hub flange; and the hub rupture monitoring device is configured to monitor whether a vehicle hub is ruptured; the tire low pressure monitoring module comprises a direct tire pressure monitoring device, an indirect tire pressure monitoring device, and a sensing and transmitting device corresponding thereto, and is configured to: obtain real-time information of tire pressure statuses of the vehicle, and transmit the obtained information to the in-vehicle gateway unit or the remote management unit by using the in-vehicle gateway unit; wherein the direct tire pressure monitoring device is configured to directly collect real-time internal tire pressure value information; and the indirect tire pressure monitoring device is configured to: collect a real-time speed difference of different tires of the vehicle, and determine wheel rolling radius consistency according to the speed difference, so as to determine whether a tire is in a low air pressure state; and the tire temperature monitoring module comprises a temperature sensing and monitoring device in each tire and a sensing and transmitting device corresponding thereto, and is configured to: obtain real-time information about a temperature status inside each tire of the vehicle, and transmit the obtained information to the in-vehicle gateway unit or the remote management unit by using the in-vehicle gateway unit.

6. The vehicle transport safety monitoring system for hazardous chemicals based on all-element management according to claim 4, wherein the vehicle overheat monitoring and warning subunit comprises an engine/motor temperature monitoring module, a differential lock system temperature monitoring module, a tire temperature monitoring module, and/or an exhaust pipe temperature monitoring module; the engine/motor temperature monitoring module is configured to: obtain real-time temperature information of a vehicle engine/motor, and transmit the obtained information to the in-vehicle gateway unit or the remote management unit by using the in-vehicle gateway unit; the differential lock system temperature monitoring module is configured to: obtain real-9-time temperature information of a vehicle differential lock system, and transmit the obtained information to the in-vehicle gateway unit or the remote management unit by using the in-vehicle gateway unit; the tire temperature monitoring module is configured to: obtain real-time temperature information of a vehicle tire, and transmit the obtained information to the in-vehicle gateway unit or the remote management unit by using the in-vehicle gateway unit; and the exhaust pipe temperature monitoring module is configured to: obtain real-time temperature information of an exhaust pipe of a fuel vehicle, and transmit the obtained information to the in-vehicle gateway unit or the remote management unit by using the in-vehicle gateway unit.

7. The vehicle transport safety monitoring system for hazardous chemicals based on all-element management according to claim 4, wherein the new energy vehicle lithium-ion power battery explosion prevention and control subunit comprises one or more of a battery cell temperature monitoring module, a battery cell deformation monitoring module, a battery cell air pressure monitoring module, a battery cell liquid leakage monitoring module, a battery compartment explosive gas monitoring module, a battery compartment ambient temperature monitoring module, a battery compartment smoke detection module, and a battery explosion suppression module; the battery cell temperature monitoring module comprises a battery cell internal temperature sensing and monitoring device and/or a battery cell internal resistance tomography device and a sensing and transmitting device corresponding thereto, and is configured to: obtain cell real-time temperature information of a vehicle power battery, and transmit the obtained information to the in-vehicle gateway unit or to the remote management unit by using the in-vehicle gateway unit; the battery cell deformation monitoring module comprises a battery cell internal deformation sensing and monitoring device and/or a battery cell surface variable resistance monitoring device and a sensing and transmitting device corresponding thereto, and is configured to: obtain cell real-time deformation information of the vehicle power battery, and transmit the obtained information to the in-vehicle gateway unit or the remote management unit by using the in-vehicle gateway unit; the battery cell air pressure monitoring module comprises a battery cell internal air pressure monitoring device and a sensing and transmitting device corresponding thereto, and is configured to: obtain cell real-time air pressure information of the vehicle power battery, and transmit the obtained information to the in-vehicle gateway unit or the remote management unit by using the in-vehicle gateway unit; the battery cell liquid leakage monitoring module comprises a battery bus insulation impedance monitoring device and/or a battery positive and negative bus current monitoring device, and/or a VOC volatile detection device and a sensing and transmitting device corresponding thereto, and is configured to: obtain cell real-time liquid leakage information of the vehicle power battery, and transmit the obtained information to the in-vehicle gateway unit or the remote management unit by using the in-vehicle gateway unit; the battery compartment explosive gas monitoring module comprises one or more of a CO explosive gas detection, sensing, and monitoring device, an H2 explosive gas detection, sensing, and monitoring device, a CH4 explosive gas detection, sensing, and monitoring device, a VOC volatile detection device, and the like, and a sensing and transmitting device corresponding thereto, and is configured to: obtain a composition and real-time concentration information of an explosive gas in the vehicle power battery compartment, and transmit the obtained information to the in-vehicle gateway unit or the remote management unit by using the in-vehicle gateway unit; the battery compartment ambient temperature monitoring module is configured to: obtain ambient temperature information of the vehicle power battery compartment, and transmit the obtained information to the in-vehicle gateway unit or the remote management unit by using the in-vehicle gateway unit; the battery compartment smoke detection module comprises one or more of an ionization smoke detector, an optoelectronic smoke detector, an infrared beam smoke detector, a video analysis smoke detector, a light-sensitive fire detector, and a video analysis flame detector, and a sensing and transmitting device corresponding thereto, and is configured to: obtain information about whether smoke exists in the vehicle power battery compartment, and transmit the obtained information to the in-vehicle gateway unit or the remote management unit by using the in-vehicle gateway unit; and the battery compartment battery explosion suppression module comprises a circuit controller and/or an intelligent circuit breaker and/or a lithium-ion battery box fire suppression device and/or an automatic fire suppression linkage control device, and is configured to cut off a power supply or perform fire suppression and explosion prevention processing when lithium-ion power battery explosion warning information occurs.

8. The vehicle transport safety monitoring system for hazardous chemicals based on all-element management according to claim 1, wherein the in-vehicle hazardous chemical safety monitoring unit comprises: an in-vehicle hazardous chemical physical and chemical safety monitoring and warning subunit, wherein the in-vehicle hazardous chemical physical and chemical safety monitoring and warning subunit is associated with the in-vehicle gateway unit, and is associated with the alarm prompt unit and the remote management unit by using the in-vehicle gateway unit; and the in-vehicle hazardous chemical physical and chemical safety monitoring and warning subunit is monitors physical and chemical safety parameters of in-vehicle hazardous chemicals in real time, performing physical and chemical safety warning analysis of the in-vehicle hazardous chemicals directly or in cooperation with the in-vehicle gateway unit according to monitored information, generating warning information when a physical and chemical safety risk of the in-vehicle hazardous chemicals occurs, sending the warning information to the remote management unit by using the in-vehicle gateway unit, and sending a warning by using the alarm prompt unit; an in-vehicle hazardous chemical anti-theft and robbery monitoring and warning subunit, wherein the in-vehicle hazardous chemical anti-theft and robbery monitoring and warning subunit is associated with the in-vehicle gateway unit, and is associated with the alarm prompt unit and the remote management unit by using the in-vehicle gateway unit; and the in-vehicle hazardous chemicals anti-theft and robbery monitoring and warning subunit monitors anti-theft and robbery safety information of the in-vehicle hazardous chemicals in real time, performing warning analysis on risks of theft or robbery or loss of a vehicle loaded with hazardous chemicals and the hazardous chemicals on the vehicle directly or in cooperation with the in-vehicle gateway unit, generating warning information when the risks occur, sending the warning information to the remote management unit by using the in-vehicle gateway unit, and sending a warning by using the alarm prompt unit; and a hazardous chemical transport emergency rescue guide subunit, wherein the hazardous chemical transport emergency rescue guide subunit is set to be associated with the in-vehicle gateway unit, and is associated with the alarm prompt unit and the remote management unit by using the in-vehicle gateway unit; and the hazardous chemical transport emergency rescue guide subunit links with the in-vehicle hazardous chemical physical and chemical safety monitoring and warning subunit and the in-vehicle hazardous chemical anti-theft and robbery monitoring and warning subunit, and forming emergency disposal on-site guide information for a vehicle driver when the vehicle triggers in-vehicle hazardous chemical physical and chemical safety monitoring and warning and in-vehicle hazardous chemical anti-theft and robbery monitoring and warning.

9. The vehicle transport safety monitoring system for hazardous chemicals based on all-element management according to claim 8, wherein the in-vehicle hazardous chemical physical and chemical safety monitoring and warning subunit comprises one or more of a temperature monitoring module, a humidity monitoring module, a pressure monitoring module, a vibration monitoring module, and a leakage monitoring module; the temperature monitoring module is configured to: obtain real-time information about a temperature of the in-vehicle hazardous chemicals, a temperature in a vehicle compartment, or a temperature of a tank, and transmit the obtained information to the in-vehicle gateway unit or the remote management unit by using the in-vehicle gateway unit; the humidity monitoring module is configured to: obtain real-time information about humidity of the in-vehicle hazardous chemicals and humidity in the vehicle compartment, and transmit the obtained information to the in-vehicle gateway unit or the remote management unit by using the in-vehicle gateway unit; the pressure monitoring module is configured to: obtain pressure of the in-vehicle hazardous chemicals and real-time information about pressure in the vehicle compartment or the tank, and transmit the obtained information to the in-vehicle gateway unit or the remote management unit by using the in-vehicle gateway unit; the vibration monitoring module is configured to: obtain real-time information about vibration at a position of the vehicle compartment or the tank in which the in-vehicle hazardous chemicals are loaded, and transmit the obtained information to the in-vehicle gateway unit or the remote management unit by using the in-vehicle gateway unit; and the leakage monitoring module is configured to: obtain a leakage situation of the in-vehicle hazardous chemicals and real-time information of a gas leakage situation in the vehicle compartment loaded with the in-vehicle hazardous chemicals or a liquid or gas leakage situation of a tank outlet, and transmit the obtained information to the in-vehicle gateway unit or the remote management unit by using the in-vehicle gateway unit.

10. The vehicle transport safety monitoring system for hazardous chemicals based on all-element management according to claim 8, wherein the in-vehicle hazardous chemical anti-theft and robbery monitoring and warning subunit comprises one or more of a vehicle anti-theft alarm module, a vehicle anti-robbery monitoring module, a vehicle anti-theft and robbery positioning and tracking module, a vehicle fuel tank safety monitoring module, a door control intrusion detection module, a cargo anti-theft video monitoring module, and/or a hazardous chemical cargo automatic inventory module; the vehicle anti-theft alarm module is configured to: monitor an unauthorized position movement or an abnormal start situation in a vehicle parked state, and transmit monitoring information to a data storage module or an edge computing module of the in-vehicle gateway unit, or the remote management unit by using a network communication module of the in-vehicle gateway unit; the vehicle anti-robbery module is configured to: monitor an armed person and a non-normal person aggregation situation around the vehicle, and transmit monitoring information to the in-vehicle gateway unit or the remote management unit by using the in-vehicle gateway unit; the vehicle anti-theft and robbery positioning and tracking module is configured to: perform positioning and tracking on a real-time position of the vehicle after an anti-theft and robbery alarm is triggered, and transmit tracked positioning information to the remote management unit by using the in-vehicle gateway unit; the vehicle fuel tank safety monitoring module is configured to: perform real-time video monitoring on a position of a fuel tank of a truck loaded with hazardous chemicals, and transmit monitoring information to the in-vehicle gateway unit or directly to the remote management unit by using the in-vehicle gateway unit; the door control intrusion detection module is configured to: monitor a door body of a vehicle compartment of a truck loaded with a hazardous chemical cargo or an oil pump inlet/outlet pipe/an oil drain valve of a tank truck, and transmit monitoring information to the in-vehicle gateway unit or directly to the remote management unit by using the in-vehicle gateway unit; the cargo anti-theft video monitoring module is configured to: perform video monitoring on an internal cargo situation of a closed van loaded with hazardous chemicals and all openings of a tank truck, and transmit monitoring information to the in-vehicle gateway unit or directly to the remote management unit by using the in-vehicle gateway unit; and the hazardous chemical cargo automatic inventory module comprises a scanner or a radio frequency identification card reader disposed at a door of a vehicle compartment, and a barcode label, a two-dimensional code label, or a radio frequency identification electronic tag disposed on a packaging of the hazardous chemical cargo, and is configured to: perform real-time registration on a quantity change in a loading process and a quantity change in an unloading process of the hazardous chemical cargo, perform quantity inventory on the hazardous chemical cargo in a transport process regularly or irregularly, and transmit registration and inventory information to the in-vehicle gateway unit or directly to the remote management unit by using the in-vehicle gateway unit.

11. The vehicle transport safety monitoring system for hazardous chemicals based on all-element management according to claim 9, wherein the hazardous chemical transport emergency rescue guide subunit comprises an emergency rescue guide information module, a voice broadcast module, and an automatic push module; the emergency rescue guide information module is configured to provide emergency rescue guide information for hazardous chemicals; the voice broadcast module is configured to instruct a driver and a passenger to perform preliminary emergency disposal by playing emergency rescue guide information in real time via voice when a warning or alarm occurs; and the automatic push module is configured to: when a warning or alarm occurs, push an emergency rescue guide information file in realtime to instruct a driver and a passenger to perform preliminary emergency disposal.

12. The vehicle transport safety monitoring system for hazardous chemicals based on all-element management according to claim 1, wherein the in-vehicle gateway unit comprises a network communication module and/or a data storage module and/or an edge computing module.

13. The vehicle transport safety monitoring system for hazardous chemicals based on all-element management according to claim 1, wherein the alarm prompt unit comprises a vehicle local alarm prompt subunit and a remote monitoring client software alarm prompt subunit.

14. The vehicle transport safety monitoring system for hazardous chemicals based on all-element management according to claim 1, wherein the remote management unit comprises a government industry management client subunit, an enterprise operation and management client subunit, a driver and passenger service client subunit, and a communication center; the government industry management client subunit is configured to: receive and display identity verification information, real-time monitoring information, and/or hazard warning or alarm information that are sent by an in-vehicle terminal of a hazardous article transport vehicle for a driver driving a hazardous chemical transport vehicle and/or a vehicle carrying hazardous chemicals and/or in-vehicle hazardous chemicals, and transmits a related management instruction according to the received warning or alarm information, starting an emergency management procedure, and issuing a related emergency disposal instruction; and the in-vehicle terminal of the hazardous article transport vehicle is formed by the driver holography management unit, the vehicle safety monitoring unit, the in-vehicle hazardous chemical safety monitoring unit, and the in-vehicle gateway unit through cooperation; the enterprise operation and management client subunit is configured to receive and display the identity verification information, the real-time monitoring information, and/or the hazard warning or alarm information that are sent by the in-vehicle terminal of the hazardous article transport vehicle for the driver driving a hazardous chemical transport vehicle and/or the vehicle carrying hazardous chemicals and/or the in-vehicle hazardous chemicals; transmits a related management instruction according to the received warning or alarm information, starting an emergency management procedure, and issuing a related emergency disposal instruction; and when receiving high-risk-level hazard warning or alarm information, starting the emergency management procedure, issuing a related emergency disposal instruction, issuing an emergency alarm to the government industry management client subunit, and issuing a related emergency disposal instruction; the driver and passenger service client subunit is configured to: receive and display the identity verification information, the real-time monitoring information, and/or the hazard warning or alarm information that are sent by the in-vehicle terminal of a hazardous article transport vehicle for the driver driving a hazardous chemical transport vehicle and/or the vehicle carrying hazardous chemicals and/or the in-vehicle hazardous chemicals, and generates a corresponding alarm prompt and/or an emergency disposal guide solution corresponding to the warning or alarm information according to the received hazard warning or alarm information; and the communication center is configured to store the identity verification information, the real-time monitoring information, and/or the hazard warning or alarm information that are sent by the in-vehicle terminal of a hazardous article transport vehicle for the driver driving a hazardous chemical transport vehicle and/or the vehicle carrying hazardous chemicals and/or the in-vehicle hazardous chemicals, and/or is configured to intelligently identify and analyze the received information, and separately forward the received information and/or an analysis result to the government industry management client subunit, the enterprise operation and management client subunit, and the driver and passenger service client subunit; and the communication center further serves as a computer system environment of the government industry management client subunit, the enterprise operation and management client subunit, and the driver and passenger service client subunit, supports a related software application, and forwards a management instruction or a response instruction of the government industry management client subunit, the enterprise operation and management client subunit, and the driver and passenger service client subunit to the in-vehicle terminal of the hazardous article transport vehicle.

15. The vehicle transport safety monitoring system for hazardous chemicals based on all-element management according to claim 14, wherein the government industry management client subunit comprises public safety industry management client software, transportation industry management client software, emergency industry management client software, and another industry management client software according to different supervisory industry departments; the public safety industry management client software is configured to: receive the identity verification information, the real-time monitoring information, and/or hazard warning or alarm information that are sent by the in-vehicle terminal of a hazardous article transport vehicle and forwarded by the communication center for the driver driving a hazardous chemical transport vehicle and/or the vehicle carrying hazardous chemicals and/or the in-vehicle hazardous chemicals, send a traffic management instruction to an on-duty traffic police at a position of the vehicle according to an information type, send a corresponding vehicle and position traffic accident handling instruction to a related traffic accident handler, and send emergency rescue linkage management information according to an emergency plan setting; and the public safety industry management client software is further capable of sending warning information to the enterprise operation and management client subunit and the driver and passenger service client subunit, and sending linkage management information according to the emergency plan setting; the transportation industry management client software is configured to: receive the identity verification information, the real-time monitoring information, and/or the hazard warning or alarm information that are sent by the in-vehicle terminal of a hazardous article transport vehicle and forwarded by the communication center for the driver driving a hazardous chemical transport vehicle and/or the vehicle carrying hazardous chemicals and/or the in-vehicle hazardous chemicals, send a management instruction to a related traffic safety responsible department according to the information type, and send other linkage management information according to emergency plan setting; and the transportation industry management client software is further capable of sending warning information to the enterprise operation and management client subunit and the driver and passenger service client subunit, and sending linkage management information according to the emergency plan setting; the emergency industry management client software is configured to: receive the identity verification information, the real-time monitoring information, and/or the hazard warning or alarm information that are sent by the in-vehicle terminal of a hazardous article transport vehicle and forwarded by the communication center for the driver driving a hazardous chemical transport vehicle and/or the vehicle carrying hazardous chemicals and/or the in-vehicle hazardous chemicals, send an emergency disposal instruction to a related emergency rescue person according to an information type, a vehicle type, a type of loaded cargo of a freight vehicle, and behavior status information of the driver, and send other linkage management information according to emergency plan setting; and the another industry management client software is configured to: receive the identity verification information, the real-time monitoring information, and/or the hazard warning or alarm information that are sent by the in-vehicle terminal of a hazardous article transport vehicle and forwarded by the communication center for the driver driving a hazardous chemical transport vehicle and/or the vehicle carrying hazardous chemicals and/or the in-vehicle hazardous chemicals, and enables an insurance claim service according to an information situation, and sending other linkage management information according to emergency plan setting.

16. The vehicle transport safety monitoring system for hazardous chemicals based on all-element management according to claim 14, wherein the enterprise operation and management client subunit comprises a consigner department management client software, a carrier department management client software, and a consignee department management client software according to different users; the consigner department management client software is configured to receive and display safety tracking and query information of a cargo consignment vehicle, and query a hazardous cargo electronic waybill and driver identity information; the carrier department management client software is configured to: receive and display the identity verification information, the real-time monitoring information, and/or the hazard warning or alarm information that are sent by the in-vehicle terminal of a hazardous article transport vehicle and forwarded by the communication center for the driver driving a hazardous chemical transport vehicle and/or the vehicle carrying hazardous chemicals and/or the in-vehicle hazardous chemicals, and when receiving the warning or alarm information, send emergency rescue guide information and/or warning information to the driver and passenger service client subunit; and when receiving a high-risk-level warning or alarm, send emergency rescue guide information and/or warning information to the driver and passenger service client subunit, and immediately send linkage alarm information to the government industry management client subunit synchronously according to emergency plan setting; and the consignee department management client software is configured to receive and display the safety tracking and query information of the cargo consignment vehicle, and query the hazardous cargo electronic waybill and the driver identity information.

17. The vehicle transport safety monitoring system for hazardous chemicals based on all-element management according to claim 14, wherein the driver and passenger service client subunit comprises driver service client software, escort service client software, and stevedore service client software according to different users; the driver service client software is configured to receive and display the identity verification information, the real-time monitoring information, and/or the hazard warning or alarm information that are sent by the in-vehicle terminal of a hazardous article transport vehicle and forwarded by the communication center for the driver driving a hazardous chemical transport vehicle and/or the vehicle carrying hazardous chemicals and/or the in-vehicle hazardous chemicals; and at the same time, receive and display emergency rescue guide information sent by the enterprise operation and management client subunit, or display emergency rescue guide information or a driving instruction automatically pushed after related warning or alarm information is triggered; and the driver service client software supports feedback of a risk check situation and a disposal result to the government industry management client subunit and the enterprise operation and management client subunit after the driver completes risk check; the escort service client software is configured to receive and display the identity verification information, the real-time monitoring information, and/or the hazard warning or alarm information that are sent by the in-vehicle terminal of a hazardous article transport vehicle and forwarded by the communication center for the driver driving a hazardous chemical transport vehicle and/or the vehicle carrying hazardous chemicals and/or the in-vehicle hazardous chemicals; at the same time, receive and display emergency rescue guide information sent by the enterprise operation and management client subunit, or display emergency rescue guide information automatically pushed after related warning or alarm information is triggered; after receiving a risk alert sent by the government industry management client subunit and the enterprise operation and management client subunit, the escort service client software generates corresponding warning information; and the escort service client software supports an escort to feed back a risk check situation and a disposal result to the government industry management client and the carrier department management client after the driver completes risk check; and the stevedore service client software is configured to: receive and display a hazardous cargo road transport electronic waybill and a quantity change and inventory information in a hazardous article loading and unloading process, and support query of a type, a quantity, a loading and unloading requirement, a physical characteristic, a chemical characteristic, a physical and chemical hazard, and corresponding emergency rescue guide information of currently loaded hazardous articles.

18. The vehicle transport safety monitoring system for hazardous chemicals based on all-element management according to claim 14, wherein the communication center comprises a cloud platform and/or a local storage server and a personal mobile intelligent terminal; the cloud platform is configured to store data information and alarm information uploaded by the in-vehicle terminal of a hazardous article transport vehicle, receive data of the government industry management client software/the enterprise operation and management client software/the driver and passenger service client software, invoke a shared data resource pool, support a computer hardware platform environment to which the government industry management client software/the enterprise operation and management client software/the driver and passenger service client software is applied, and support communication and interaction between the government industry management client software/the enterprise operation and management client software/the driver and passenger service client software and the in-vehicle gateway unit; the local storage server is configured to separately store the data information and the alarm information uploaded by the in-vehicle terminal of a hazardous article transport vehicle, receive the data of the government industry management client software/the enterprise operation and management client software/the driver and passenger service client software, invoke a database, support the computer hardware platform environment to which the government industry management client software/the enterprise operation and management client software/the driver and passenger service client software is applied, and support communication and interaction between the government industry management client software/the enterprise operation and management client software/the driver and passenger service client software and the in-vehicle gateway unit; and the personal handheld intelligent terminal is configured to store the data information and the alarm information uploaded by the in-vehicle terminal of a hazardous article transport vehicle, an online query tool and temporary storage space for the data information uploaded by the government industry management client software/the enterprise operation and management client software/the driver and passenger service client software, support a microcomputer hardware platform environment to which the government industry management client software/the enterprise operation and management client software/the driver and passenger service client software is applied, and support communication and interaction between the government industry management client software/the enterprise operation and management client software/the driver and passenger service client software and the in-vehicle gateway unit.

* * * * *